United States Patent [19]
Watanabe

[11] Patent Number: 5,909,316
[45] Date of Patent: Jun. 1, 1999

[54] SINGLE PLATE PROJECTION TYPE COLOR LIQUID CRYSTAL DISPLAY DEVICE

[75] Inventor: Yoshihiro Watanabe, Yokohama, Japan

[73] Assignee: Kabushiki Kaisha Toshiba, Kawasaki, Japan

[21] Appl. No.: 08/878,211

[22] Filed: Jun. 18, 1997

[30] Foreign Application Priority Data

Jun. 19, 1996 [JP] Japan ................................. 8-178424

[51] Int. Cl.$^6$ .................................................. G02B 27/10
[52] U.S. Cl. .......................... 359/619; 359/622; 359/626
[58] Field of Search .................................. 359/618, 619, 359/621, 622, 630, 626; 348/59

[56] References Cited

U.S. PATENT DOCUMENTS

| | | | |
|---|---|---|---|
| 4,414,565 | 11/1983 | Shanks | 358/89 |
| 5,161,042 | 11/1992 | Hamada | 359/41 |
| 5,703,717 | 12/1997 | Ezra et al. | 359/462 |
| 5,712,732 | 1/1998 | Street | 359/630 |

*Primary Examiner*—Georgia Epps
*Assistant Examiner*—Vicky Mack
*Attorney, Agent, or Firm*—Pillsbury Madison & Sutro LLP

[57] ABSTRACT

A display device for displaying an image has a light source; an image forming element array for forming images of irradiation light beams emitted from the light source; a display panel including two-dimensionally arrayed pixels defined as a unit for controlling an intensity of transmitted light beams; image displaying section which the transmitted light beams with the irradiation light beam intensity controlled; and a light distributing section for splitting and distributing the irradiation light beams to said image forming element array, disposed between the light source and the image forming element array. The light distributing section is realized by either one of a lens array consisting of a plurality of lenses, which splits the irradiation light beams according to the plurality of lenses and converges the split light beams or an ellipse mirror constructed of two or more different rotary elliptical surfaces. This display device can be applied to a projection type display device by adding a projecting section which projects the light beams emerging from the display panel upon a screen or a pupil.

25 Claims, 53 Drawing Sheets

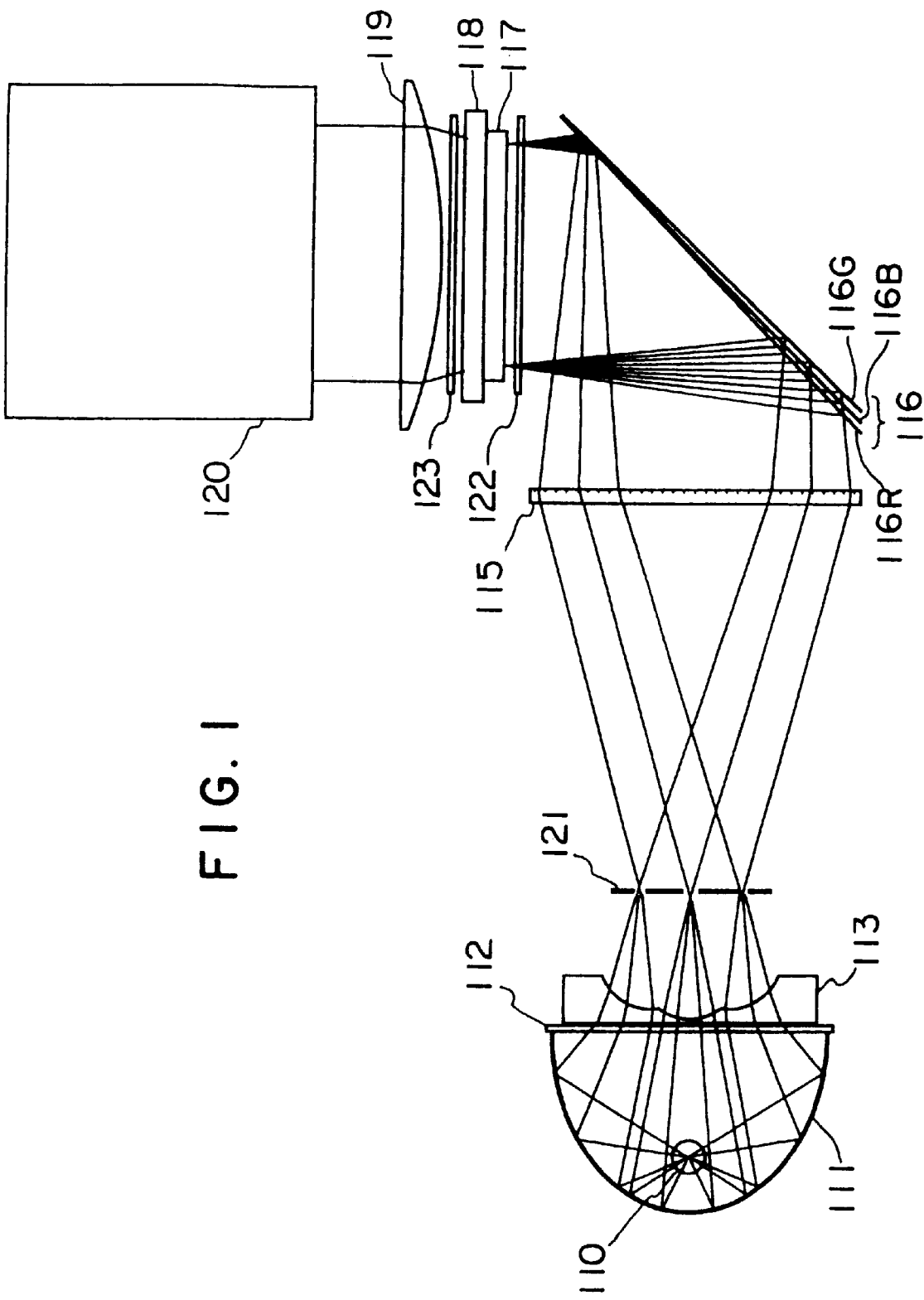

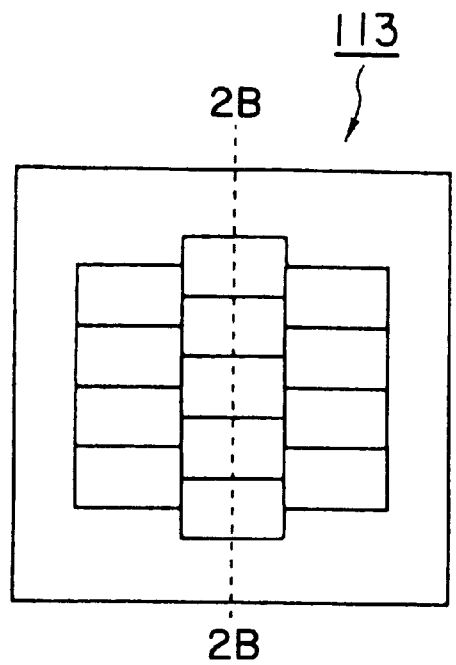 
FIG. 2A          FIG. 2B
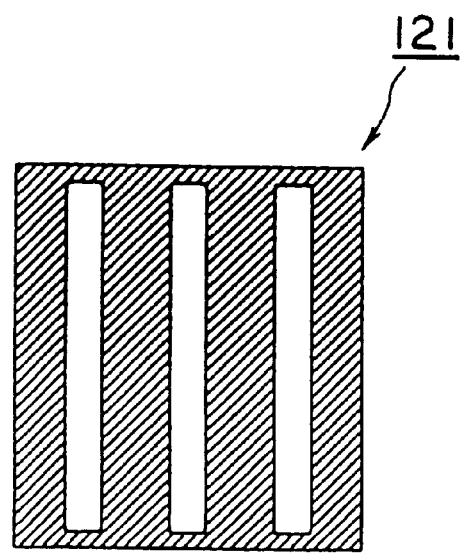
FIG. 3

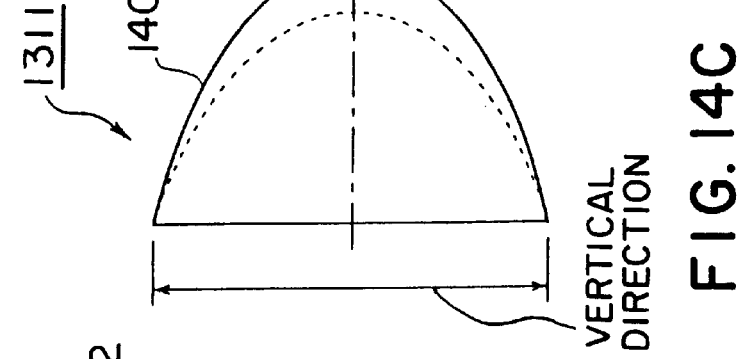
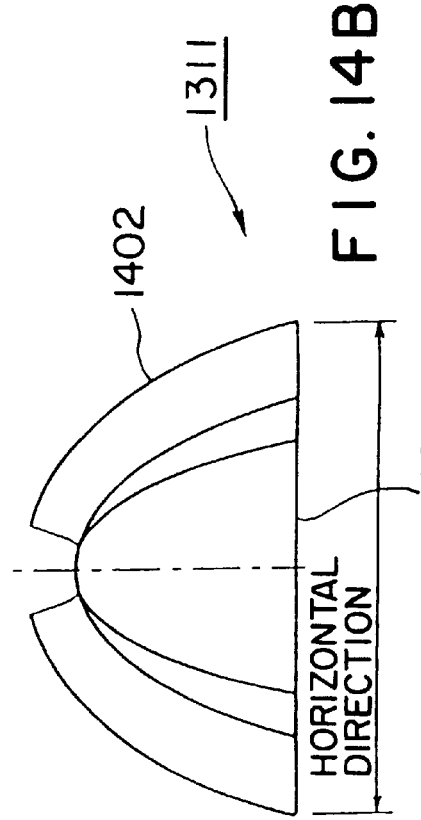
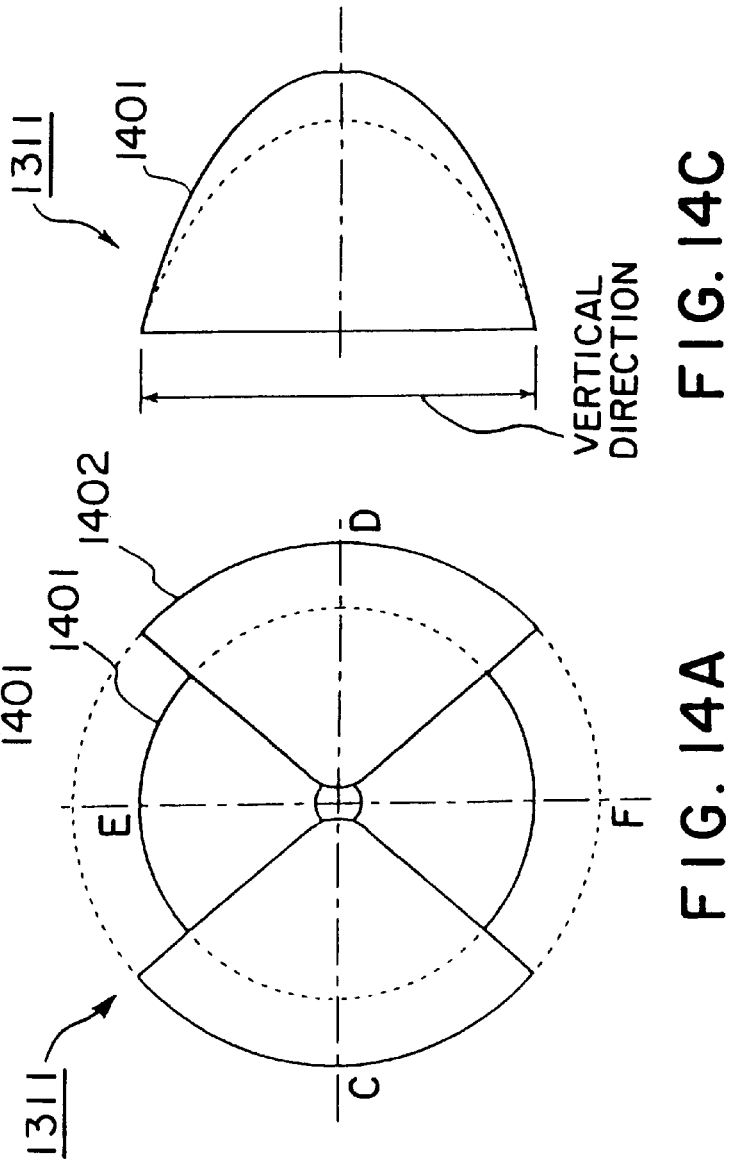

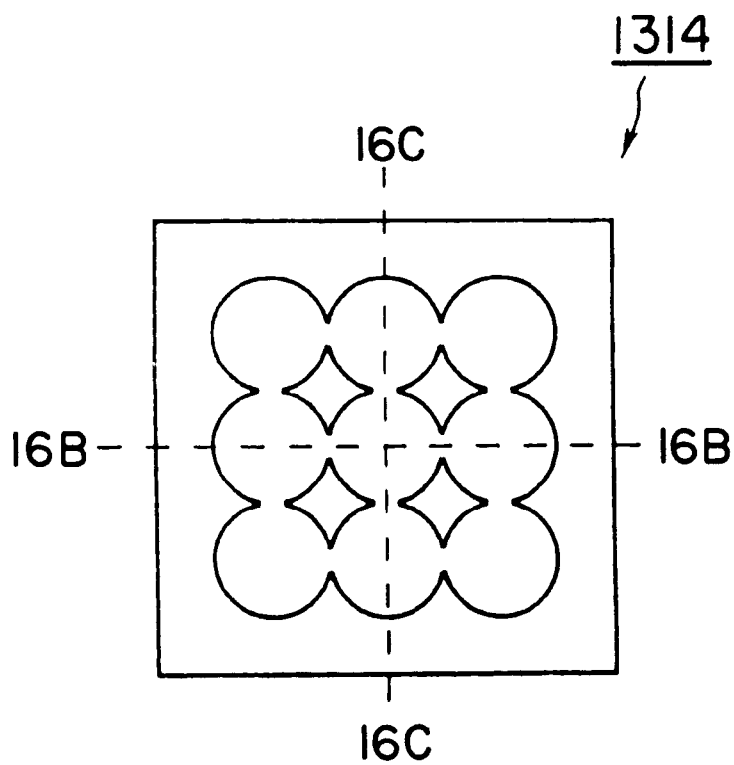
FIG. 16A
FIG. 16B
FIG. 16C

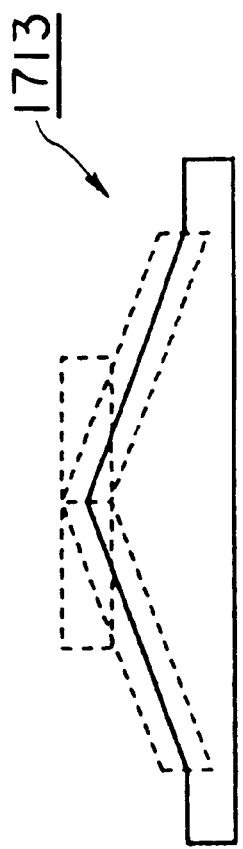
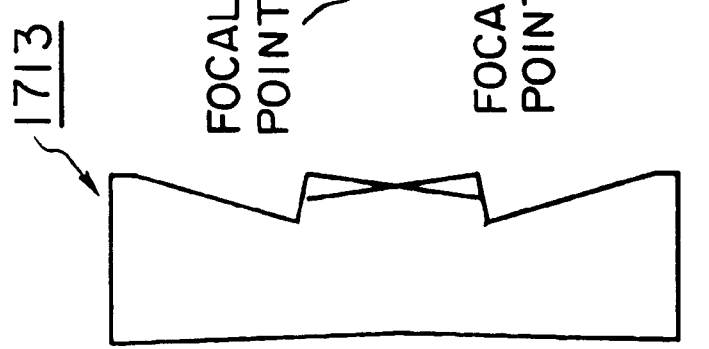
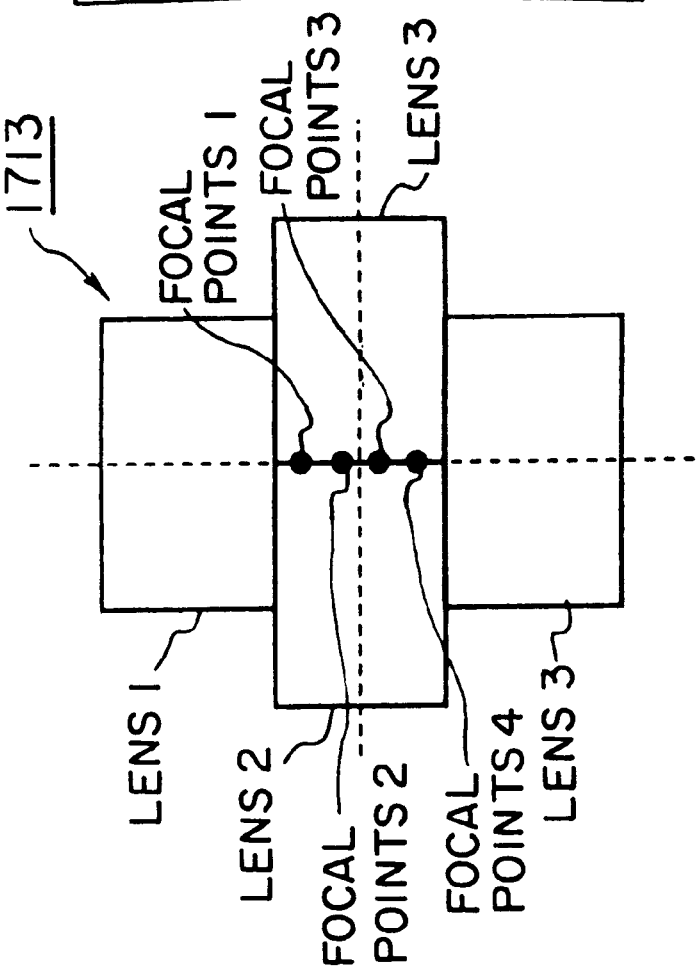
FIG. 18B
FIG. 18C
FIG. 18A

2702

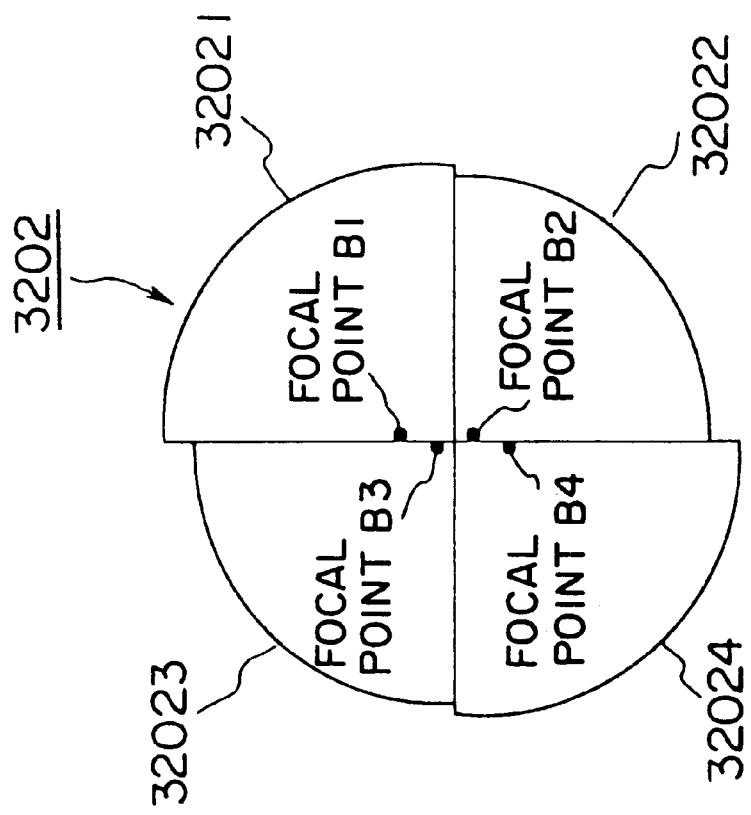
FIG. 33A
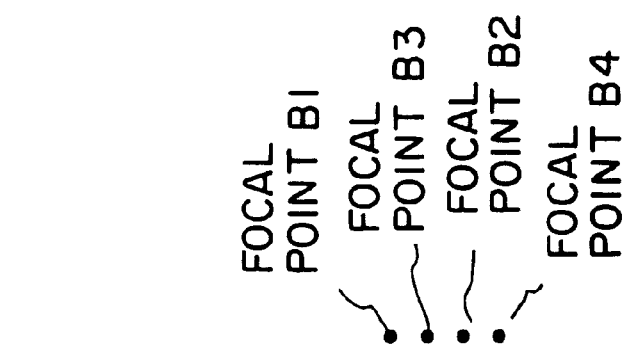
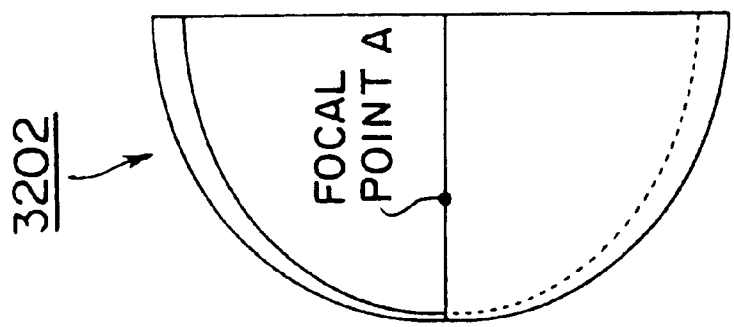
FIG. 33B

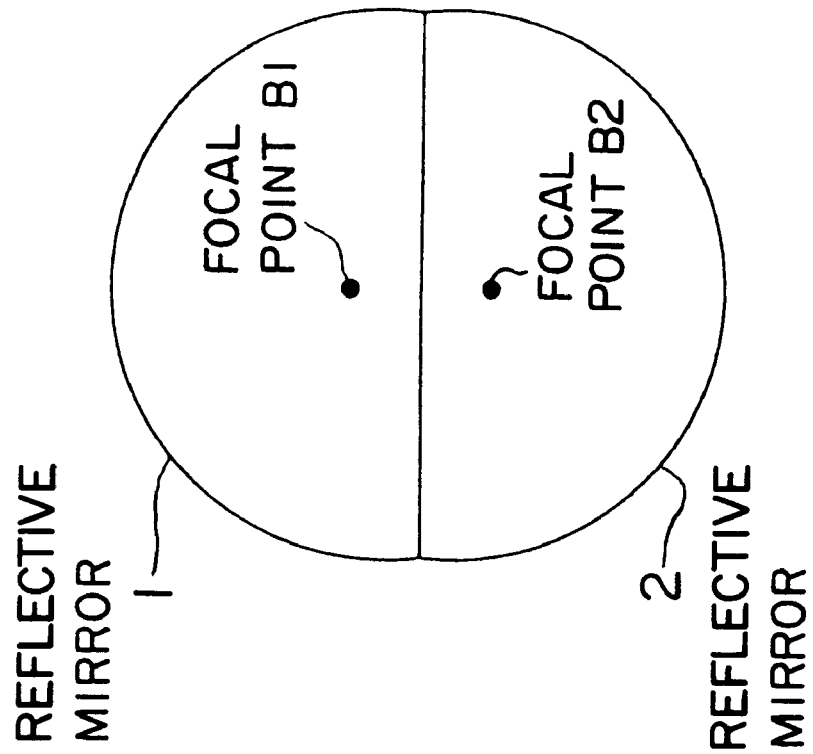
FIG. 38B
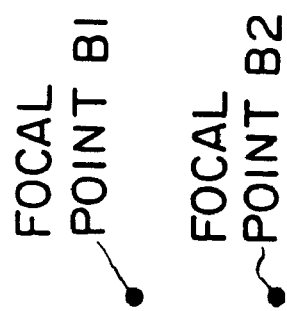
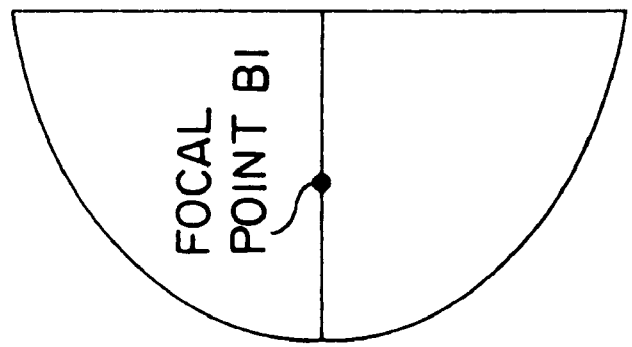
FIG. 38A

SINGLE PLATE PROJECTION TYPE COLOR LIQUID CRYSTAL DISPLAY DEVICE

BACKGROUND OF THE INVENTION

1. Field of the Invention

The present invention relates generally to a display device, and more particularly to a projection type display device using a liquid crystal display panel.

2. Description of Related Background Art

In recent years, much attention has been paid to a projection type liquid crystal display device as a display device for displaying on a large screen. The projection type liquid crystal display device may include several types, one of which is a type that forms a transmissive/non-transmissive two-dimensional pattern on a liquid crystal panel by use of laser beams, and a type that electrically forms the transmissive/non-transmissive two-dimensional pattern by use of thin-film transistors, etc. as a switch element. Particularly, the liquid crystal display device using the liquid crystal panel for electrically forming the display pattern is capable of displaying motion pictures and is therefore expected as the display device for a large screen TV.

Putting an emphasis on especially color display devices among the projection type liquid crystal display devices each using the display panel operating as a light bulb like the liquid crystal panel does, those devices are classified roughly into a 3-plate type liquid crystal display device and a single plate type liquid crystal display device.

The 3-plate type liquid crystal display device is constructed to form a color image by separating the light beams from a light source into three primary colors through a dichroic mirror, etc., subsequently producing a light intensity distribution of the separated light beams through the liquid crystal panel and synthesizing them by again using the dichroic mirror. On the other hand, the single plate type liquid crystal display device is constructed to actualize a color display by use of a single display panel as illustrated in FIG. 42, wherein one display panel may suffice, and therefore it can be considered that this might facilitate a reduction in costs.

Now, in the projection type display device using a matrix transmissive control type display panel typified by the liquid crystal panel, a transmissive area actually contributing to the display is normally considerably small for an area occupied by the pixel defined as one unit of the matrix forming the image. This is because a large proportion of wirings and interconnections for providing a drive voltage or current needed for operating the pixels and of the thin-film transistors defined as the switch element are opaque, and because there is no alternative but to restrict an effective transmissive area for the reason that the transmissivity is hard to precisely control at a boundary between the pixels.

A portion of the transmissive area contributing to the display, i.e., an opening between the pixels, may be termed a "pixel aperture".

Normally, the irradiation light beams upon the display panel are incident thereon with a substantially uniform intensity on the pixel unit,; however, the light beams incident on the areas excluding the pixel apertures are shut off.

Such being the case, there is known a technology of enhancing a light utilizing efficiency of the projection type display device wherein optical image forming elements corresponding to the dispositions of the pixels are provided on the incidence side of the irradiation light beams upon the pixel apertures to thereby form a luminance distribution correlated to the pixel aperture, and a rate of the transmitted light beams is thus increased. Normally, the image forming elements arranged on the incidence side of the pixels involve the use of minute lenses arranged in an array, which is referred to as a micro lens array.

FIG. 40 is an explanatory view illustrating an optical construction of the 3-plate type projection display device using the micro lens array.

A parabolic surface reflector 4011 formed with an aperture on the light irradiating side is disposed around a metal halide lamp 4010 serving as a light source for emitting the irradiation light beams. A filter 4012 for cutting off infrared rays and ultraviolet rays is disposed on the side of the aperture of the parabolic surface reflector 4011.

First and second dichroic mirrors 4013, 4014 for separating the irradiation light beams into three primary colors are disposed at an angle of approximately 45 degrees to the filter 4012 on the side of irradiating the irradiation light beams through the filter 4012. A first mirror 4015 for reflecting red light beams reflected by the first dichroic mirror 4013 is disposed substantially in parallel to the first dichroic mirror 4013. A first liquid crystal module driven by electric signals relative to a red color image, i.e., by red color image signals, is disposed in a position irradiated with the red light beams reflected by the first mirror 4015. The first liquid crystal module is constructed of an incidence-side polarizing plate 4031, a micro lens array 4032, a liquid crystal panel 4033 driven by the red color image signals, an exit-side polarizing plate 4034, and a field lens 4035, which are arranged in this sequence from the incidence side of the image signal to the exit side thereof.

Green light beams of the irradiation light beams penetrating the first dichroic mirror 4013 are reflected by the second dichroic mirror 4014, while blue light beams penetrate the second dichroic mirror 4014.

A second liquid crystal module including a liquid crystal panel 4043 driven by electric signals relative to a green color image, viz., by green color image signals, is disposed in a position irradiated with the green light beams. A third dichroic mirror 4017 is disposed at an angle of approximately 45 degrees to the liquid crystal panels 4033, 4043 of the first and second liquid crystal modules on the exit side of the first and second liquid crystal modules. The third dichroic mirror 4017 transmits the light beams emerging from the first liquid crystal module but reflects the light beams emerging from the second liquid crystal module.

A third liquid crystal module including a liquid crystal panel 4055 driven by blue color image signals is disposed in a position irradiated with the blue light beams penetrating the second dichroic mirror 4014. A second mirror 4016 is disposed at an angle of approximately 45 degrees to the liquid crystal panel 4053 on the exit side of the third liquid crystal module.

A fourth dichroic mirror 4018 is disposed substantially in parallel to the third dichroic mirror 4017 and the second mirror 4016 in a position irradiated with the blue light beams from the second mirror 4016 as well as with the light beams from the third dichroic mirror 4017. The fourth dichroic mirror 4018 transmits the light beams coming from the third dichroic mirror 4017 but reflects the light beams coming from the second mirror 4016, wherein the three primary color images emerging from the respective liquid crystal modules are synthesized. The synthesized images are projected on a screen 4020 via a projection lens 4019.

Next, an operation of the 3-plate type projection display device using the micro lens array shown in FIG. 40 is described.

The light beams emitted from the metal halide lamp 4010 are substantially collimated by the parabolic surface reflector 4011, and turn out to be white light beams, unnecessary invisible beams of which are eliminated by the filter 4012 for cutting off the infrared rays and the ultraviolet rays. The white light beams are then incident upon the first dichroic mirror 4013. The first dichroic mirror 4013 has such a characteristic as to reflect only the red light beams, and the reflected red light beams are further reflected by the first mirror 4015 and incident upon the incidence-side polarizing plate 4031 of the first liquid crystal module. The red light beams turned out by the red polarized light beams, by the incidence-side polarizing plate 4031, are incident on the micro lens array 4032 and then incident upon the liquid crystal panel 4033 drive by the red color image signals. The pixels of the liquid crystal panel 4033 operate in a 90-degree twisted nematic mode, wherein the polarized light beams incident when in the brightest display are optically rotated through 90 degrees and allowed to penetrate without the optical rotation when in a dark display.

The micro lenses of the micro lens array 4032 are disposed in the position corresponding to the pixel apertures of the liquid crystal panel 4033, and function to converge the incident light beams at the pixel apertures.

FIG. 41 is an explanatory view schematically showing how the micro lenses of the micro lens array converge the incident light beams at the pixel apertures of the liquid crystal panel.

The light beams incident on the micro lenses of the micro lens array 4101 penetrate a light incidence-side substrate 4102, then converge at the apertures between the pixels 4103 and emerge from through a light exit-side substrate 4104.

Referring back to FIG. 40, the red light beams penetrating the pixel apertures of the liquid crystal panel 4033 at a high efficiency due to the function of the micro lens array 4032 become light intensity images because of the exit-side polarizing plate 4034 functioning as a filter for changing the transmissivity in accordance with a state of the optical rotation by the liquid crystal panel 4033. The images are then projected in enlargement on a screen 4020 by a field lens 4035 and a projection lens 4019.

The third and fourth dichroic mirrors 4017, 4018 are provided between the field lens 4035 and the projection lens 4019. However, the third dichroic mirror 4017 has such a characteristic as to transmit the red light beams but reflect the green light beams, while the fourth dichroic mirror 4018 has such a characteristic as to transmit the red and green light beams and reflect only the blue light beams, with result that the red light beams are not influenced.

On the other hand, the green and blue light beams penetrating the first dichroic mirror 4013 are separated by the second dichroic mirror 4014. The thus-separated light beams turn out to be green and blue images with the light intensities controlled, as in the case of the red light beams, by the liquid crystal panel 4043 driven by the green color image signals and by the liquid crystal panel 4053 driven by the blue color image signals. These green and blue color images are synthesized with the red color image by the third and fourth dichroic mirrors 4017, 4018 and the second mirror 4016 as well, and then projected in enlargement.

Now, there must be a variety of display devices for actualizing the color display by only one display panel. The typical display device may, however, be a display device of such a type as to provide color filters corresponding to respective aggregations of the pixels driven by the three primary color intensity signals on the display panel, and display device of such a type as to actualize the color display by disposing the image forming element array just anterior to the display panel, i.e., on the light incidence side, irradiating the light beams of the three primary colors at different angles, and making incident the light beams of the color corresponding to the pixels driven by each of the three primary color intensity signals.

When these two types of display devices are compared, the display device using the color filters causes a loss of the optical signals because of the color filters absorbing or reflecting two colors among the three colors. The display device using the image forming element array, however, causes no such a loss and is therefore expected as a device capable of attaining the display brighter than by the display device using the color filters.

FIG. 42 is an explanatory view showing an optical construction of a single plate type color display device using the image forming element array. In the constructive example illustrated in FIG. 42, the micro lens array is used as the image forming element array, and there are employed a plurality of dichroic mirrors arranged at different angles to separate the light beams falling upon the image forming elements into three colors according to the angles.

An elliptical reflector 4211 formed with an aperture on the light irradiating side is disposed around a metal halide lamp 4210 serving as a light source for emitting the irradiation light beams. A conical lens 4212 for collimating the light beams is provided on the side of the aperture of the elliptical reflector 4211. A stop 4213 for controlling a light angle distribution is so disposed on the light exit side of the conical lens 4212 as to cover a peripheral edge of the conical lens 4212.

Disposed in sequence on the light exit side of the conical lens 4212 and the stop 4213 are a filter 4214 for cutting off the infrared rays and the ultraviolet rays, a condenser lens 4215, and a color separation mirror unit 4216 constructed of three pieces of dichroic mirrors. The color separation mirror unit 4216 includes the three dichroic mirrors arranged making minute angles to each other to separate the incident light beams into three primary color light beams at reflection angles deferent from each other.

A liquid crystal module consisting of an incidence-side polarizing plate 4217, a micro lens array 4218, a liquid crystal panel 4219 and an exit-side polarizing plate 4220 that are arranged in this sequence is disposed in a position in which to reflect the light beams separated into the three primary colors by the color separation mirror unit 4216. A field lens 4221 and a projection lens 4222 are dispose on the exit-side of the liquid crystal module. Further, according to the actual construction, there is used the screen on which the image projected through the projection lens 4222 is formed. This constructive element is omitted in illustration on the drawings. What has been so far described is the optical construction of the single plate type color display device using the image forming element array.

The operation of the single plate type color display device using the image forming element array shown in FIG. 42 will hereinafter be explained.

The light beams from the metal halide lamp 4210 are converged at a position just before the light-incidence side surface of the conical lens 4212 by a rotary elliptical reflector 4211. Conical lens 4212 collimates the light beams more easily by concentrating exit angles of the converged light beams on the optical axis side of the exit light beams. The reason why the stop 4213 restricts the exit angle of the light beams emerging from the conical lens 4212 is that the light angle distribution obtained on the exit side of the condenser lens 4215 is determined based on the area of the light exit portion of the stop 4213 and the focal length of the condenser lens 4215, and hence a predetermined angle distribution which will be mentioned later on is to be obtained.

The light beams emerging from the stop 4213, after unnecessary invisible light beams thereof have been eliminated by the filter 4214 for cutting off the infrared rays and the ultraviolet rays, are incident upon the condenser lens 4215.

The condenser lens 4215, if manufactured of a spherical lens of a normal glass, becomes thick with a large spherical aberration, and therefore what is used is a Fresnel lens that is reduced in weight and in aberration.

The light beams substantially collimated by the condenser lens 4215 are incident on the color separation mirror unit 4216 composed of three pieces of dichroic mirrors. The characteristics of the three dichroic mirrors constituting the color separation mirror unit 4216 are as follows. Assuming that these three dichroic mirrors are designated respectively by 4216R, 4216G, 4216B, the dichroic mirror 4216R reflects only the red light beams of the visible light beams, similarly the dichroic mirror 4216G reflects only the green light beams, and the dichroic mirror 4216B reflects only the blue light beams.

FIG. 43 is a graph showing one example of the characteristics of the three dichroic mirrors constituting the color separation mirror unit 4216.

Curves B, G, R in the graph indicate the characteristics of the reflectance with respect to the light wavelengths of the dichroic mirrors 4216R, 4216G, 4216B. That is, as described above, the dichroic mirror 4216R reflects only the red light beams,; similarly the dichroic mirror 4216G reflects only the green light beams, and the dichroic mirror 4216B reflects only the blue light beams.

FIG. 44 is an explanatory view schematically showing angles at which the three dichroic mirrors constituting the color separation mirror unit 4216 are disposed.

As explained above, the three dichroic mirrors 4216R, 4216G, 4216B of the color separation mirror unit 4216 are disposed making the minute angles each other to separate the incident light beams into those of the three primary colors having the reflecting angles different from each other. To be specific, the dichroic mirror 4216B centered among the three dichroic mirrors 4216R, 4216G, 4216B is disposed to make an angle of 45 degrees to the optical axis of the incident light beams, and on both sides thereof the dichroic mirrors 4216R, 4216G are disposed to make an angle of approximately 2.3 degrees to the dichroic mirror 4216B. The three dichroic mirrors 4216R, 4216G, 4216B are thus disposed, whereby the incident light beams are separated into optical signals of the three primary colors having different angles in the horizontal direction of the liquid crystal panel 4219.

As discussed above, the light beams angularly separated into the three primary colors are, after being polarized by the incidence-side polarizing plate 4216 of the liquid crystal module in FIG. 42, incident on the liquid crystal panel 4218 and the micro lens array 4217 as well.

FIG. 45 is an explanatory view schematically showing a relationship between the micro lens array and the liquid crystal panel. FIG. 45 shows some of cross sections of the micro lens array 4501 and of the liquid crystal panel as well as showing how the light beams are incident on one micro lens of the micro lens array 4501. The liquid crystal panel is constructed of a light incidence-side substrate 4502, a pixel unit 4503 and a light exit-side substrate 4504.

In three primary color light beams R,G,B, R represents the red light beam, G is the green light beam, and B is the blue light beam, which have been angularly separated, are incident upon one image forming element (the micro lens) of the micro lens array 4501 defined as the image forming element array. The three primary color light beams R, G, B are each separately incident upon the aperture formed for every color in the single pixel of the pixel unit 4503 on the liquid crystal panel through the light incidence-side substrate 4502 constituting the liquid crystal panel.

At this time, there is established the following relationship between the thickness t and the refractive index n of the light incidence-side substrate 4502, the pixel pitch Ppexl and the image forming element pitch Plens with respect to the angle difference $\Delta\theta$:

$$Ppexl \approx Plens \approx \frac{3t \cdot \sin(\Delta\theta)}{\sqrt{n^2 - \sin^2(\Delta\theta)}} \qquad \text{(Formula 1)}$$

The thus color-separated light beams pass respectively through the corresponding color apertures and emerge from the light exit-side substrate 4504. Then, the light beams penetrate the exit-side polarizing plate 4220 in FIG. 42, thereby forming color images. The color images are projected in enlargement on the screen through the field lens 4221 and the projection lens 4222, and the display on the large screen is thus attained.

Incidentally, one of the problems inherent in the projection type display device may be such that a non-uniform display tends to easily occur. A cause of this problem lies in a difficulty of reducing the irradiated light beams off the display unit of the liquid crystal panel when converging the light beams from the lamp as the light source on the liquid crystal panel, and a difficulty of brightening even the edge areas of the display unit by irradiating the light beams as in the case of the central area.

FIG. 46 is an explanatory view schematically showing an incident luminance upon the liquid crystal display panel of the projection type display device.

When using a normal light source, the luminance is gradually decreased as it approaches a circumferential area of the illumination. Therefore, if used to get only the portion having a high uniformity of the luminance applied to the display panel as shown in FIG. 46A, the efficiency declines with a large futility of the light of the circumferential area. On the other hand, as shown in FIG. 46B, when reducing the light beams leaking outside the display panel, the circumferential area of the display region gets very dark, resulting in an increase in ununiformity of illuminance or of luminance. Further, the fact that the display unit normally takes a square shape is one of the causes to make it hard to converge the light beams.

As a mechanism for obviating the problems in terms of the illumination efficiency and the ununiformity of luminance described above, an illumination device using a pair of lens array has been proposed and employed.

FIG. 47 is a view schematically illustrating a construction of the illumination device using the pair of lens arrays.

In this illumination device, the illumination light beams are incident upon a first lens array 4701 and split into fluxes of light beams, the number of which corresponds to the number of lenses of the first lens array 4701. The light beams emerging from the respective lenses of the first lens array 4701 are incident upon the corresponding lenses of the second lens array 4702, and a display panel 4703 such as a liquid crystal panel, etc. is irradiated with the light beams merging from the respective lenses of the second lens array 4702.

A configuration of each lens of the first lens array 4701 is set analogous to the configuration of the display surface of the liquid crystal panel 4703. Then, a focal length of the second lens array 4702 is set so that the configuration of each lens of the first lens array 4701 is projected in substantially the same size as the display panel 4703, on the surface of the display panel 4703. It is therefore feasible to attain the high-efficiency illumination uniformly on the entire liquid crystal display surface.

FIG. 48 shows an example of the display device including the illumination device using the two lens arrays.

The light beams from a lamp 4801 are converged at a first lens array 4804a through an infrared/ultraviolet rays cut filter. The first lens array 4804a splits the light beams into a configuration analogous to the display panel and converges the light beams at a second lens array 4804b. The second lens array 4804b projects the light beams emerging from the individual lenses of the first lens array 4804a upon a display panel 4807. A condenser lens 4805 and a polarizing plate 4806 are disposed in front of the display panel 4807, whereby the light beams from the second lens array 4804b are substantially collimated and polarized, and then incident on the liquid crystal panel 4807. The light beams, a polarized state of which is modulated by the liquid crystal panel 4807, are modulated in light intensity by the polarizing plate 4808 and thus converted. The thus converted light beams are then projected through a field lens 4809 and a projection lens 4810.

There arises, however, a problem inherent in the light source using the lens array, wherein it is a difficulty to apply it to the display panel of such a type as to use the image forming element array. The reason why so is that angles of the light beams incident on the display panel get discrete in a multiplicity of directions, resulting in an extremely large angle distribution of the light beams from the light source.

FIG. 49 is an explanatory diagram in which an angle distribution of the exit light beams in a normal illumination optical system is displayed on the plane having an azimuth angle φ and an inclined angle θ of the incidence angle upon the display panel. FIG. 50 is an explanatory diagram in which an angle distribution of the exit light beams in the illumination device using a (3×5) lens array is displayed on the plane having the azimuth angle φ and the inclined angle θ of the incidence angle upon the display panel.

In the case of the normal illumination optical system shown in FIG. 49, there is shown a one-block distribution spreading with a state-of-vertical-incidence portion centered on the display panel. Contrastingly in the case of the illumination device using the lens array shown in FIG. 50, the light beams merging from the respective lenses of the lens array are angularly separated, and hence, if a light quantity remains unchanged, an entire distribution range is broadened in principle.

When the light beams are converged at the pixel aperture by the image forming element such as a micro lens, etc., disposed in the vicinity of the pixel on the display panel, a distance between the image forming element and the pixel aperture is restricted by a size of the angle distribution of the incidence light beams.

FIGS. 51A and 51B are explanatory views each schematically showing a maximum distance between the image forming element and the pixel aperture in the case of a small range of the incidence angle distribution of the incident light beams and in the case of a large range thereof.

When an incidence angle θi shown in FIG. 51A is small, a distance t between the image forming element and the pixel aperture can be taken long, and therefore a divergence angle θout through the image forming element also becomes small. In contrast with this, when the incidence angle θi shown in FIG. 51B is large, it is required that the distance t between the image forming element and the pixel aperture be taken short. Accordingly, the divergence angle θout through the image forming element also becomes large. That is, in the case of the illumination device using the lens array, the problem is that the image forming element and the pixel aperture are required to get close, and the divergence angle θout becomes extremely large.

This problem similarly happens both in the case of aiming at an enhancement of the transmissivity through the display panel by the image forming element and in the case of using the image forming element for separating the colors according to the incidence angles. This makes it hard to apply the light source using the lens array to the projection type display device.

Furthermore, it is much harder to combine the light source using the lens array with the liquid crystal panel of the single plate type color display device in such a system as to separate the colors according to the incidence angles.

FIG. 52 is an explanatory diagram in which the angle distribution after being angularly separated into three colors is displayed on the flat surface in the case of the normal illumination optical system. FIG. 53 is an explanatory diagram in which the angle distribution after being angularly separated into three colors is displayed on the flat surface in the case of the illumination device using the lens array. When comparing those angle distributions in FIGS. 52 and 53, it can be understood that the illumination device using the lens array shown in FIG. 53 has the angle distribution much larger than in the case of the normal illumination optical system shown in FIG. 52.

As described above, the light beams wherein the divergence angle by the image forming element is further added to the above angle distribution are incident on the display panel and projected on a display screen through the projection lens. When the light beams having a large divergence angle are incident on the display panel, there might increase a possibility of reducing the light quantity due to an increase in the surface reflection or the like on the display panel. Further, if the display panel is a liquid crystal panel, there must be a nature (visual angle characteristic) in which the display characteristic varies depending on the light angle of the liquid crystal panel, and the use of the light beams having a large divergence angle exerts an adverse influence on the display performance.

Moreover, when projecting an image of the display panel upon the display screen through the projection lens in a state where the light beams having the large divergence angle are incident upon the display panel, there must be needed a projection lens having an extremely small F-number to project the light beams having the large divergence angle. The projection lens with the small F-number is generally expensive and heavy, and hard to reduce the distortion as well as being hard to enhance the resolution in terms of design. This might bring about increases in size and weight of the projection type display device, an increment in costs therefor and a decrease in performance thereof.

Moreover, the optical system using two sets of lens arrays has such a defect that a length of an optical path in the optical system gets elongate in addition to requiring the optical elements taking an intricate configuration, and a set size of the projection type display device increases. Also, the plurality of optical elements incorporated therein lead to an increase in the number of reflecting surfaces and in turn an optical loss, resulting in a decline of efficiency.

SUMMARY OF THE INVENTION

It is a primary object of the present invention, which was contrived to obviate the problems given above, to provide a small-sized inexpensive display device with a high display performance and a short length of optical path, the display device being capable of exhibiting a high light utilizing efficiency of incident light beams upon a pixel aperture, uniformizing a luminance distribution of the incident light beams on a display panel, reducing a divergence angle of the incident light beams, and making proper incident light beams incident on the respective pixels.

It is a secondary object of the present invention to provide a liquid crystal display panel suited for a projection type display device.

It is a ternary object of the present invention to provide a projection type display device which exhibits high display performance.

According to a first aspect of the present invention there is provided a display device for displaying an image, comprising:

a light source;

an image forming element array formed with a plurality of image forming elements for forming images of irradiation light beams emitted from said light source;

a display panel, including two-dimensionally arrayed pixels defined as a unit for controlling an intensity of transmitted light beams, upon which the irradiation light beams are incident; and image displaying means on which the transmitted light beams with the irradiation light beam intensity controlled are projected, wherein light distributing means for splitting and distributing the irradiation light beams to said image forming element array is disposed between said light source and said image forming element array.

The light distributing means is preferably constructed of a lens array consisting of a plurality of lenses, and splits the irradiation light beams according to said plurality of lenses and converges the split light beams. Alternatively, the light distributing means is preferably constructed of an ellipse mirror constructed of two or more different rotary elliptical surfaces, one positions of two focal points of the rotary elliptical surfaces are coincident with the position of the light source.

According to a second aspect of the present invention, there is provided a liquid crystal panel for a display device, comprising:

a light source;

an image forming element array consisting of a plurality of image forming elements for forming an image of illumination light beams emitted from said light source;

a first lens array, constructed of a plurality of first lenses, for splitting the irradiation light beams according to said first lenses and converging the split light beams;

a second lens array consisting of a plurality of second lenses arranged in one or more lines in positions including substantially focal positions at which the irradiation light beams have been split according to said first lenses and converged by said first lens array, said first and second lens array being dispensed between said light source and said image forming element; and image displaying means for displaying the image, wherein pixels defined as a unit for controlling an intensity of transmitted light beams are two-dimensionally arranged to project the transmitted light beams with the irradiation light beam intensity controlled, upon said image displaying means.

According to a third aspect of the present invention, there is provided a projection type display device comprising:

a light source;

a display panel having pixel units capable of controlling a transmissivity or a reflectance, said pixel units being arranged two-dimensionally;

light intensity control means for controlling a light intensity of transmitted light beams by controlling the transmissivity or the reflectance of said display panel;

a reflecting mirror for directing the light beams from said light source toward said display panel; and display control means for projecting the light beams emerging from said display panel upon a screen or a pupil, and performing display by use of the transmitted light beams or the reflected light beams, or an incidence light intensity pattern coming from the pupil, wherein said reflecting mirror includes a convergence mirror constructed of a plurality of elliptical surface reflecting mirrors having a single focal point and a group of focal points of the elliptical surfaces, the focal point on one side is disposed in the vicinity of said light source, and the focal points on the other side are disposed in positions deferent from each other.

BRIEF DESCRIPTION OF THE DRAWINGS

FIG. 1 an explanatory view showing an optical construction of a display device in a first embodiment of the present invention;

FIGS. 2A and 2B are front and sectional views as viewed in a direction perpendicular to the optical axis of a first lens array in the first embodiment;

FIG. 3 a plan view showing a stop in the first embodiment;

FIGS. 14A–14Ca are front and sectional views showing a composite elliptical reflector in the fifth embodiment of the present invention;

FIGS. 16A–16C are front and sectional views showing a second lens array in the fifth embodiment of the present invention;

FIGS. 18A–18C are front and sectional views showing details of the first lens array in the sixth embodiment of the present invention;

FIGS. 33A and 33B are front and sectional views showing a configuration of a concave mirror used in the display device in the sixth embodiment of the present invention;

FIGS. 38A and 38B are front and side views illustrating a reflecting mirror in the seventh embodiment of the present invention;

DESCRIPTION OF THE PREFERRED EMBODIMENTS

Preferred embodiments of a display device according to the present invention will hereinafter be described with reference to the accompanying drawings.

To start with, a principle on which to actualize the display device of the present invention will be explained.

The ways of setting incident light beams exhibiting a discrete angle distribution determined based on a positional relationship between a lamp serving as a light source, a lens array and an image forming element array are as follows:

(1) In the case of a display device of such a type that a color angular separation is not used, an interval of discrete radiation illuminance distribution produced in a pixel aperture on a display panel, is set coincident with or multiplied by an integer of an interval of forming the pixels in at least one direction within the plane formed with the pixel apertures on the display panel on the basis of an incident light beam angle distribution by one image forming element in the image forming element array provided on an incidence surface of the display panel.

(2) Alternatively, the discrete radiation illuminance distributions produced in the pixel apertures on the display panel are uniformized in one direction.

(3) On the other hand, in the case of a display device of such a type as to use the color angle separation, the radiation illuminance distribution of the light beams assuming the same color is set coincident or multiplied by the integer of an interval of forming the pixels corresponding to the color concerned in at least one direction within the plane formed with the pixel apertures on the display panel.

(4) Further, the discrete radiation illuminance distribution of the same color is uniformized in one direction different (not parallel to) from the direction in which the pixels of a different color are arrayed.

(5) Then, in any case, if the discrete illuminance distribution does not turn out to be the interval multiplied by the integer of the interval at which the pixels are arrayed in a direction other than the coincident direction within the plane formed with the pixel apertures on the display panel, a refracting power of the image forming element array in other direction is set weaker than a refracting power in the interval coincident direction. More specifically, there must be set conditions which follow.

Figure 54:
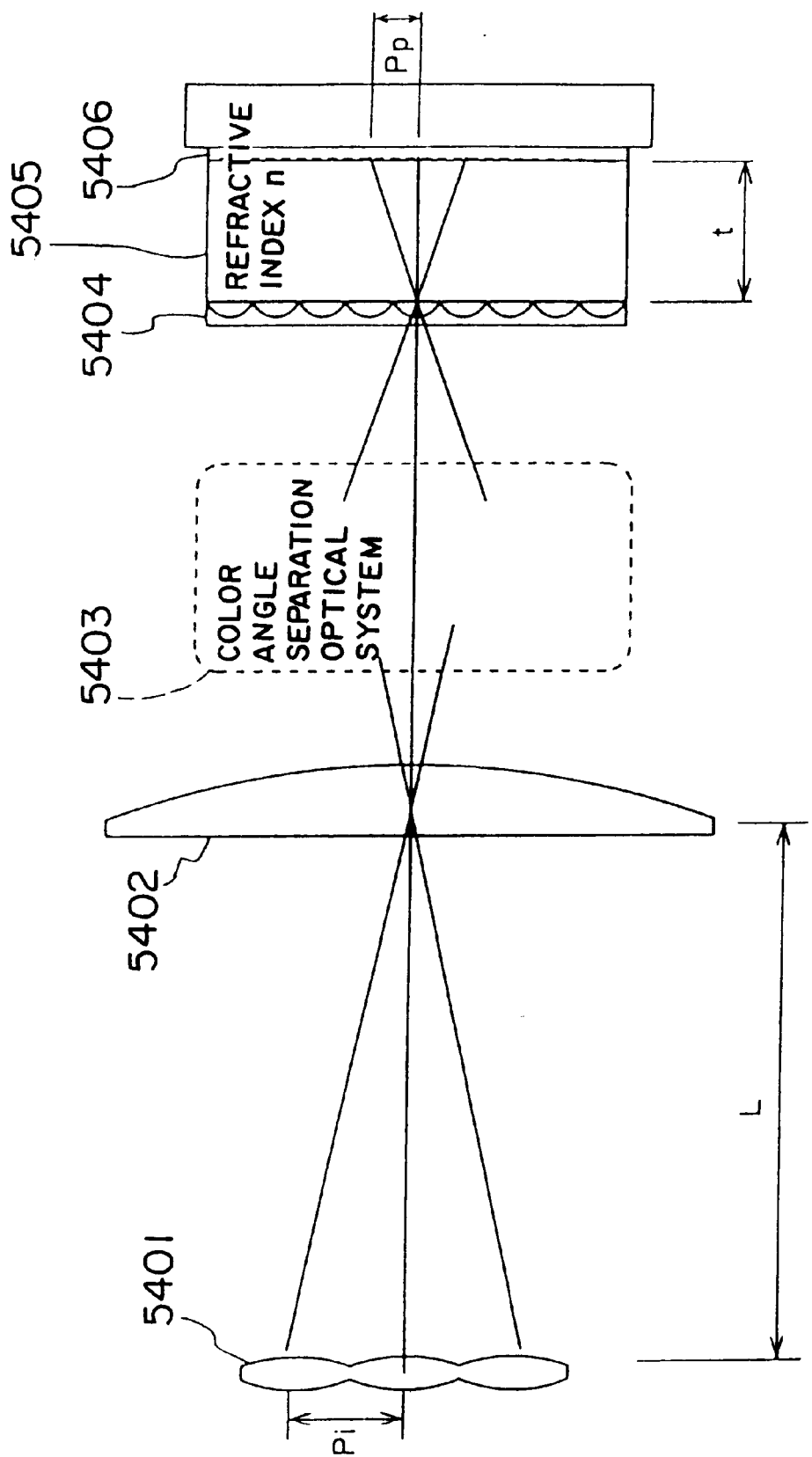
FIG. 54 is an explanatory view schematically showing a relationship between a lens arrangement interval in the lens array, a distance from a condenser lens, a pixel forming interval on the display panel, and a distance between the image forming element array and the pixel aperture in the illumination device using the lens array and in the display panel using the image forming element array.

FIG. 54 is an explanatory view schematically showing a relationship between a lens arrangement interval of the lens array, a distance from a condenser lens, a pixel forming interval on the display panel, and a distance between the image forming element array and the pixel aperture.

The present display device is constructed substantially of a lens array 5401 used for a illumination device, a condenser lens 5402 disposed at a distance L from the lens array 5401, an image forming element array 5404, consisting of micro lenses, upon which the incident light beams emerging via the condenser lens 5402 are incident through a color angle separation optical system 5403, and a pixel aperture aggregation 5406 on the display panel, upon which the incident light emerging via the image forming element array 5404 beams are incident, this pixel aperture aggregation 5406 being disposed with an optical medium 5405 having a thickness t sandwiched in between the image forming element array 5404 and the pixel aperture aggregation 5406.

Figure 47:
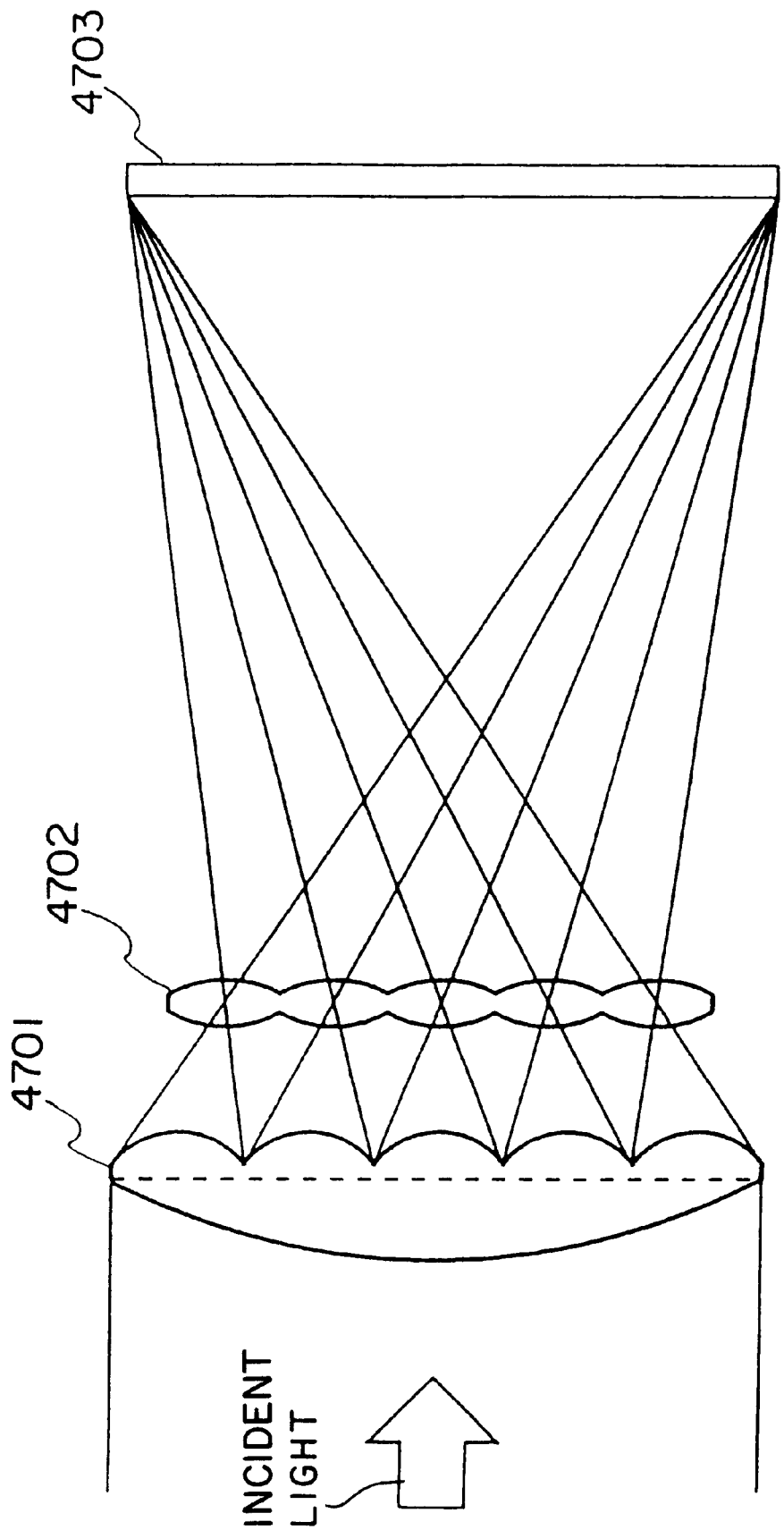
FIG. 47 is a view schematically showing a construction of the prior art illumination device as well as showing the principle for actualizing the uniform illumination by use of a pair of lens array.

The lens array 5401 corresponding to the lens array 4702 shown in FIG. 47 is unnecessary if there is, for example, a sufficiently high parallelism of the light beams incident on the lens array 4701 in FIG. 47. Namely, it is because the light beams of the individual lenses of the lens array closer to the light source, i.e., the lens array 4701 in FIG. 47, are well converged on a display panel 4703 even when the light beams remain as they are. Accordingly, in this case, as a matter of fact, the lens array 5401 in FIG. 54 is also unnecessary. In the following discussion, what serves as the lens array 5401 is a plurality of images of the light source formed by a first lens array disposed closer to the light source.

Now, the following relationship is established:

$$Pp/(n \cdot t) = Pi/L \qquad \text{(Formula 2)}$$

where Pi is the crosswise interval of the individual lenses of the lens array 5401, n is the relative refractive index of the optical medium, and Pp is the crosswise pixel interval on the liquid crystal panel. In fact, however, errors in design and in measurement are to be caused, and hence the condition is not necessarily strictly coincident with the formula 2. It might happen that the condition of the actual disposition is somewhat different from the above ideal condition due to a demand for reducing an aberration.

Even if a position of the pixel aperture deviates by one lens of the lens array 5401 at the maximum, the incident light beam will never be off the position of each pixel aperture, and therefore an allowance permitting a deviation by 1 at both ends can be given to a crosswise inter-lens numeral M of the lenses of the lens array 5401. Then, the following formula is obtained:

$$\frac{Pi(M-1)}{L \cdot M} \leq \frac{Pp}{n \cdot t} \leq \frac{Pi(M+1)}{L \cdot M} \qquad \text{(Formula 3)}$$

Herein, if two quantities of P and P0 are defined as follows:

$$P = Pp/(n \cdot t) \qquad \text{(Formula 4)}$$

$$P0 = Pi/L \qquad \text{(Formula 5)}$$

Then, the formula 2 can be written such as:

$$P = P0 \qquad \text{(Formula 6)}$$

Figure 55:
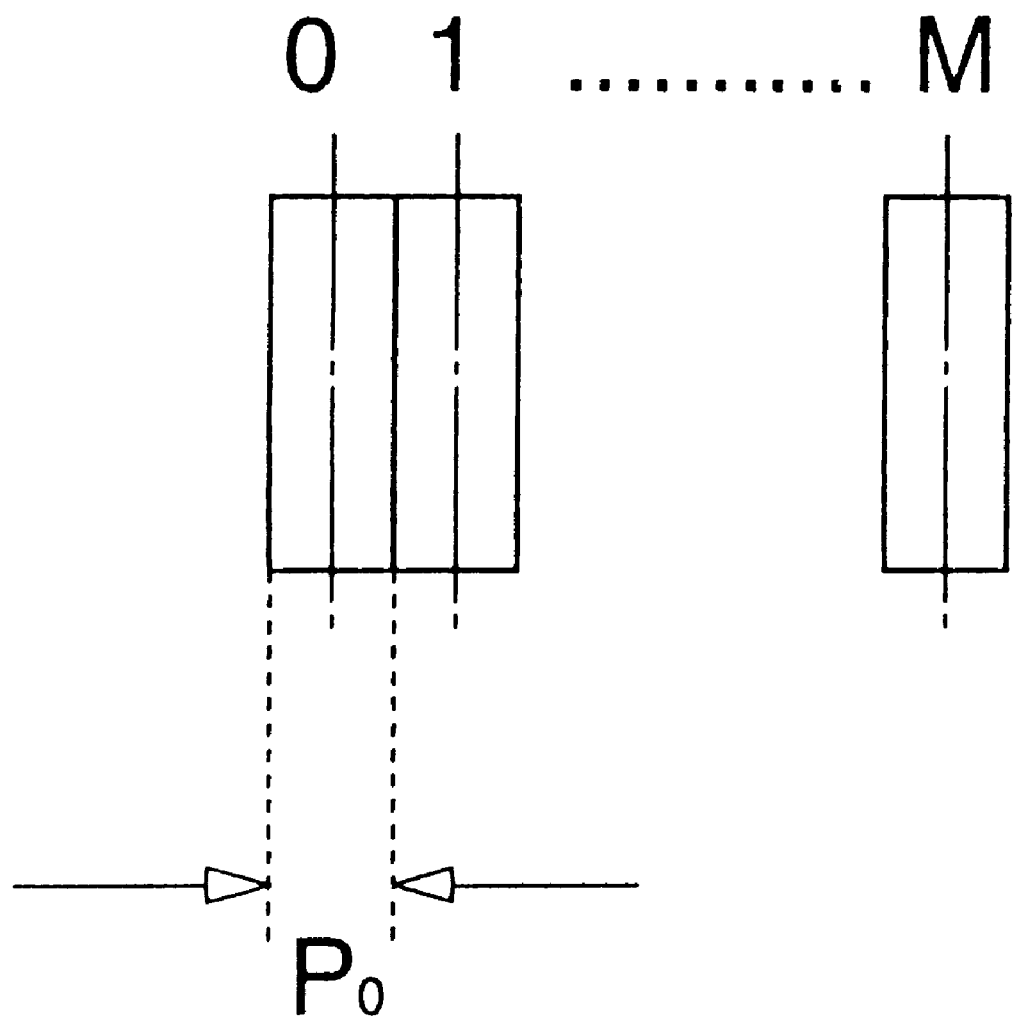
FIG. 55 is a diagram showing a relationship between the pixel interval and the aperture.

This quantity P0 is, as shown in FIG. 55, regarded as a width of each of M-pieces of intervals given by (M+1) pieces of lenses.

Figure 56:
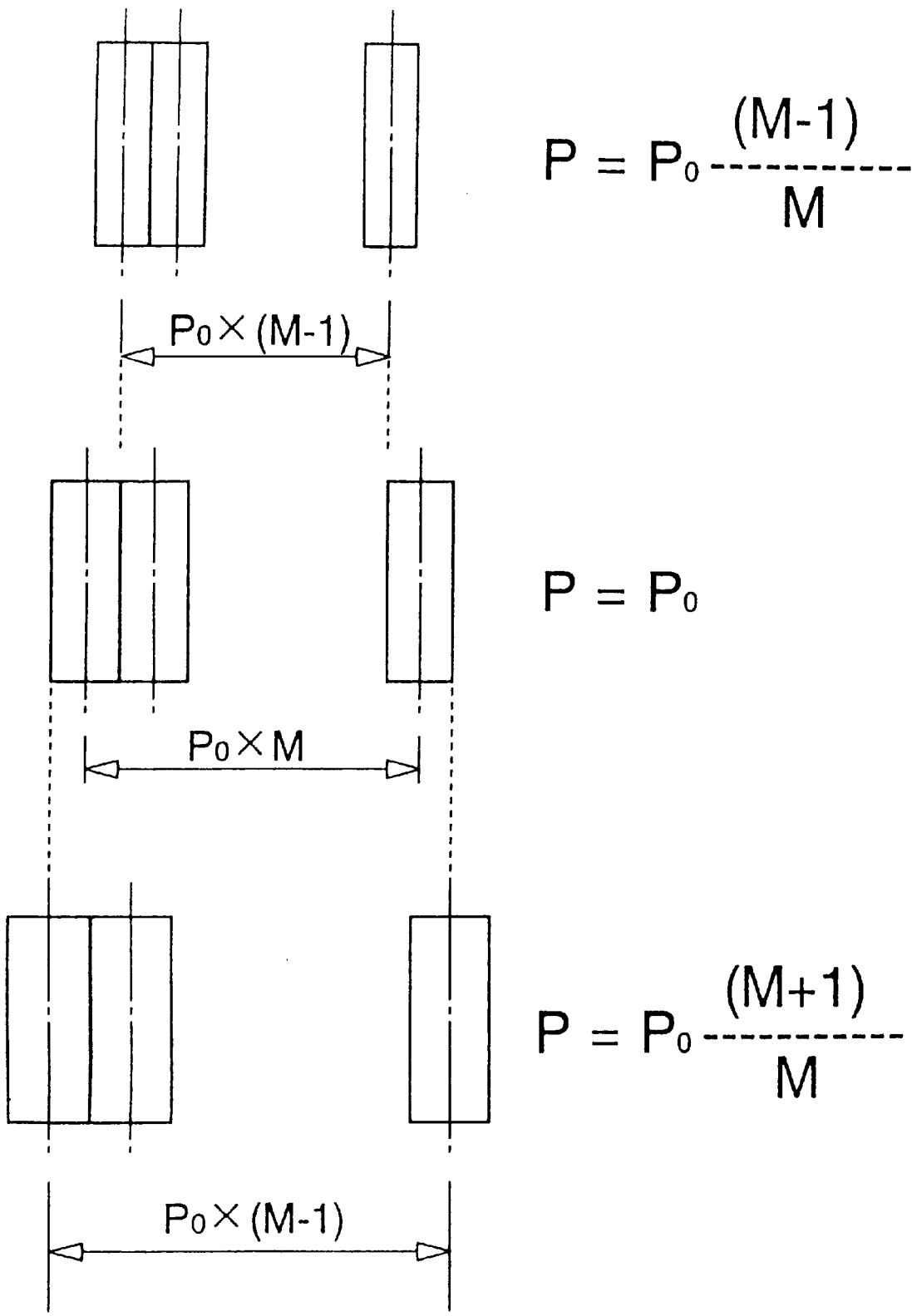
FIG. 56 is a diagram showing a relationship between the pixel interval and the aperture.

Considering a minimum range and a maximum range of P0 at both ends in this Figure, as shown in FIG. 56, if a central width is reduced by P0, what is considered is the following formula:

$$P = \frac{P0(M-1)}{M} \qquad \text{(Formula 7)}$$

If the central width is increased by P0, the following formula is to be considered:

$$P = \frac{P0(M+1)}{M} \qquad \text{(Formula 8)}$$

It can be comprehended that a width of P can be just given at both ends in the case of a width P0 wherein the central position is fiducial in this range. It can be therefore the condition is established even in the range defined by the formula 3.

Alternatively, the problem can be obviated by lining up the lens array 5401 only in the vertical direction (within the sheet surface).

Then, the micro lenses of the image forming element array 5403 may preferably be aspherical lenses, a focal length of which is long enough for a distance t to the pixel aperture aggregation within the section perpendicular to the sheet surface in FIG. 54. Further, the micro lenses may be cylindrical surface lenses having no refracting power within the section perpendicular to the sheet surface in FIG. 54. In addition, in the case of a display device of such a type as to use no color angle separation based on a discrete radiation illuminance two-dimensional distribution occurring in the pixel aperture aggregation 5406 on the display panel, it may be more preferable that the positions of the respective micro lenses of the image forming element array 5404 be coincident with the positions where the pixels are formed. Similarly in the case of the display device of such a type as to use the color angle separation, it may be much more preferable that the positions of the micro lenses of the image forming element array 5404 be coincident with the positions in which to form the pixels corresponding to the same color.

More specifically, in addition to the condition that the interval of the light radiation illuminance distribution is set coincident with the pixel interval in one direction, the layout of the pixel apertures on the display panel is preferably made analogous to the layout of the lenses of the lens array 5401.

If a distortion might occur due to an aberration of the condenser lens 5402, it is desirable that the layout interval of the lens array 5401 be corrected in such a direction as to reversely correct the distortion, with the result that the an angle distribution of the light beams incident upon the image forming element array comes to have a more accurate period.

If a lengthwise/crosswise interval ratio of the layout of the pixel apertures and an aspect ratio of the display screen are different, the light beams emerging from the respective lenses of another lens array arranged between the lens array 5401 and the light source are made incident upon the lens array 5401 having a different layout interval. Besides, the other whole lens array and the while lens array 5401 are required to have refracting powers different in the vertical direction and in the horizontal direction in order to form an image of the incident light beams via the lenses of the other lens array in the vicinity of the image forming element array and the display panel as well as to make the light beams from the lenses of the other lens array disposed between the lens array 5401 and the light source incident upon the lens array 5401 exhibiting the different layout interval.

Examined herein are magnitudes of the refracting powers required of the other lens array and the lens array 5401. When the magnitude of the refracting power is expressed including a code thereof with condensing defined as being positive and diverging defined as being negative, the refracting power of the other lens array and the refracting power of the lens array 5401 are respectively set as follows.

The display screen of the display panel takes a shape having a ratio of the verticality VF and the horizontality HF, and the layout interval of the pixel apertures is VP lengthwise and HP crosswise. In this case, the shape of the lenses of the other lens array take a configuration of a ratio of the verticality VF and the horizontality HF, and the layout interval of the respective lenses of the lens array 3001 is VP lengthwise and HP crosswise.

Hence,

VF/HF<VP/HP

In this case, it is required that the refracting power of the other whole lens array in the vertical direction be smaller than that in the horizontal direction, and that the refracting power of the whole lens array 5401 in the vertical direction be larger than that in the horizontal direction.

In contrast,

VF/HF>VP/HP

In this case, it is required that the refracting power of the other whole lens array in the vertical direction be larger than that in the horizontal direction, and that the refracting power of the whole lens array 5401 in the vertical direction be smaller than that in the horizontal direction.

As described above, if the radiation illuminance distribution is coincident with the position of each of the micro lenses of the image forming element array 5404, the aspherical lens exhibiting a different refracting power in every direction is applicable as the micro lens of the image forming element array 5404. Besides, it is possible to apply spherical lenses, the refractive powers of which are coincident in all directions.

Further, an exit surface of the lens array 5401 may be provided with a stop. For instance, if set so that the pixel aperture transmits the light beam emerging from the center of each lens of the lens array 5401, there might often come out such a condition that the light beam from an inter-lens boundary of the lens array 5401 is unable to pass through the pixel aperture, and there might a high possibility of causing a drawback such as emitting the heat due to the fact that the light beams from the above lens boundaries are absorbed by the display panel portion.

Moreover, in the case of the display device of such a type as to perform color display based on the angle separation, the light beam emerging from a certain portion of the lens of the lens array 5401 has a larger angle distribution than a separation angle of the angle separation, and hence this might presumably hinder the color separation. This hindrance of the color separation happens when the light of a given color is incident on the pixel aperture adjacent to the pixel aperture corresponding to that color if the pixels have, e.g., three apertures corresponding to three primary colors. This condition varies depending on a width of the pixel aperture. A minimum condition required not to cause the hindrance of the color separation may be such that a width of the incident light angle distribution for one color is equal or smaller than a width of two pixel apertures.

Figure 57:
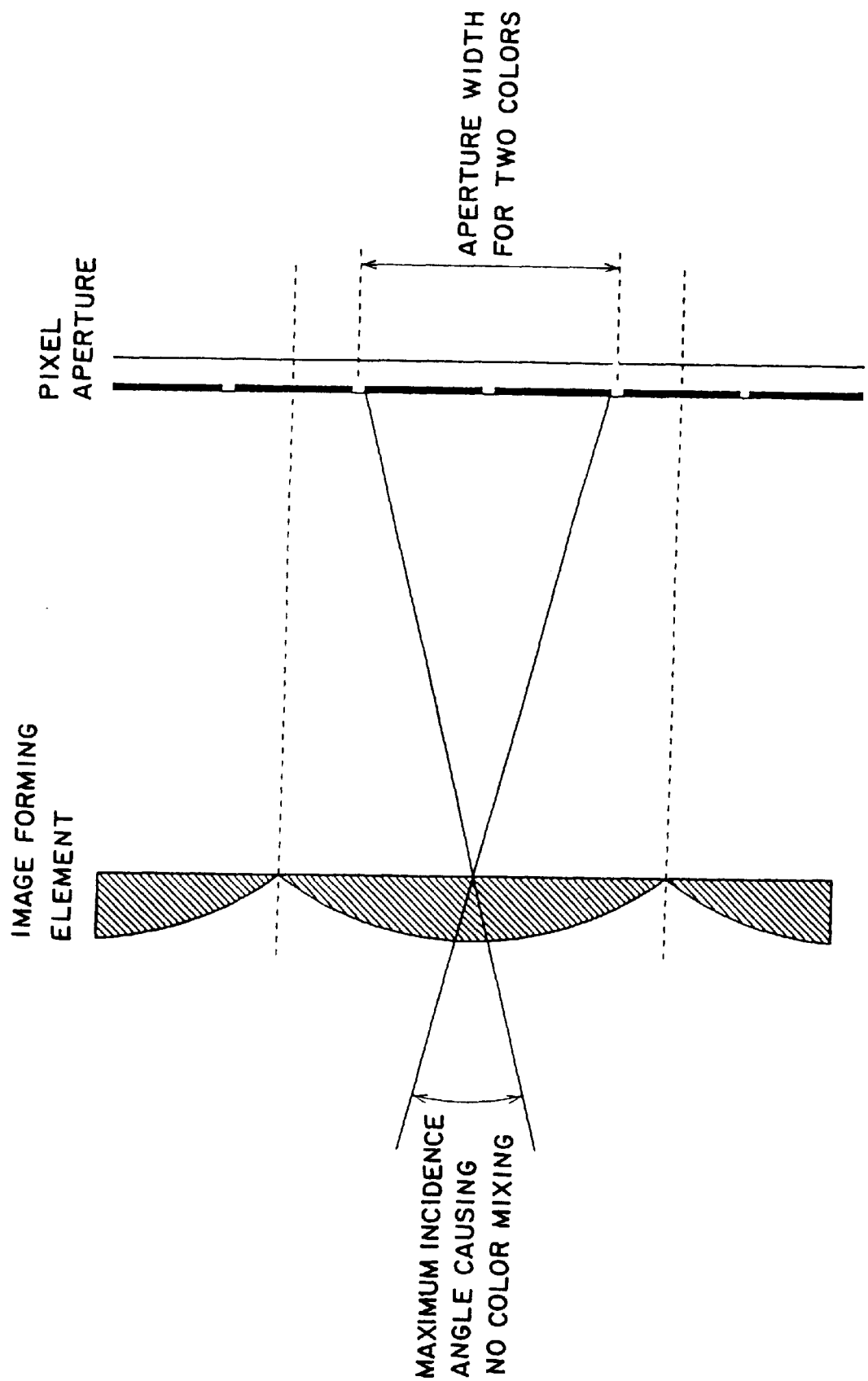
FIG. 57 is an explanatory view schematically showing a condition of the incident light beams for preventing an occurrence of an obstacle against the color separation.

FIG. 57 is an explanatory view schematically illustrating an incident light condition for preventing the occurrence of the hindrance of the color separation. If the pixel aperture corresponding to each color is extremely small, as shown in FIG. 57, color mixing never happens when the width of the angle distribution of the incident light beams for one color falls within the width of the two pixel apertures. This condition is a condition corresponding to the fact that the lens width on the exit surface of the lens array 5401 is restricted down to ½.

If the stop is disposed in the vicinity of the lens array 5401 to satisfy this condition, the exit width thereof may fall within the width of the two pixel apertures when each pixel is provided with N-pieces of aperture. Therefore, the condition given by the following formula may be met:

$$Pi\frac{2}{N} < Ws \qquad \text{(Formula 9)}$$

Furthermore, there is proposed another method for eliminating disadvantages of an above-mentioned optical system which employs two lens arrays that a plurality of ellipse mirrors as light distribution means collect and synthsize light from a light source. More specifically, by disposing one of two focuses of each mirror in the proximity of the light source and by disposing at least one of the other focuses in a different position, the light from the light source is separated into a plurality of secondary light sources and as a result a uniform display similar to the use of two sets of lens arrays can be obtained. Especially, by providing a lens array including a plurality of lenses each of which is disposed in respective position of the corresponding secondary light source, since each lens collects respective light of the secondary light sources, illumination efficiency can be increased.

Embodiments of the display device according to the present invention will hereinafter be specifically discussed.
(First Embodiment)

FIG. 1 is an explanatory view illustrating an optical construction of the display device in a first embodiment of the present invention, wherein the construction of the present invention is applied to a single plate type color display device using the image forming element array. The image forming element array involves the use of a micro lens array, and a plurality of dichroic mirrors arranged at different angles to separate the light beams falling upon the image forming elements into three colors corresponding to the angles.

An elliptical reflector 111 formed with apertures on a light irradiation side is disposed around a metal halide lamp 110 serving as a light source for emitting irradiation light beams. A filter 112 for cutting off infrared rays and ultraviolet rays and a lens array 113 are provided at the aperture aggregation of the elliptical reflector 111. The metal halide lamp 110 is disposed substantially in a focal position of the elliptical reflector 111. A stop 121 for cutting off the light beams coming from between the lenses in the horizontal direction as well for controlling a light angle distribution is disposed in a position at which the irradiation light beams from the respective lenses of the lens array 113 are converged. Disposed in sequence on the light exit side of the stop 121 are a condenser lens 115 and a color separation mirror unit 116 consisting of three pieces of dichroic mirrors 116R, 116B, 116G. The color separation mirror unit 116 is disposed in such a manner that the three dichroic mirrors 116R, 116B, 116G mutually make slight angles to separate the incident light beams into light beams assuming three primary colors, having reflecting angles different from each other.

A liquid crystal module constructed of an incidence-side polarizing plate 122, a micro lens array 117, a liquid crystal panel 118 and an exit-side polarizing plate 123 that are arranged in this sequence, is disposed in a position where the light beams separated into the three primary colors by the color separation mirror 116 are reflected upon. A field lens 119 and a projection lens 120 are disposed on the exit side of the liquid crystal module. Further, an actual construction entails a screen on which to form an image projected by the projection lens 120. This constructive portion is, however, omitted in illustration on the drawings.

Next, an operation based on this construction will be explained. The light beams emitted from the metal halide lamp 110 disposed substantially in the focal position of the elliptical reflector 111 are converged by the elliptical reflector 111 toward the other focal position of an elliptical body partly constituted by the elliptical reflector 111. Those converged light beams, however, penetrate the filter 112 for cutting off the infrared rays and the ultraviolet rays, and are incident upon the lens array 113 disposed closer to the metal halide lamp 110 than the other focus mentioned above.

FIGS. 2A and 2B show a structure of the lens array 113. FIG. 2A is a front view of the lens array 113 as viewed in a direction perpendicular to the optical axis thereof. FIG. 2B is a sectional view taken along the line AB in FIG. 2A.

Each of the lenses of the lean array 113 takes a square shape having a 9-to-16 aspect ratio of an analogous form to the display surface of the liquid crystal panel 118. The lens array 113, as can be understood from the sectional configuration shown in FIG. 2B, deflects a traveling direction of the light beams converging toward the other focal position of the elliptical body partly constituted by the elliptical reflector 111 more outwardly enough to weaken the light convergence through the respective lenses, thus shifting the converging position from the above-mentioned other focal position.

A plurality of lamp images, the number of which is equal to the number of the lenses of the lens array 113, are formed, and an illuminance distribution is produced in the light converging position. At this time, it is required that the lens array 113 be designed to substantially equalize intervals between the lamp images adjacent to each other and to minimize mutually overlapped portions of the lamp images. Note that the interval between the lamp images is set to 18.5 mm in the first embodiment.

FIG. 3 is a front view showing the stop 121. The stop 121 functions to cut off the light beams emerging from between the lamp images formed by the first lens array 113 and separate the lamp images.

Incidentally, the crosswise separation is essential, whereas the lengthwise separation is not needed in the first embodiment. It is desirable not to cut off the light beams between the lamp images for the purpose of increasing the transmitted light beams as much as possible in the vertical direction. This being the case, the stop has vertically extended slits.

A width of the slit is required to be 12.3 mm (=18.5×⅔) or under according to the formula 4. In the first embodiment, the slit width is set to 5.3 mm in consideration of the pixel aperture width and an assembly margin as well.

The condenser lens 115 is a Fresnel convex lens having a focal length of 150 mm. As the interval between the lamp images through the first lens array 113 is 18.5 mm, the light beams emerging from the condenser lens 115 are split at three angles with an angular difference of approximately 7 degrees. The light beams emerging from the condenser lens 115 are incident upon the color separation mirror unit 116.

The color separation mirror unit 116 is, as illustrated in FIG. 1, constructed of the three dichroic mirrors 116R, 116G, 116B. Reflecting characteristics of the three dichroic mirrors 116R, 116G, 116B are the same as those of the three dichroic mirrors shown in FIG. 43. Curves B, G, R in the graph of FIG. 43 respectively indicate characteristics of reflectance with respect to light wavelengths of the dichroic mirrors 116R, 116G, 116B. The dichroic mirror 116R reflects only the red light among the visible light beams. Similarly, the dichroic mirror 116G reflects only the green light, and the dichroic mirror 116B reflects only the blue light.

Figure 4:
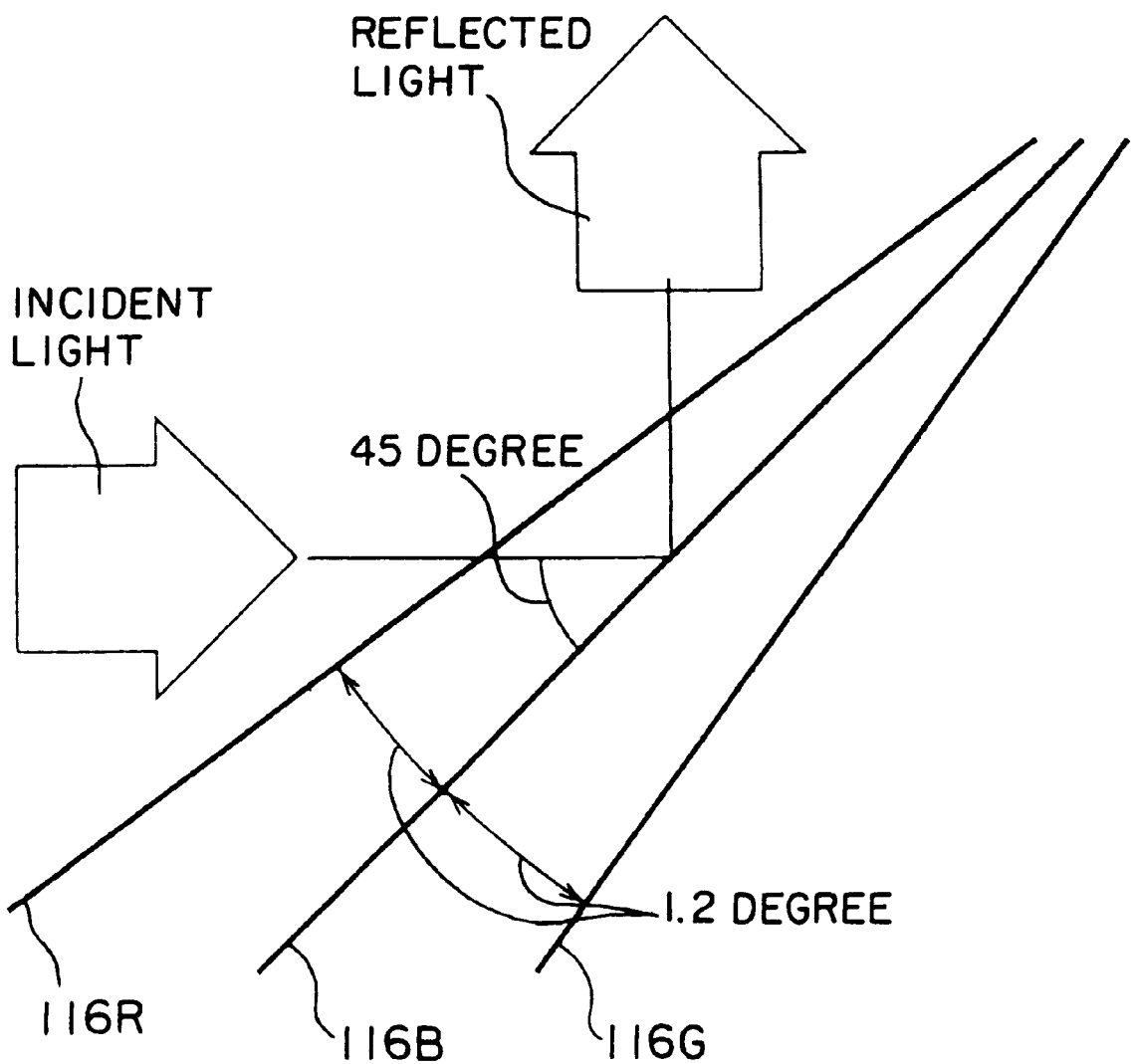
FIG. 4 is an explanatory view schematically showing angles at which to dispose three dichroic mirrors constituting a color separation mirror unit in the first embodiment.

FIG. 4 is an explanatory view schematically showing angles at which to dispose the three dichroic mirrors 116R, 116G, 116B constituting the color separation mirror unit 116.

Referring to FIG. 4, the color separation mirror unit 116 separate the incident light beams into the light beams of the three primary colors, which have the reflecting angles different from each other, and, for this purpose, the three dichroic mirrors 116R, 116G, 116B are so disposed as to mutually make the slight angles. In accordance with the first embodiment, the dichroic mirror 116B positioned in the middle of the three dichroic mirrors 116R, 116G, 116B, is disposed to make an angle of 45 degrees to the optical axis of the incident light beams. On both sides of the dichroic mirror 116B, the dichroic mirrors 116R, 116G are disposed to respectively make an angle of approximately 1.2 degrees to the dichroic mirror 116B.

The three dichroic mirrors 116R, 116G, 116B are thus arranged, whereby the incident white light beams are reflected after being separated into optical signals of the primary colors, which are separated at an angular interval of 2.3 degrees in the horizontal direction of the liquid crystal panel 118.

As described above, the light beams that have been angle-separated into the three primary colors are polarized by the incidence-side polarizing plate 122 of the liquid crystal module shown in FIG. 1, and thereafter fall on the micro lens array 117 and the liquid crystal panel 118 as well. These light beams further pass through the exit-side polarizing plate 123 and the field lens 119, and are thereafter projected on the display screen by the projection lens 120.

A state of the incidence of the light beams upon the liquid crystal panel 118 from the micro lens array 117 is that only the predetermined primary color light beams are incident upon the predetermined pixels on the liquid crystal panel through the micro lens array from the light source according to the present invention.

Figure 5:
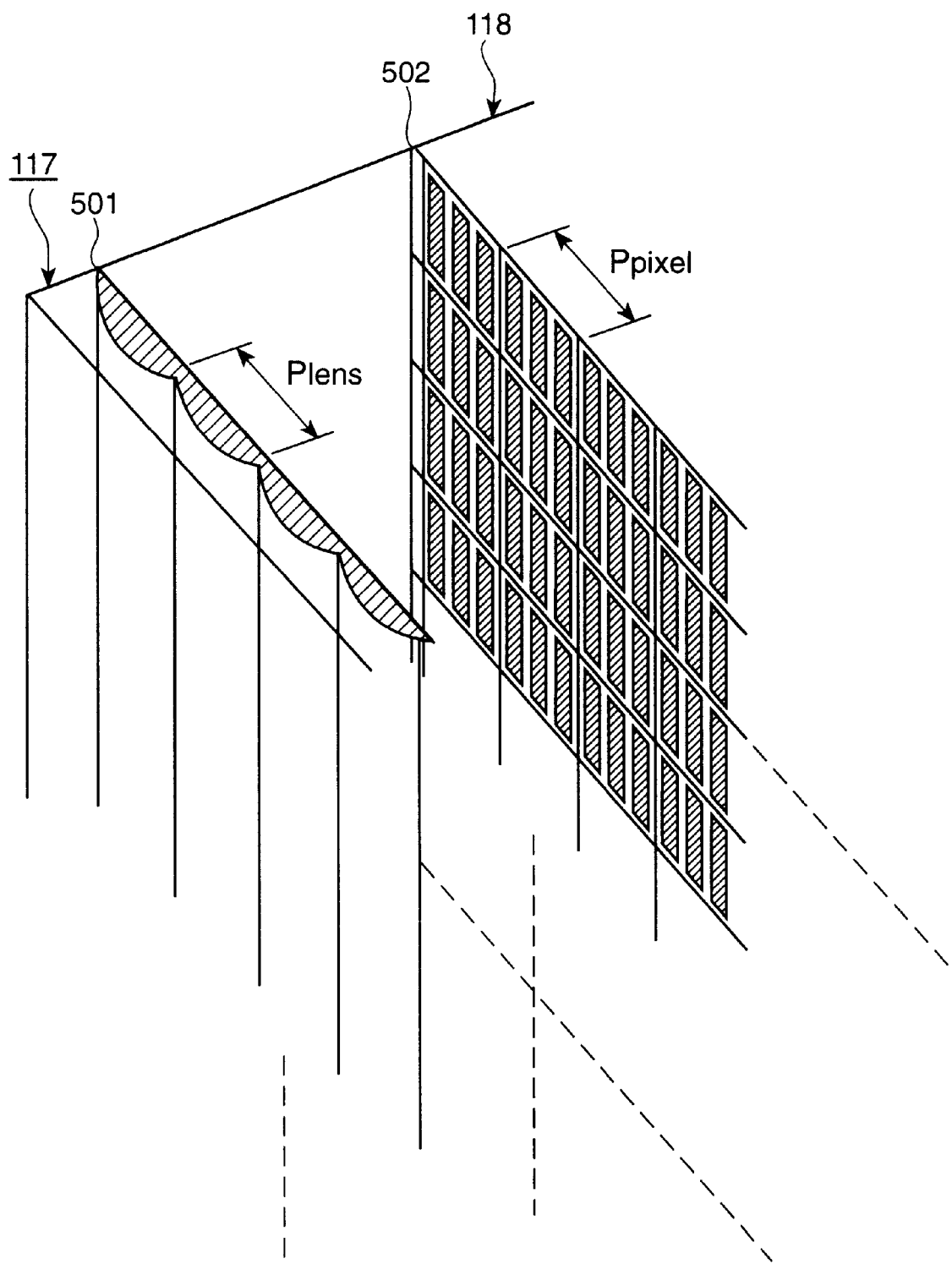
FIG. 5 is a partially enlarged view showing configurations of a micro lens array and a liquid crystal panel in the first embodiment.

FIG. 5 is a partially enlarged view showing configurations of the micro lens array 117 and the liquid crystal panel 118.

The micro lens array 117 in FIG. 1 is, as illustrated in FIG. 5, a micro lens array 501 taking such a configuration that a plurality of cylindrical surface lenses are arranged in parallel without any gaps, wherein an interval Plens of this arrangement is equalized to an interval Ppixel of an arrangement of a pixel aperture aggregation 502 grouped for the three primary colors.

In the first embodiment, as illustrated in FIG. 5, the pixel apertures allocated to the three primary colors are arranged in parallel. As will be explained later on, the separation angles by the micro lens array in the thus arranged crosswise direction are set to angles for the three colors. That is, in this example, the crosswise separation angle by the micro lens array is set three times as large as the separation angle of the dichroic mirror defined as the color separation element, whereby the same color light beams passing through the plurality of micro lenses are incident upon the predetermined pixels.

Accordingly, as for even the white light beams angularly separated by the lens array, the light beams assuming the predetermined color can be made incident upon the predetermine pixels by use of the angle separating device.

Further, the lengthwise illuminance distribution produced due to the lengthwise angle separation through the lens array is moderated by elongating the focal length of the micro lenses or by forming no image in the vertical direction orthogonal to the horizontal direction defined as the color angle separating direction, thereby preventing the light beams from concentrating on the light shielding portions for sectioning in the vertical direction on the display panel. Besides, it is feasible to reduce the angle of the lengthwise light beam emerging from the micro lens.

In the example shown in FIG. 5, the micro lens array 501 involves the use of the cylindrical surface lenses, whereby the images are not formed in the vertical direction. Herein, one cylindrical surface lens is formed as an image forming element for three pixel apertures. Referring to FIG. 5, there are shown continual vertical sections of the image forming elements, and hence it also appears that the single image forming element corresponds to a string of three pixel apertures. This does not, however, deviate from the gist of the present invention.

Figure 6A:
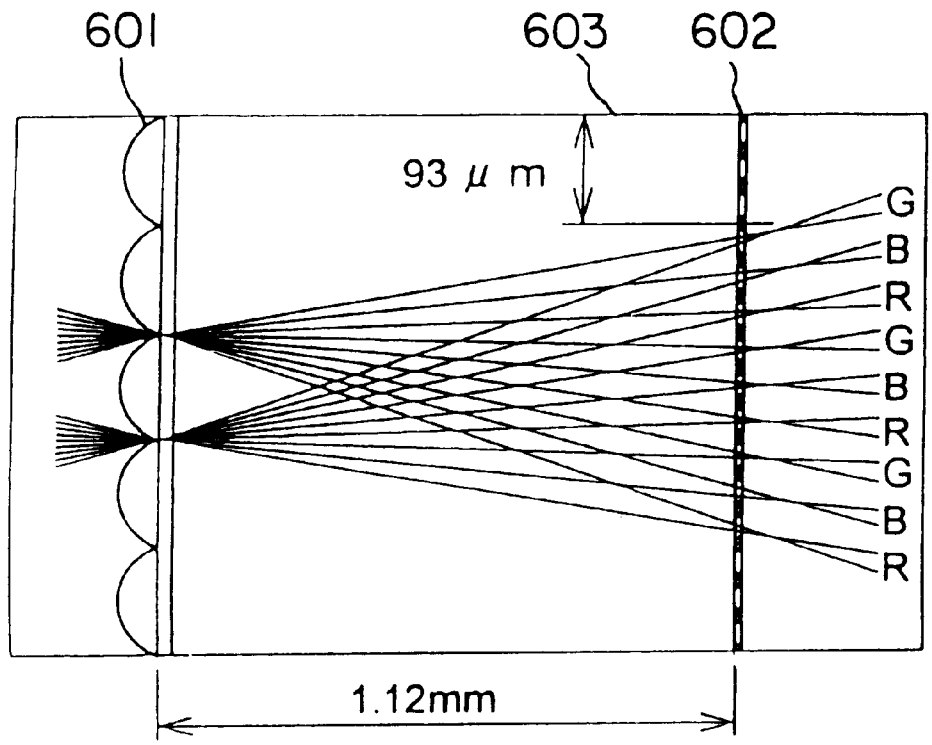
FIGS. 6A and 6B are cross sectional views illustrating a constructive portion between an incidence-side polarizing plate and an exit-side polarizing plate of a liquid crystal module.
Figure 6B:
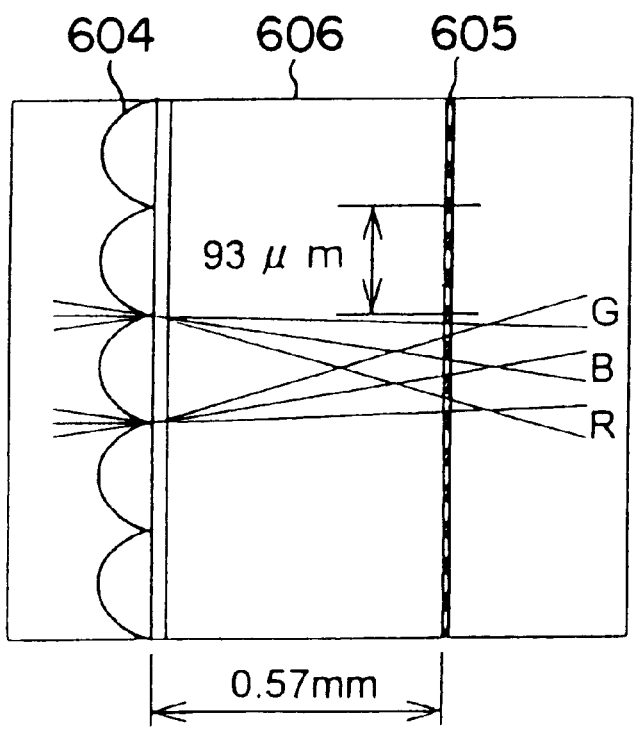

FIGS. 6A and 6B are crosswise sectional views showing constructive portions between the exit-side polarizing plate and the incidence-side polarizing plate of the liquid crystal module. FIG. 6A shows the relevant of the display device according to the present invention. FIG. 6B shows the portion concerned of the prior art display device. The numerals 601, 604 represent micro lens arrays. The numerals 602, 605 denote pixel apertures, and the numerals 603, 606 designate light incidence-side substrates.

In the display device of the present invention shown in FIG. 6A, nine beams of light are incident at an interval of 1.2 degrees upon the micro lens array 601 through the lens array 113 and the color separation mirror 116 in FIG. 1.

In the first embodiment, a zone between the micro lens array 601 and a pixel aperture surface 602 of the light crystal element is set to 1.12 mm. An area occupying 1.10 mm of this 1.12 mm zone corresponds to a glass substrate (Corning 7059™) provided with an opposite electrode that constitutes a liquid crystal cell, and remaining 0.02 mm area is an acrylic series bonding agent. A synthetic refractive index thereof is approximately 1.52, and each light split angle after penetrating the micro lens array 601 becomes approximately 1.5 degree according to the Fresnel's law, and the respective nine beams of incident light are incident at an interval of 31 μm upon a pixel aperture aggregation 702.

Accordingly, as shown in FIG. 6A, it follows that the light beams incident on one micro lens of the micro lens array 601 fall on three strings of pixels. Further, if viewed from the pixel side, it follows that the light beams from three rows of micro lenses are incident thereon.

On the other hand, in the prior art display device shown in FIG. 6B, the single beam of incident light is split into three beams of light at every angle of 2.3 degrees by the dichroic mirror, and these light beams are incident on the pixel aperture aggregation 605 via the micro lens array 604 and the light incidence-side substrate 606. There is no alternative but such an arrangement that a distance between the micro lens array 604 and the pixel aperture aggregation surface 605 of the liquid crystal element is set as short as 0.57 mm. The light incidence-side substrate 606 used herein must be appropriate in thickness to fall within this distance. Further, the light beams incident on the single micro lens of the micro lens array 604 fall on only one string of pixels, and, as viewed from the pixel side, only the light beams emerging from a single row of micro lenses are incident thereon.

As discussed above, in the display device of the present invention, the light beams separated into the three primary colors on the liquid crystal panel are incident on the pixels driven by image signals indicating brightness of the three primary colors on the liquid crystal panel, whereby the color display can be actualized.

Figure 42:
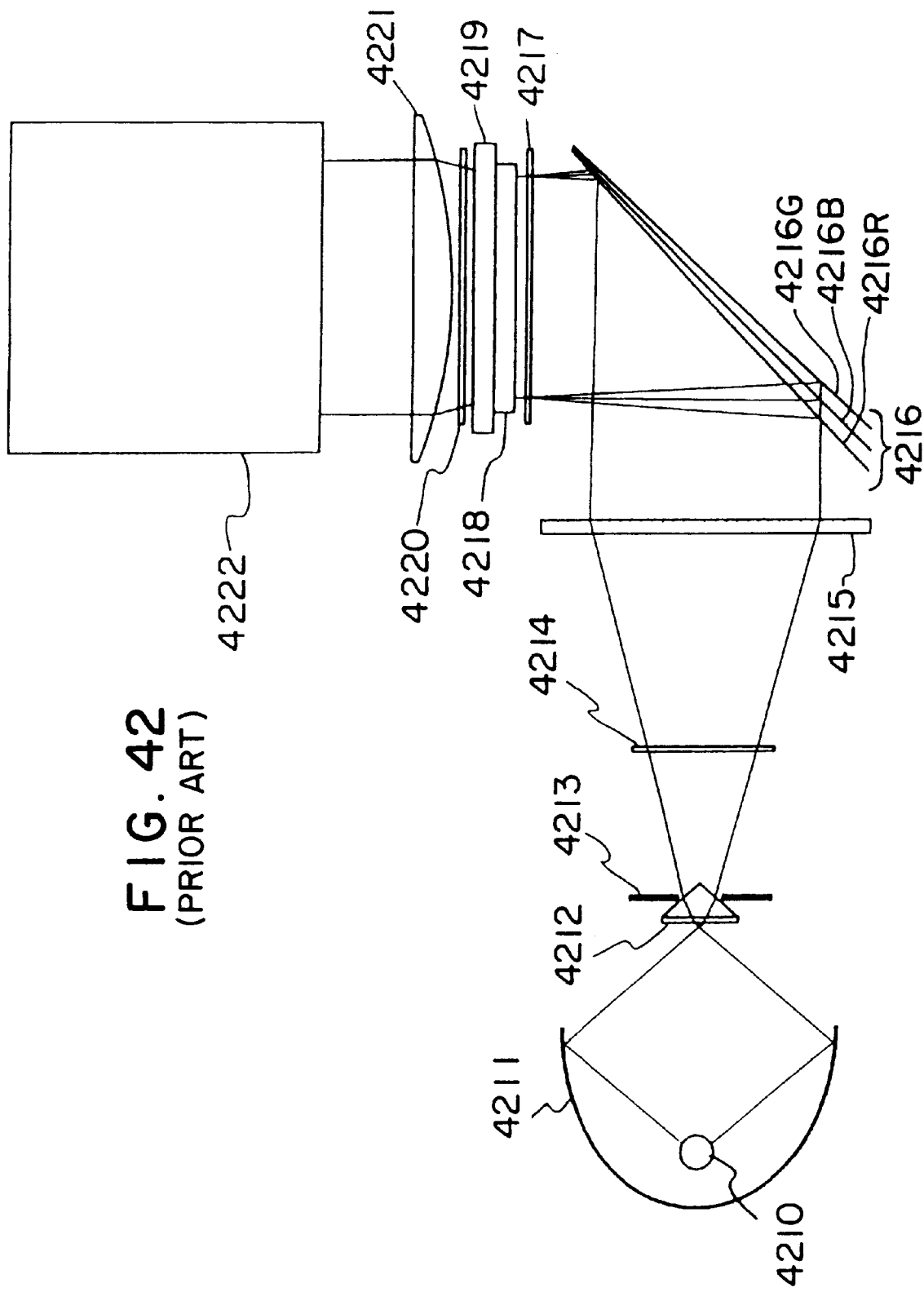
FIG. 42 is an explanatory view showing an optical construction of the single plate type color display device for the display in colors by use of a plurality of dichroic mirrors disposed at different angles from those in the micro lenses, using the image forming element array.

The display device described so far in the first embodiment of the present invention is evaluated in terms of its effects as compared with the prior art single plate type display device illustrated in FIG. 42.

The uniformity of the display is evaluated based on a maximum-to-average ratio of a maximum value of measured values at nine points to an average value of the 9-point measured values, which involves previously dividing the projection screen into nine segments and measuring illuminances of centers of these segments. Namely, this implies that the higher uniformity is obtained as the above value approximates "1".

The above value is 1.6 in the prior art single plate type display device, and there is obtained a value as preferable as 1.4 in the display device in the first embodiment of the present invention.

Furthermore, as for the brightness of the display, a light flux emerging from the projection lens is obtained as an evaluation value on the basis of the above-mentioned 9-point average illuminance and the display area as well. The brightness is 180 lumens in the prior art single plate type display device, and is 200 lumens enhanced by approximately 10% in the display device in the first embodiment of the present invention. This enhancement is, it can be regarded, attributed to the fact that a spherical aberration, etc., of the micro lens can be reduced owing to the elongated focal length of the micro lens other than the effect of decreasing the angle of divergence because of splitting the incident light emitted from the light source.

Also, the present invention exhibits the following remarkable effects in terms of its construction as well as in the manufacturing process.

Although the construction of the liquid crystal panel of the prior art display device is shown in FIG. 6B, the light incidence-side substrate 606 of the liquid crystal panel in the prior art display device is approximately 0.54 mm thick. In contrast with this, the display device in the first embodiment of the present invention is capable of making use of the glass substrate having a thickness of 1.1 mm, which is normally employed as a substrate for the liquid crystal panel. That is to say, in a process of constructing the liquid crystal cells of the prior art single plate type display device, it is more difficult to uniformize the thickness of the liquid crystal layer of the liquid crystal cell because of a reduced thickness of the opposite substrate. Further, there must be changed the way of how conditions for a production apparatus in the constructing process should be changed, and hence there is a drawback to correspondence to the mass production. Whereas in the display device in accordance with the first embodiment of the present invention, the normal liquid crystal cell constructing process can be used, and therefore it is possible to attain the mass production by the conventional manufacturing apparatus as it is and also reduce the costs for the equipment.

(Second Embodiment)

Figure 7:
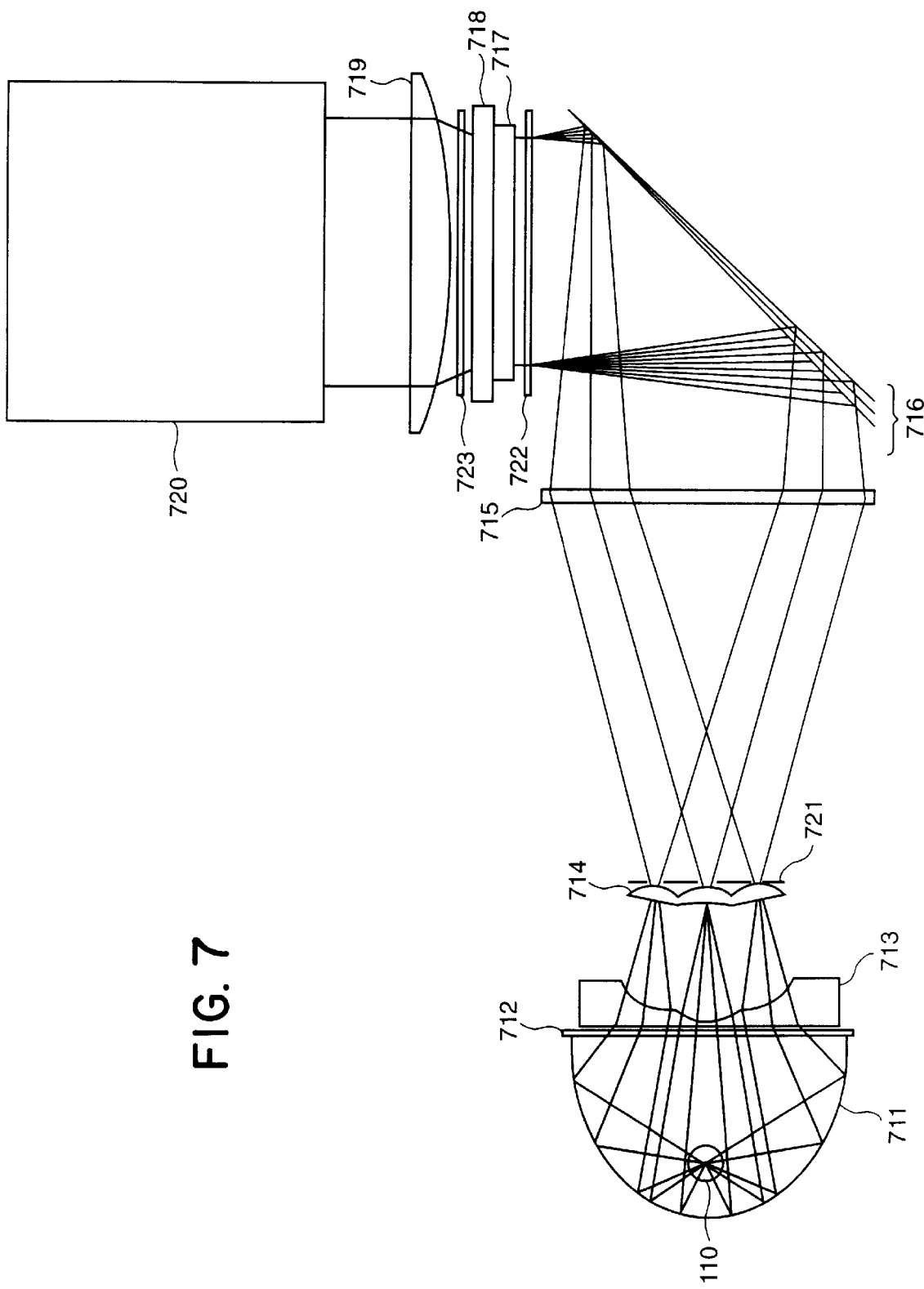
FIG. 7 is an explanatory diagram showing an optical construction of the display device in a second embodiment of the present invention.

FIG. 7 is an explanatory view illustrating an optical construction of the display device in a second embodiment of the present invention. The construction shown in FIG. 7 is substantially the same as that shown in FIG. 1, wherein the reference numerals of the corresponding constructive elements are substantially the same those given above except using numerals of 100's in FIG. 1 and 700's in FIG. 7.

A difference of the second embodiment from the first embodiment is that a second lens array 714 is disposed in front of a stop 721.

Figure 8:
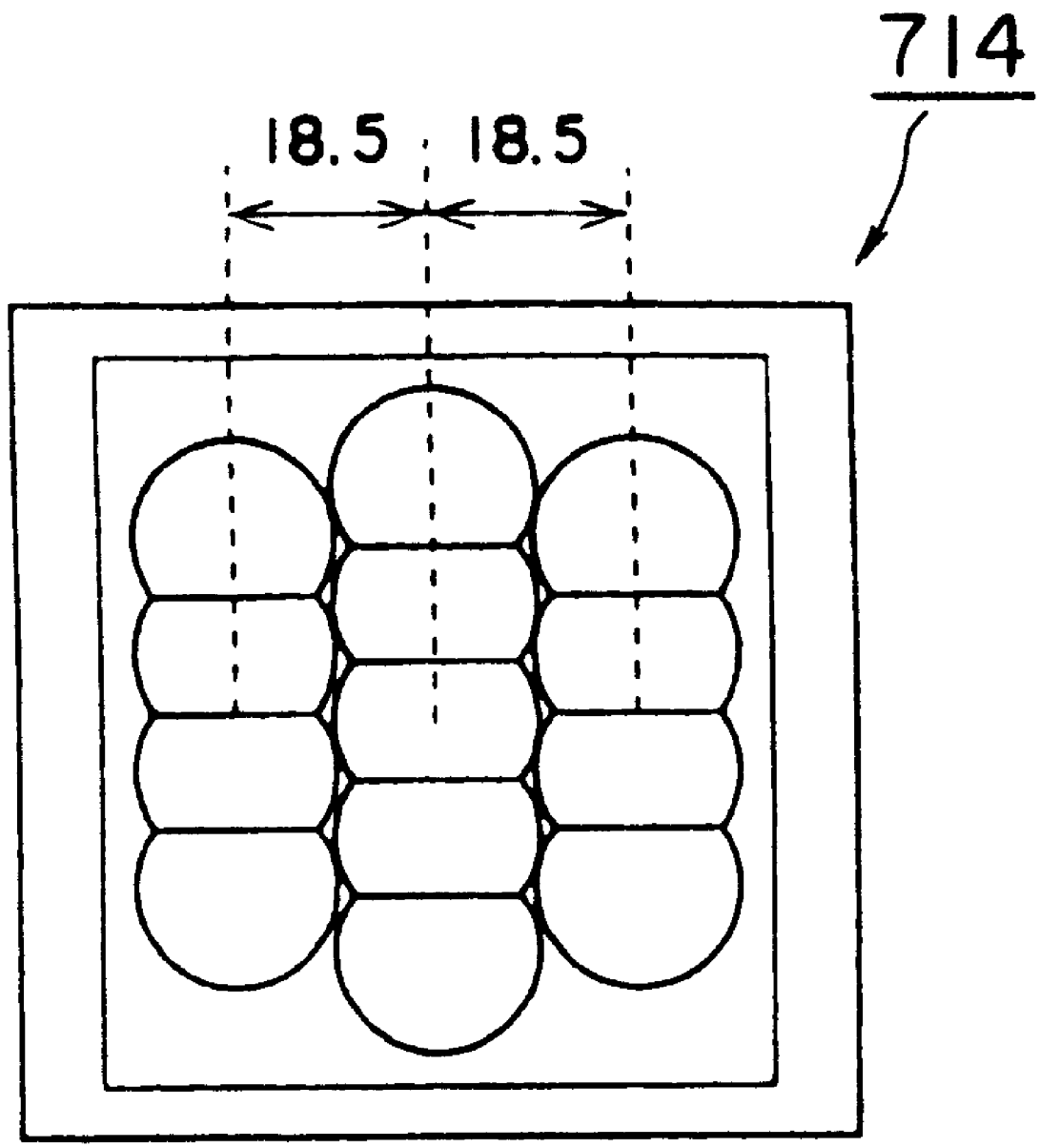
FIG. 8 is a plan view of a second lens array in the second embodiment.

FIG. 8 is a front view showing this lens array 714. The second lens array 714 functions to converge the light beams from a first lens array 713 at a micro lens array 717 at a high efficiency. The brightness and the uniformity of the display can be thereby enhanced.

As illustrated in the front view of FIG. 8, the second lens array 714 has totally thirteen pieces of small convex lenses arranged in three rows as in the case of the lens array 713 shown in FIG. 2. A focal length of each convex lens is set to form an image of the first lens array 713 in the vicinity of a position of a condenser lens 715 which will be mentioned later on. More specifically, referring to FIG. 7, a focal length f2 of the lens of the second lens array 714 is, from a relationship between the image and the focus, given by:

$$L1 = f2\,(1 + 1/N) \qquad \text{(Formula 10)}$$

$$L2 = f2\,(1 + N) \qquad \text{(Formula 11)}$$

where L1 is the distance between the first lens array and the second lens array, L2 is the distance between the second lens array 714 and the condenser lens 715, and N is the ratio of a size of each lens of the first lens array 713 to a size of a display screen of a liquid crystal panel 718. In the second embodiment, a value of N is approximately 4, and a horizontal pitch of the lenses constituting the second lens array 714 is 18.5 mm as shown in FIG. 8.

The stop 721 is, though disposed just posterior to the second lens array 714, the same as the stop 121 shown in FIG. 3, and its explanation is omitted.

The condenser lens 715 is classified as a Fresnel convex lens and is 150 mm in focal length. A focal point of the condenser lens 715 is about at the center of the second lens array 714. As a crosswise interval between the respective lenses of the second lens array 714 is 18.5 mm, the light beams emerging from the condenser lens 715 are split at three angles with an angular difference of every 7 degrees. The light beams emerging from the condenser lens 715 are incident upon a color separation mirror unit 716.

(Third Embodiment)

Figure 9:
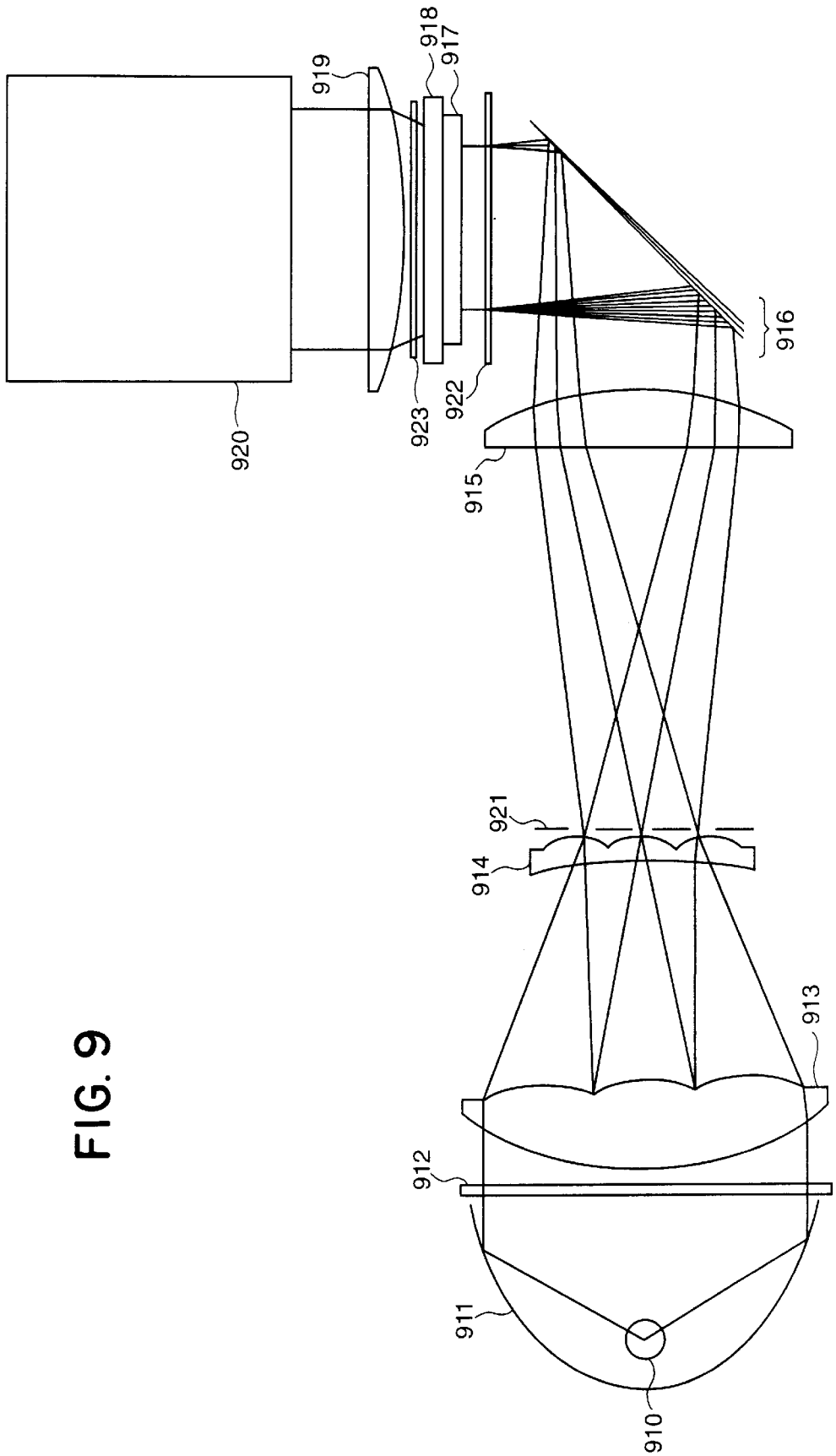
FIG. 9 is an explanatory view showing an optical construction of the display device in a third embodiment of the present invention.

FIG. 9 is an explanatory view of an optical construction of the display device in a third embodiment of the present invention, illustrating how the construction of the present invention is applied to the single plate type color display device using the image forming element arrays.

As in the first embodiment, the image forming element array involves the use of the micro lens array. Used also are the plurality of dichroic mirrors arranged at different angles to separate the light beams with which to irradiate the image forming elements, into three colors corresponding to the angles.

A parabolic reflector 911 formed with apertures on a light irradiation side is disposed around a metal halide lamp 910 serving as a light source for emitting irradiation light beams. A filter 912 for cutting off the infrared rays and the ultraviolet rays and a first lens array 913 are provided at the aperture aggregation of the parabolic reflector 911. A second lens array 914 is disposed in a position in which to condense the irradiation light beams from the respective lenses of the first lens array 913. A stop 921 for controlling a light angle distribution is disposed to cut off the light beams coming from between the lenses in the horizontal direction of the respective lenses of the second lens array 914. Disposed in sequence on the light exit side of the stop 921 and the second lens array 914 are a condenser lens 915 and a color separation mirror unit 916 consisting of three pieces of dichroic mirrors. The color separation mirror unit 916 is disposed in such a manner that the three dichroic mirrors mutually make slight angles to separate the incident light beams into light beams assuming the three primary colors, having reflecting angles different from each other.

A liquid crystal module constructed of an incidence-side polarizing plate 922, a micro lens array 917, a liquid crystal panel 918 and an exit-side polarizing plate 923 that are arranged in this sequence, is disposed in a position where the light beams separated into the three primary colors by the color separation mirror 116 are reflected upon. A field lens 919 and a projection lens 920 are disposed on the side of transmitting image signals of the liquid crystal module. Further, an actual construction entails a screen on which to form an image projected by the projection lens 920. This constructive portion is, however, omitted in illustration on the drawings.

Different points of the display device in the third embodiment from the display device in the second embodiment are that a reflection plate of the irradiation light beams emitted from the light source involves the use of the rotary parabolic mirror (the parabolic reflector) 911, the way of providing the refracting power of the whole of the first and second lens arrays 913, 914, and that the condenser lens 915 involves the use of not the Fresnel lens but a normal plano-convex single lens.

The rotary parabolic mirror (the parabolic reflector) 911 is used as the reflection plate, thereby substantially collimating the light beams incident upon the firs, lens array 913. On the whole, there is used the first lens array 913 invested with the characteristics of the convex lens, and the light beams are thereby converged through every lens element of the first lens array 913. At the same time, there comes out a state of the light beams being converged on the whole, and the light beams are incident on the second lens array 914 smaller than the first lens array 913. The second lens array 914 as a whole has the characteristics of the concave lens and changes the incident light beams into moderate diverging light beams. Further, each of the lenses of the first lens array 913 shows one-to-one correspondence to each of the lenses of the second lens array 914, and the light beam via each of the lenses of the first lens array 913 is formed on the liquid crystal panel 918 through the condenser lens 915.

As for a luminance distribution in the display device in the third embodiment, there are obtained the maximum/9-point average values as preferable as 1.2. Further, the display brightness is 200 lumen that is about 1.1 times the brightness in the prior art single pale type display device shown in FIG. 42. The brightness of 200 lumen is the same as that in the display device in the first embodiment of the present invention. It can be considered that this value is, however, improved to some extent by further optimizing the lens configuration of the first lens array 813.

(Fourth Embodiment)

Figure 10:
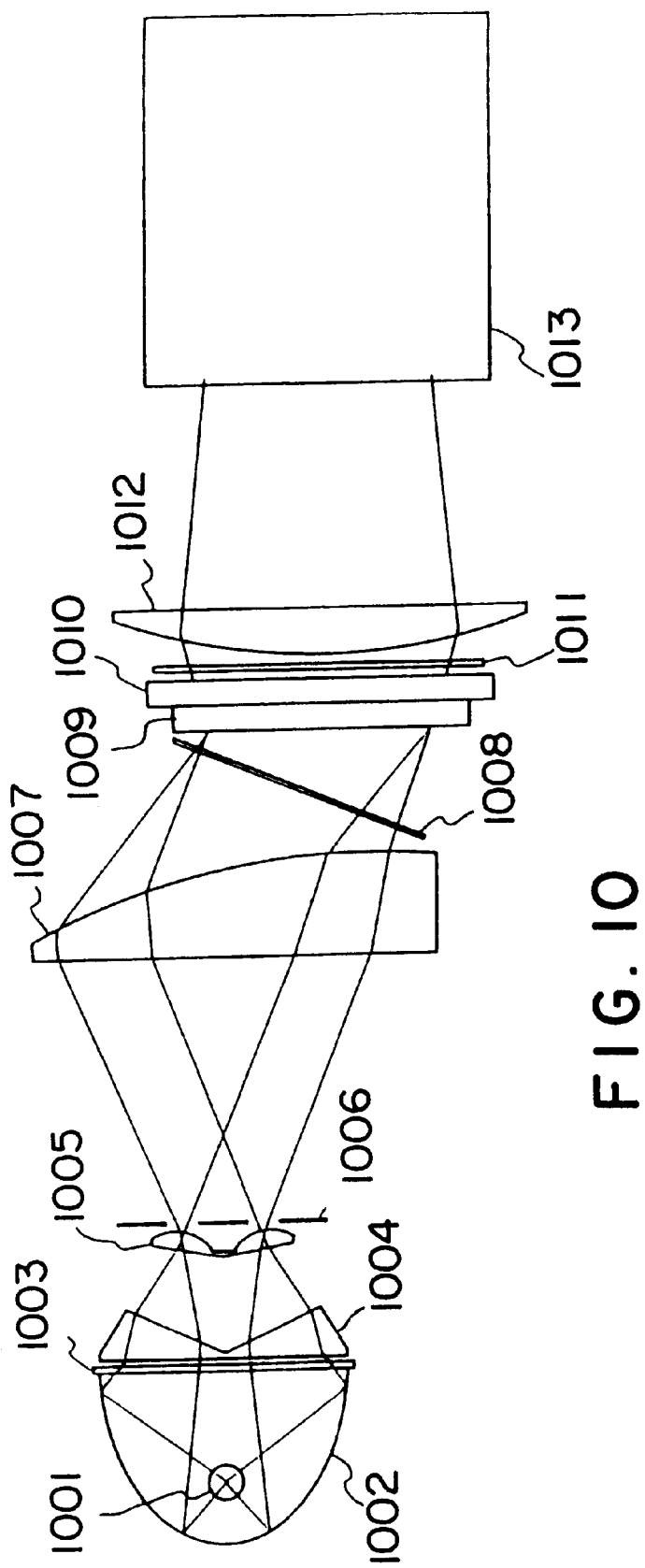
FIG. 10 is an explanatory view showing an optical construction of the display device in a fourth embodiment of the present invention.

FIG. 10 is an explanatory view illustrating an optical construction of the display device in a fourth embodiment of the present invention. In the fourth embodiment, as an angle separation element and a color image forming element for every color, a phase control type diffraction grating uses sheets formed corresponding to the respective pixels.

An elliptical reflector 1002 formed with apertures on a light irradiation side is disposed around a metal halide lamp 1001 serving as a light source for emitting irradiation light beams. A filter 1003 for cutting off the infrared rays and the ultraviolet rays and a first lens array 1004 are provided at the aperture aggregation of the elliptical reflector 1002. The metal halide lamp 1001 is disposed situated substantially in a focal position of the elliptical reflector 1002. A second lens array 1007 is disposed in a position at which the irradiation light beams from the respective lenses of the first lens array 1004 converge. A stop 1006 for controlling a light angle distribution is disposed on the light exit side of the second lens array 1005 so as to cut off the light beams coming from between the lenses in the horizontal direction of the respective lenses of the second lens array 1005.

A condenser lens 1007 is disposed on the light exit side of the stop 1006 and the second lens array 1005. The condenser lens 1007 collimates the light beams emerging from the respective lenses of the second lens array 1005. The condenser lens 1007 has, however, its focal position different from that of the second lens array 1005 unlike the first embodiment. That is, the condenser lens 1007 is disposed so that the light beams are, although those emerging from the lenses of the second lens array 1005 are parallel to each other, incident upon a diffraction grating array element 1009 at an angle of approximately 40 degrees inclined thereto by setting the lens off-center in a direction perpendicular to the optical axis of a rotary elliptical reflecting plate (an elliptical reflector 1002).

A liquid crystal module constructed of an incidence-side polarizing plate 1008, the diffraction grating array element 1009, a liquid crystal panel 1010 and an exit-side polarizing plate 1011 that are arranged in this sequence, is disposed on the light exit side of the condenser lens 1007. A field lens 1012 and a projection lens 1013 are disposed on the side of transmitting the image signals of the liquid crystal module. Further, a screen on which to form the image projected through the projection lens 1013 is used in the actual construction, however, this constructive portion is omitted in illustration in the drawings.

The incidence-side polarizing plate 1008 is disposed at an angle at which the light beams emerging from the condenser lens 1007 are incident substantially perpendicularly. A degree of polarization of the polarizing plate is smaller when incident obliquely and is therefore set to enhance a contrast ratio. The light beams emerging from the condenser lens 1007 are polarized by the incidence-side polarizing plate 1008 and then incident upon the diffraction grating array element 1009.

Figure 11:
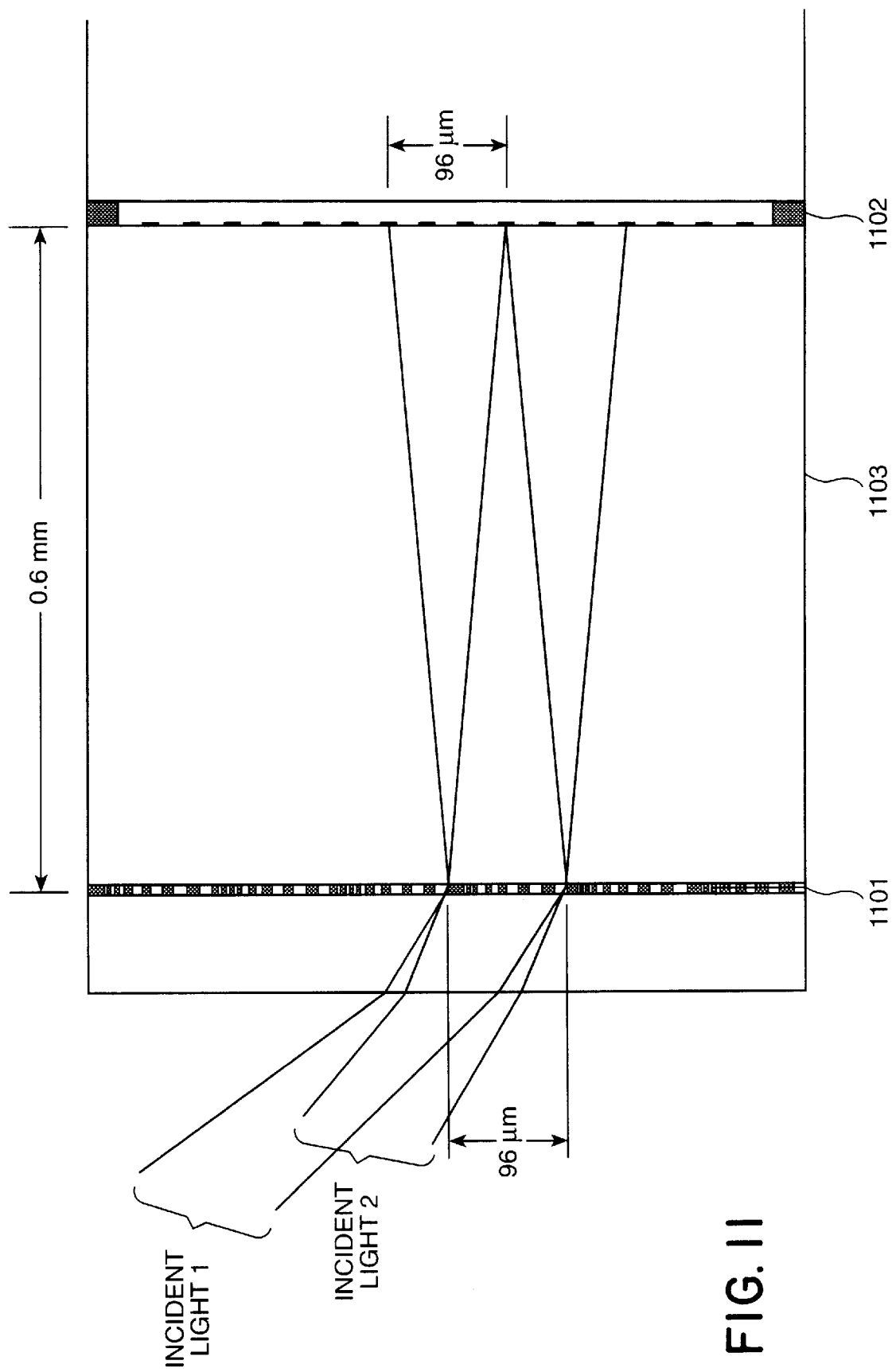
FIG. 11 is an explanatory view schematically illustrating how incidence light beams are incident upon the pixel apertures through a diffraction grating array element and a light incidence-side substrate in the fourth embodiment of the present invention.

FIG. 11 is an explanatory view schematically showing how the incident light beams are incident on the pixel apertures through the diffraction grating array element and the light incidence-side substrate.

Shown therein are a diffraction grating array element 1101, a pixel aperture aggregation 1102, and a light incidence-side substrate 1103. In the third embodiment, the pixel interval of the pixel aperture aggregation 1102 is 96 μm, a thickness of the light incidence-side substrate 1103 is 0.6 mm, and an angular difference between an incident light beam 1 and an incident light beam 2 is approximately 13 degrees.

The incident light beams 1, 2, when falling upon the diffraction grating array element 1101, are separated into spectrums through the respective diffraction gratings and strike on the pixel apertures. The spectral incidence light beams from each of the diffraction gratings are incident upon the two pixel apertures existing adjacent to each other on an incidence path thereof.

Figure 12:
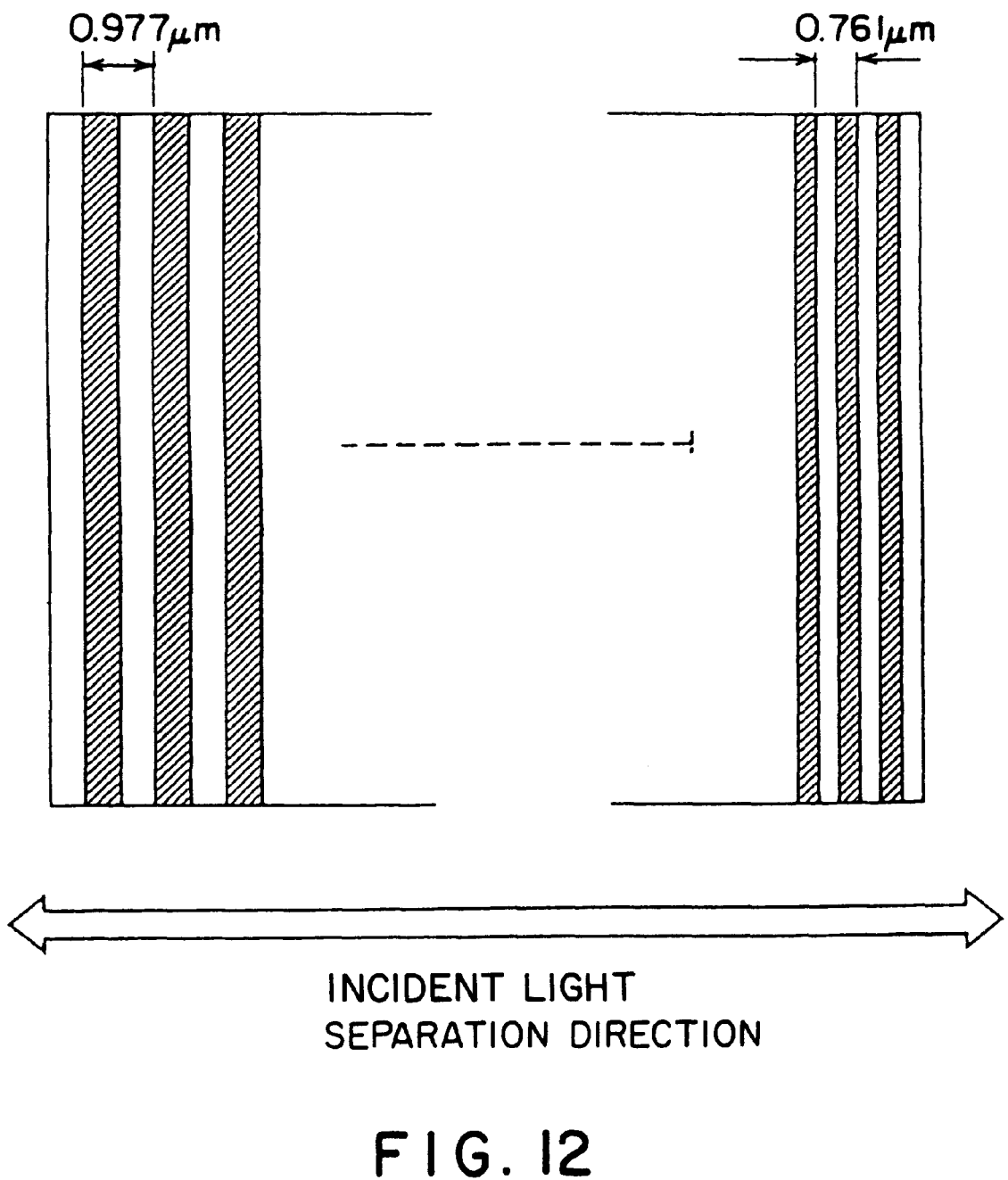
FIG. 12 is an explanatory view schematically showing a grating pattern of the diffraction grating array element used in the fourth embodiment of the present invention.

FIG. 12 is an explanatory view schematically illustrating a grating pattern of the diffraction grating array element 1101 used in the fourth embodiment.

This diffraction grating array element classified as transmission type phase diffraction gratings has action to form the image of the incident light in the horizontal direction but does not exert any influence thereon in the vertical direction. Accordingly, the diffraction occurs only in the horizontal direction, and hence there is generated no light intensity distribution on the pixels according to the angle distribution in the vertical direction. A pitch of the diffraction gratings of the diffraction grating array element is 0.977 μm at the maximum and 0.761 μm at the minimum.

Concerning the illuminance distribution in the display device in the fourth embodiment, there are obtained the ratio of a maximum value to 9-point average values as comparatively preferable as 1.35.

(Fifth Embodiment)

Figure 13:
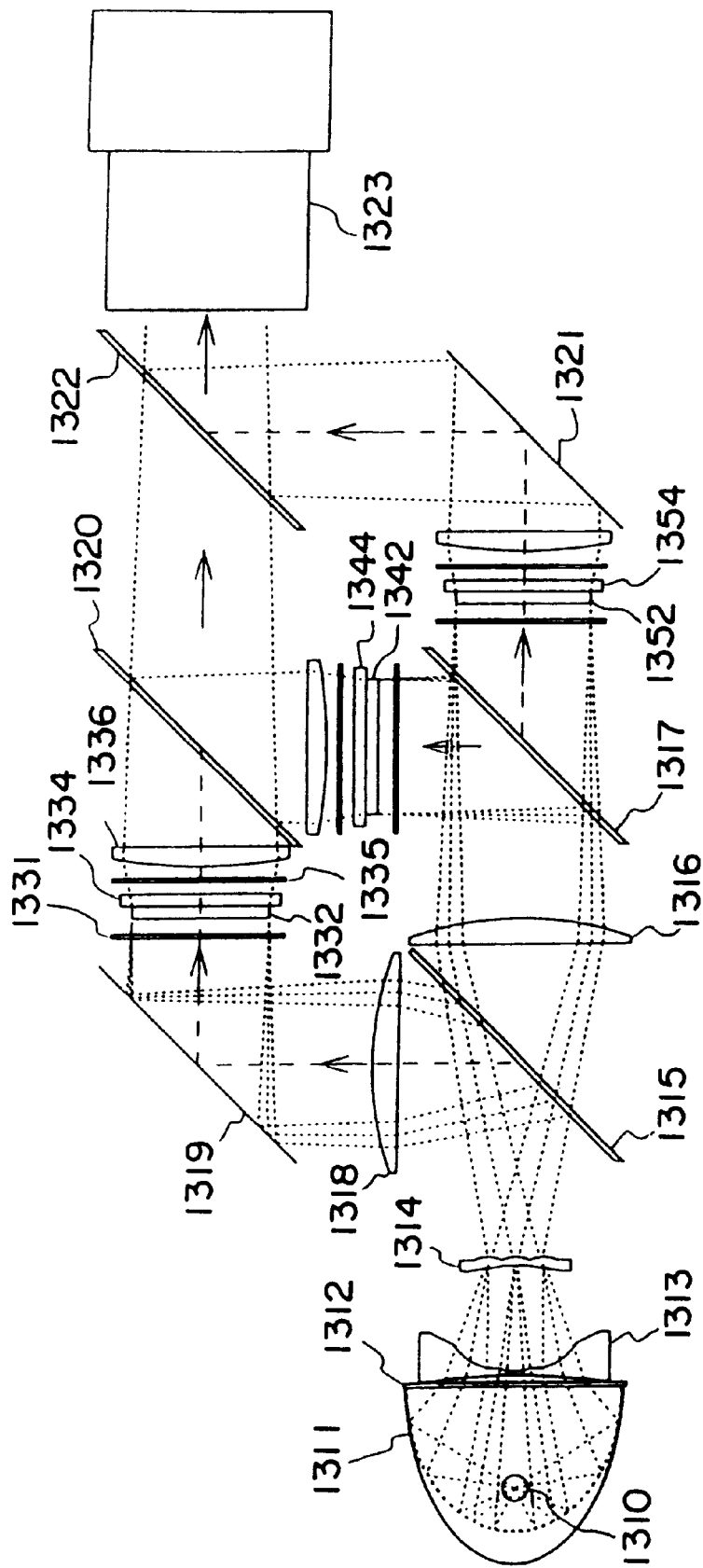
FIG. 13 is an explanatory view illustrating an optical construction of the display device in a fifth embodiment.

FIG. 13 is an explanatory view illustrating an optical construction of the display device in a fifth embodiment of the present invention, wherein the construction of the present invention is applied to a 3-plate type color display device using the image forming element array.

A composite elliptical reflector 1311 formed with apertures on a light irradiation side is disposed around a metal halide lamp 1310 serving as a light source for emitting irradiation light beams. A filter 1312 for cutting off the infrared rays and the ultraviolet rays and a first lens array 1313 are provided on the side of the aperture aggregation of the composite elliptical reflector 1311. A second lens array 1314 is disposed in a position in which to condense the irradiation light beams via the filter 1312 and the first lens array 1313.

On the light exit side of the second lens array 1314, a first dichroic mirror 1315 for separating the irradiation light beams into three colors is disposed at an angle of approximately 45 degrees to the optical axis of the composite elliptical reflector 1311. The first dichroic mirror 1315 having a function to separate the red light beams from other light beams, reflects only the red light beams among the irradiated light beams and transmits the light beams other than the red light beams.

A first condenser lens 1318 is disposed on a traveling path of the red reflecting light beams reflected by the first dichroic mirror 1315. A first mirror 1319 which reflects the red light beams is disposed, substantially in parallel to the first dichroic mirror 1315, in a position irradiated with the red light beams via the first condenser lens 1318.

A first liquid crystal module for forming a red image is disposed in a position irradiated with the red light beams reflected by the fist mirror 1319. The first liquid crystal module is constructed of an incidence-side polarizing plate 1331, a micro lens array 1332, a liquid crystal panel 1334, an exit-side polarizing plate 1335 and a field lens 1336, which elements are arranged in this sequence from the incidence side of the incident light beams to the exit side thereof.

A second condenser lens 1316 is disposed on the traveling path of the light beams penetrating the first dichroic mirror 1315. A second dichroic mirror 1317 is disposed, substantially in parallel to the first dichroic mirror 1315, in a position irradiated with the light beams via the second condenser lens 1316. The second dichroic mirror 1317 having a function to separate the green light beams from the blue light beams, reflects the green light beams among the irradiated light beams and transmits the blue light beams.

A second liquid crystal module including a liquid crystal panel 1344 is disposed in a position irradiated with the green light beams. On the light exit side of the first and second liquid crystal modules, a third dichroic mirror 1320 is disposed at an angle of approximately 45 degrees to the liquid crystal panels 1334, 1344 of the first and second liquid crystal modules. The third dichroic mirror 1320 transmits the red light beams coming from the first liquid crystal module and reflects the green light beams coming from the second liquid crystal module.

A third liquid crystal module including a liquid crystal panel 1354 for forming a blue image is disposed in a position irradiated with the blue light beams penetrating the second dichroic mirror 1317. A second mirror 1321 is disposed at an angle of approximately 45 degrees to the liquid crystal panel 1354 on the light exit side of the third liquid crystal module.

A fourth dichroic mirror 1322 is disposed in parallel to the third dichroic mirror 1320 and the second mirror 1321, in a position irradiated with the blue light beams coming from the second mirror 1321 as well as with the irradiation light beams from the third dichroic mirror 1320. The fourth dichroic mirror 1322 transmits the irradiation light beams from the third dichroic mirror 1320 and reflects the blue light beams from the second mirror 1321, wherein the light beams assuming the three primary colors emerging from the respective liquid crystal modules are again synthesized. Images of the thus synthesized light beams are projected on the screen through the projection lens 1323.

Figure 40:
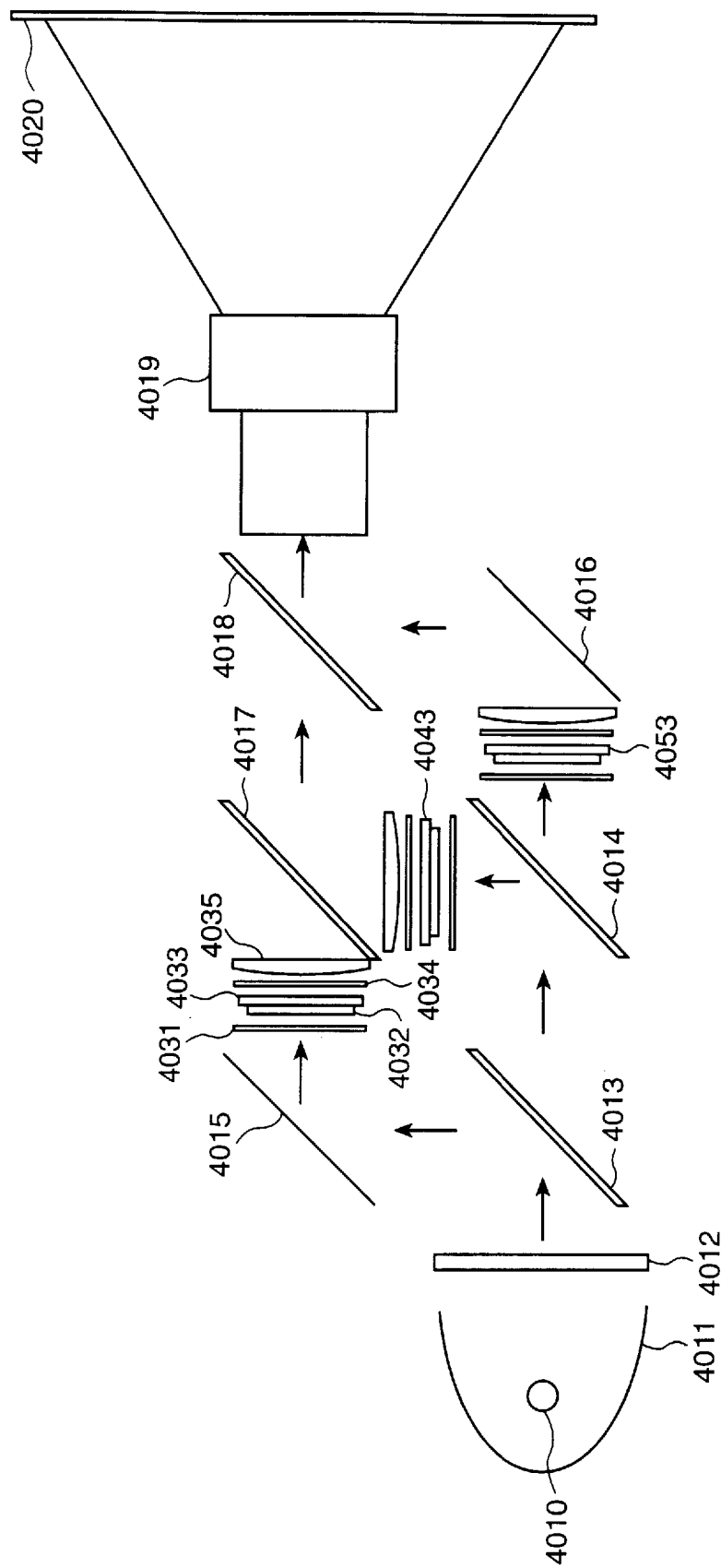
FIG. 40 is an explanatory view showing an optical construction of a prior art 3-plate type projection display device using the micro lens array.

A different point of the display device in the fifth embodiment from the conventional 3-plate type projection display device shown in FIG. 40 is a relationship between the constructive elements of the light source, the micro lens array and the liquid crystal panel.

First of all, the light source will be explained.

In the fifth embodiment, a reflecting mirror for condensing the light beams from the metal halide lamp 1310 involves the use of the composite elliptical reflector 1311 combined with two kinds of rotary elliptical surfaces.

FIG. 14A is a front view of the composite elliptical reflector. FIGS. 14B and 14C are sectional views taken along the lines CD and EF in FIG. 14A. As illustrated in FIGS. 14A, 14B and 14C, the composite elliptical reflector 1311 in the fifth embodiment is a reflecting mirror combined with two kinds of rotary elliptical surfaces 1401, 1402. The rotary elliptical surfaces 1401 and 1402 are substantially coincident in their focal positions, and a light emitting element of the lamp is disposed substantially at one focal position of the ellipse, whereby the light beams can be converged at the other focal position. This is the same with the reflecting mirror normally consisting of one kind of rotary elliptical surface. A different point from the normal reflecting mirror is that an eccentricity of the rotary elliptical surface 1401 disposed vertically in the crosswise direction with respect to the optical axis is larger than an eccentricity of the rotary elliptical surface 1402 disposed vertically in the lengthwise direction, and a profile of the light beams emerging from the reflecting mirror and converging at the focal point gets wide crosswise rather than lengthwise. This is based on the principle disclosed in Japanese Patent Laid-Open Publication No.7-270789 (Japanese Patent Application No.6-062396), wherein three or more kinds of rotary ellipses can be used.

The focal positions of the rotary elliptical surfaces constituting the composite elliptical reflector be, it is required, coincident with each other at a high accuracy enough to fall within a range of a size of the light emitting element of the lamp used as the light source. The layout of these coincident focal positions is needed for the plurality of rotary elliptical surfaces to simultaneously perform the function to let the reflecting surface receive, reflect and converge the light beams from the light source which is disposed in one focal position of the rotary ellipsis at the other focal position. In accordance with the fifth embodiment, is can be regarded that the focal points are coincident within a range of approximately ±0.4 mm in terms of considering a working accuracy, etc., of the reflecting mirror. The width of this range sufficiently meets the condition because of a light emitting length of arc of the metal halide lamp used as the light source being approximately 3 mm.

Figure 15A:
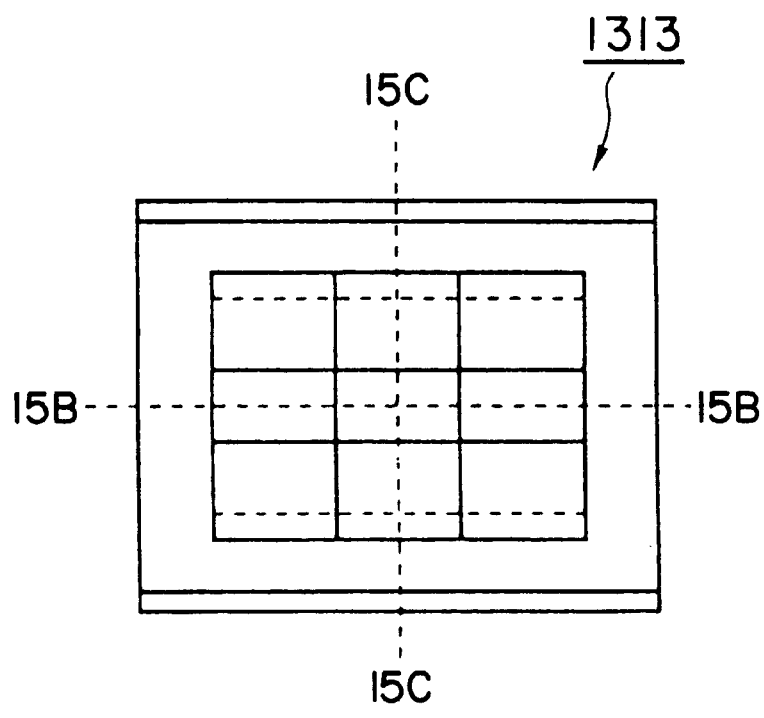
FIGS. 15A–15C are front and sectional views showing a first lens array in the fifth embodiment of the present invention.
Figure 15C:
Figure 15B:

FIG. 15A is a front view showing the first lens array 1313. FIGS. 15B and 15C are sectional views taken along the lines GH and IJ in FIG. 15A.

The first lens array disposed at the aperture aggregation of the composite elliptical reflector is constructed of elongate lenses for an elongate display panel having a 9-to-16 aspect ratio. The lenses, however, take a 3×3 layout in an elongate configuration on the whole. However, the incident light beams also have an elongate profile, and a light utilizing efficiency never decreases because of such a configuration.

Further, as illustrated in the sectional views of FIGS. 15A and 15B, the lenses constituting the first lens array are concave lenses, and the refracting power of the whole lens array is stronger (i.e., smaller) toward the negative side in the vertical direction, and the light distribution in the incident position upon the second lens array corresponds to the layout of the lenses of the second lens array having a 1-to-1 aspect ratio.

FIG. 16A is a plan view showing the second lens array 1314. FIGS. 16B and 16C are sectional views taken along the lines KL and MN in FIG. 16A. As shown in FIGS. 16A, 16B and 16C, the second lens array has circular convex lenses taking the 3×3 layout substantially in a convex configuration on the whole.

Moreover, the display panel in the fifth embodiment is a liquid crystal panel where intervals of arranging the pixels lengthwise and crosswise are equal to each other, and the second lens array used herein has the lens arrangements that are equal lengthwise and crosswise.

The refracting power of the second lens array as a whole is weaker toward the negative in the vertical direction (i.e., larger), and a light intensity distribution corresponds to a display area of the display panel just when the light beams reach the micro lens arrays 1332, 1342, 1352 defined as the image forming arrays after passing through the first and second condenser lenses 1318, 1316 in FIG. 13.

Referring back to FIG. 13, the light beams penetrating the micro lens array 1332 converge at the pixel apertures of the liquid crystal panel 1333 defined as the display panel. The operation is the same with other liquid crystal modules.

A lens arrangement interval of the second lens array 1314 is 14 mm, and a distance of the light path between the second lens array and the first and second condenser lenses 1318, 1316, is 176 mm. Then, a pixel forming interval on the liquid crystal panel 1333 and a lens interval of the micro lens array 1332 are 60 μm, and a distance between the micro lens array 1332 and the pixels on the liquid crystal panel 1333 is 1.15 mm. These values satisfy the condition of the formula 3.

In accordance with the fifth embodiment, it is feasible to attain a light flux 520 lument emerging from the projection lens by use of the metal halide lamp of a total light flux 16,000 lumen. Further, as for the illuminance distribution, there is obtained a ratio of a maximum value to 9-point average values as highly preferable as 1.13.

(Sixth Embodiment)

Figure 17:
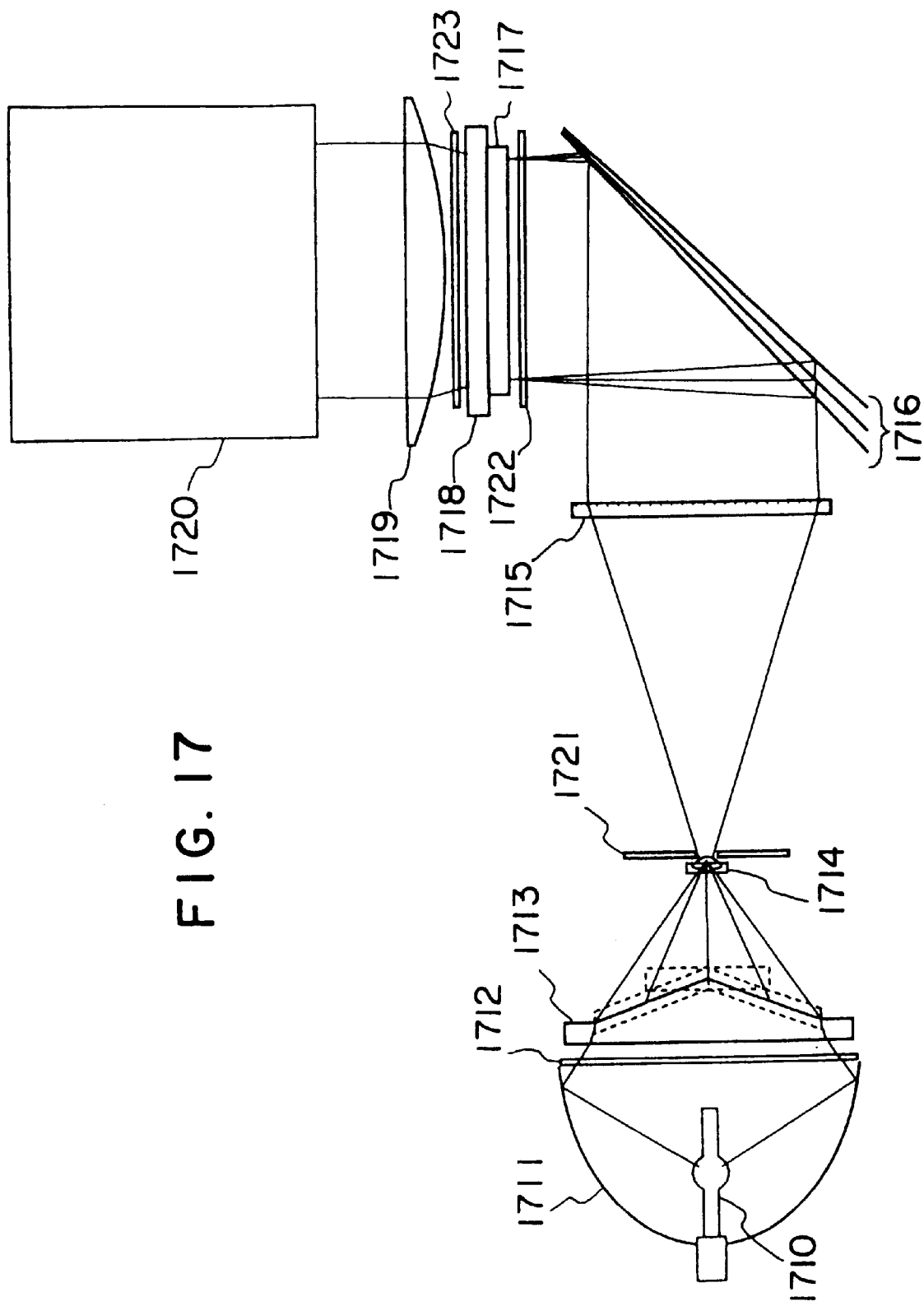
FIG. 17 is an explanatory view showing an optical construction of the single plate type projection display device in a sixth embodiment of the present invention.
Figure 19B:
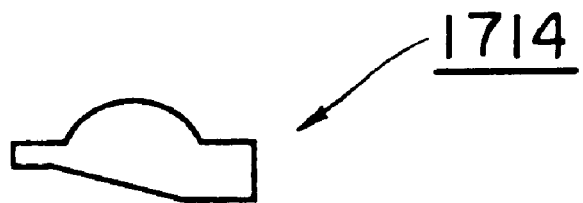
FIGS. 19A–19C are front and sectional views illustrating details of the second lens array in the sixth embodiment of the present invention.
Figure 19A:
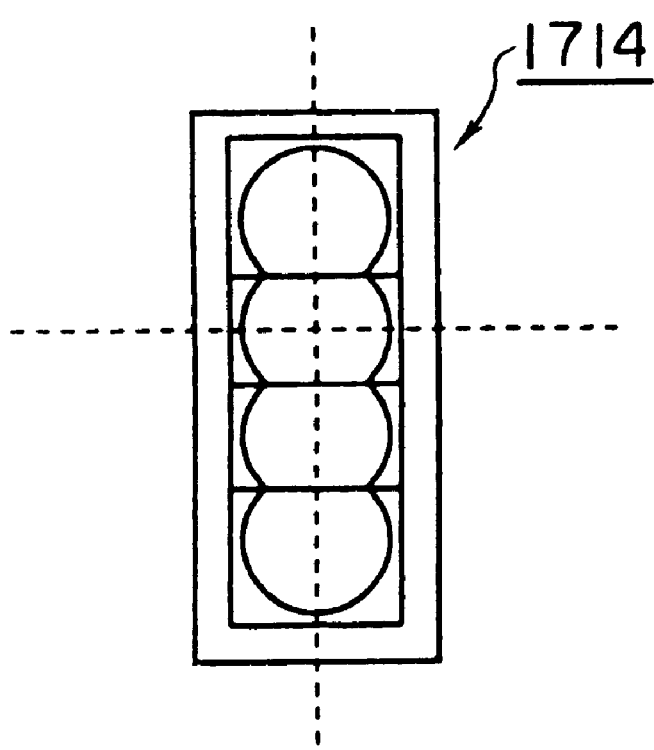
Figure 19C:
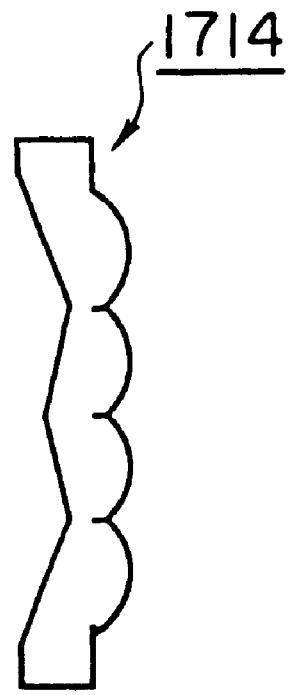

FIG. 17 is a view illustrating an optical construction of the single plate type projection display device in an eighth embodiment of the present invention.

The light beams from the metal halide lamp 1710 are reflected by an elliptical surface reflector 1711, then incident upon a first lens array 1713 via a filter 1712 for cutting off the infrared rays and the ultraviolet rays, and converge at a second lens array 1714. In the second lens array 1714, the refracted light beams pass through stop 1721, condenser lens 1715 and a color separation mirror unit 1716 consisting of three dichroic mirrors, and area then incident on a liquid crystal module constructed of an incidence-side polarizing plate 1722, a micro lens array 1717, a liquid crystal panel 1718 and an exit-side polarizing plate 1723. The light beams are then supplied to a projection lens 1720 via a field lens 1719.

Figure 41:
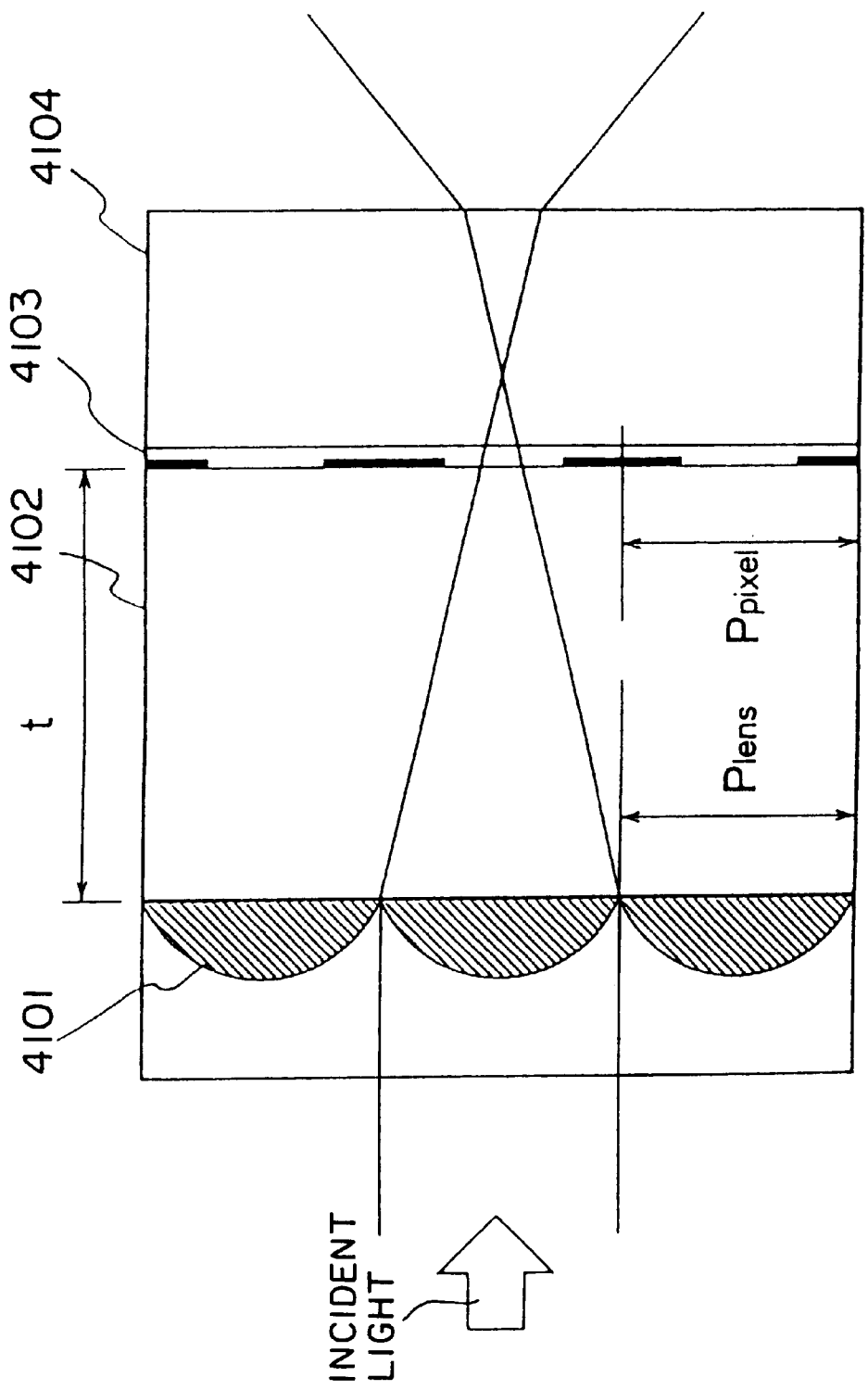
FIG. 41 is an explanatory view schematically showing how the micro lenses of the micro lens array in the conventional 3-plate type projection display device converge the incident light beams at a pixel aperture aggregation, and also showing the principle of enhancing the transmissivity.

An optical construction after the dichroic mirror unit 1716 in the sixth embodiment is basically the same as that of the conventional display device shown in FIG. 41, but is characterized by such points that the first lens array 1713 and the second lens array 1714 are provided, and that the lenses of the second lens array 1714 are arranged in one line.

These characteristic points are explained with reference to FIGS. 18–22. The first lens array 1713 comprises four pieces of lenses as illustrated in FIGS. 18A–18C, and the lens surfaces thereof are inclined so that the light beams emerging from the respective lenses converge at the second lens array 1714 shown in FIGS. 19A–19C.

More specifically, the light beams penetrating the lens 1 converge at a focal point 1, those from the lens 2 converge at a focal point 2, those from the lens 3 converge at a focal point 3, and those from the lens 4 converge at a focal point 4. The second lens array 1714 shown in FIG. 19 is disposed in the vicinity of the respective focal points, and the light beams from the first lens array 1713 are so corrected as to be deflected toward the condenser lens 1715 and efficiently led to the dichroic mirror unit 1716.

Figure 20:
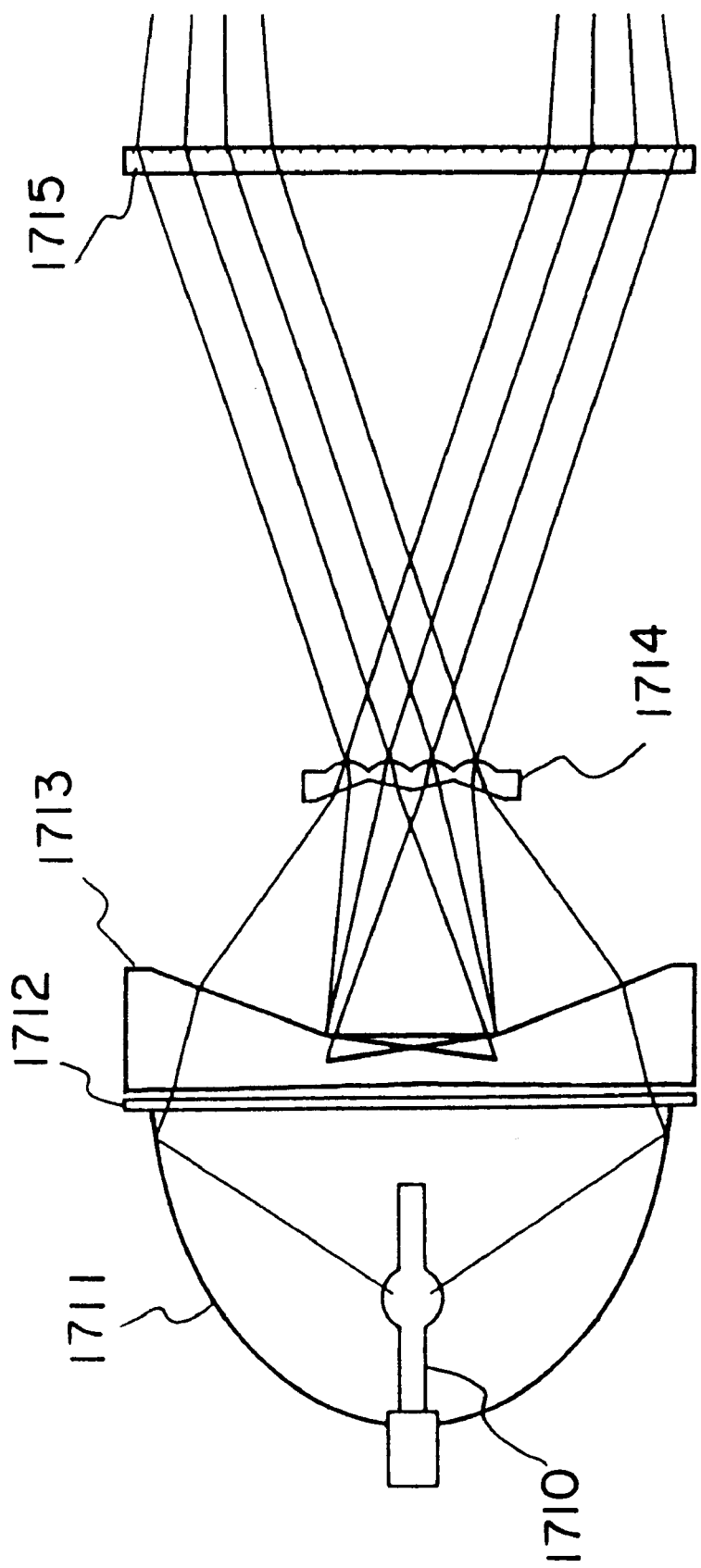
FIG. 20 is an explanatory view showing an optical construction of the single plate type projection display device in the sixth embodiment of the present invention as viewed from a position deferent 90 degrees from that in FIG. 17.

FIG. 20 is an explanatory view illustrating how the light beams converged between the two lens arrays as viewed in a direction different 90 degrees from that in FIG. 17. It can be comprehended from FIGS. 17 and 20 that the light beams from the second lens array 1714 illuminate from an extremely narrow one-line area in such a direction as to be angularly separated into three colors by the dichroic mirror, and illuminate from a wide area in the direction deferent 90 degrees therefrom because of the four lenses being arranged there.

Figure 21:
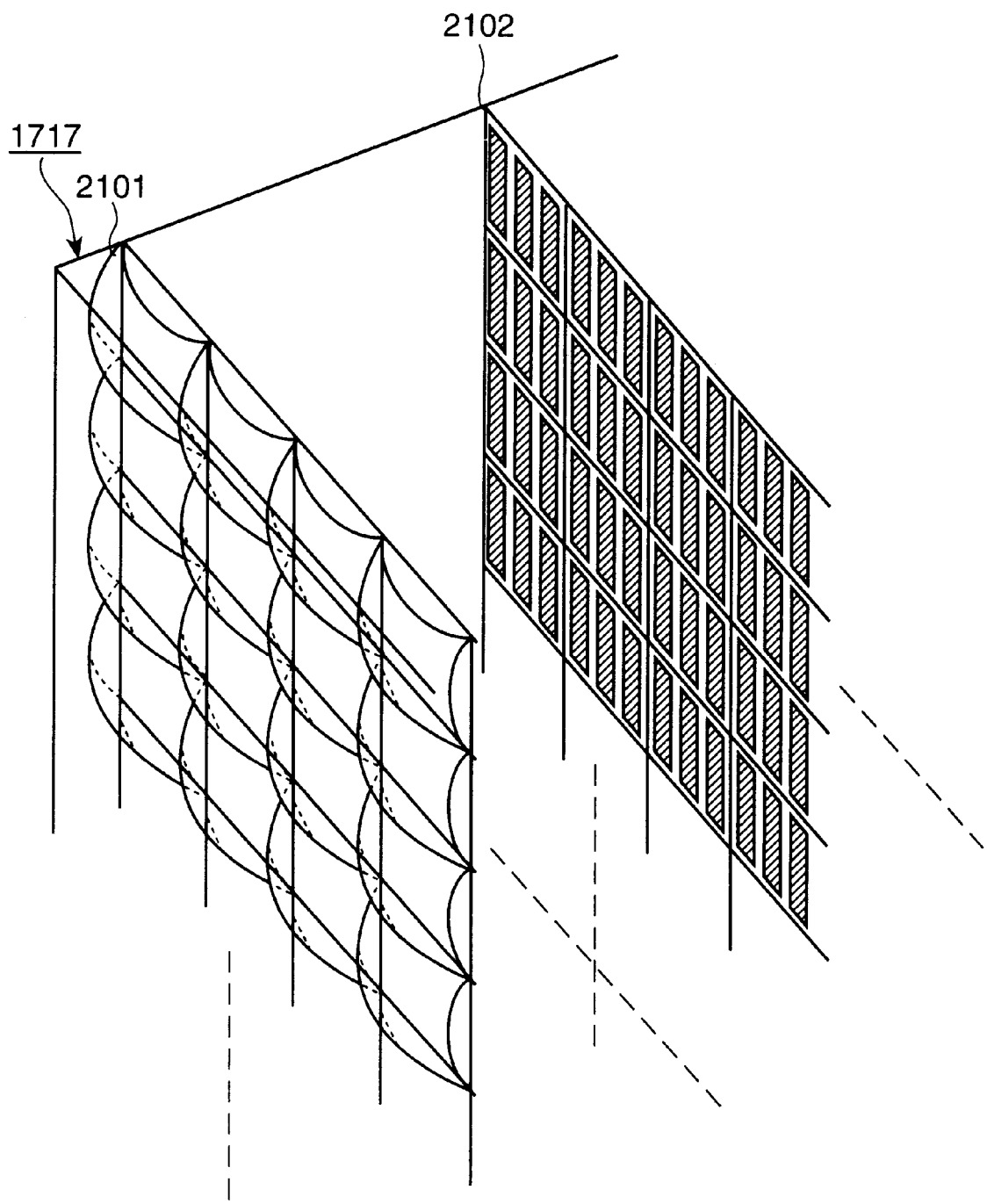
FIG. 21 is an explanatory view schematically showing a relationship between the micro lens array and the pixel apertures.

FIG. 21 is an explanatory view showing a relationship between an aperture aggregation 2102 and a micro lens array 1717(FIG. 17) composed of spherical convex lenses 2101, wherein a radiation luminance distribution formed through each individual micro lens is narrow in the direction where the pixel apertures for three colors are arranged, i.e., in the horizontal direction on the display screen, but is wide in the vertical direction.

Figure 22A:
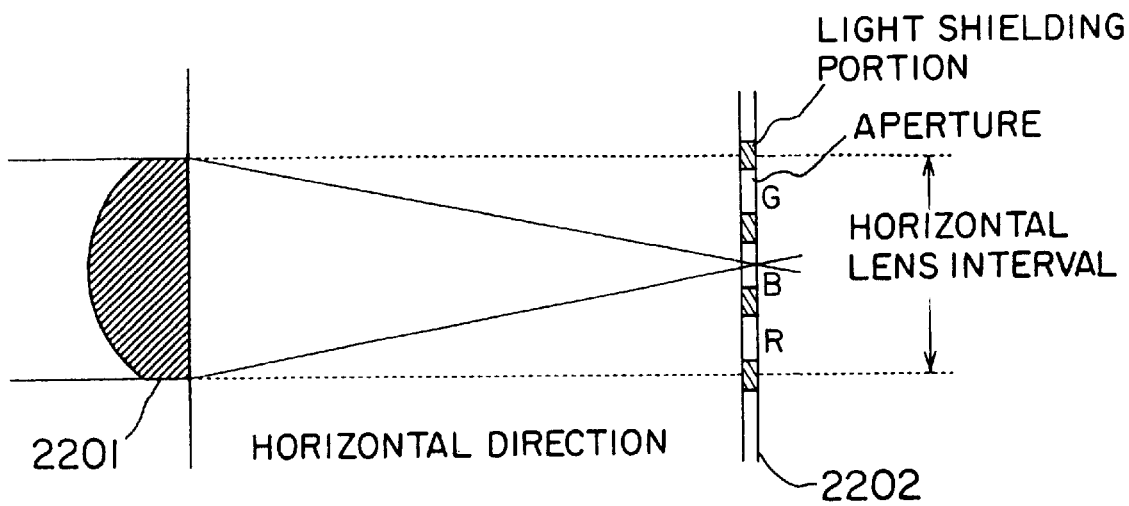
FIGS. 22A and 22B are explanatory views each schematically showing one micro lens and one pixel aperture in the eighth embodiment of the present invention.
Figure 22B:
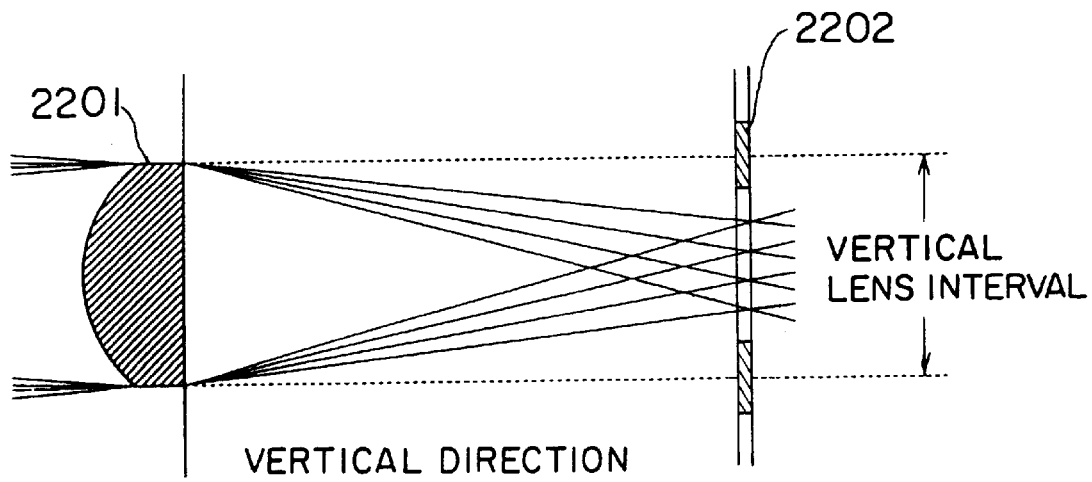

FIGS. 22A and 22B show states of the illumination by the single micro lens 2201 through the central dichroic mirror among the three dichroic mirrors 1716, wherein the blue light beams through the dichroic mirror are converged narrowly in the horizontal direction at a pixel aperture 2202 as shown in FIG. 22A but widely converged in the vertical direction as shown in FIG. 22B.

The light utilization efficiency is thus remarkably enhanced by matching the illumination through the micro lens array 2101 to the configuration of the pixel aperture aggregation 2102 shown in FIG. 21. It is therefore feasible to actualize the illumination matched to the relationship between the micro lens array 1717 and the liquid crystal panel 1718.

In the illuminance distribution in the sixth embodiment, there are obtained a ratio of a maximum value to 9-point average values as comparatively preferable as 1.4.

Further, the display brightness becomes 250 lumen that is approximately 1.4 times as high as that in the single plate type display device based on conventional construction shown in FIG. 41.

(Seventh Embodiment)

Figure 23:
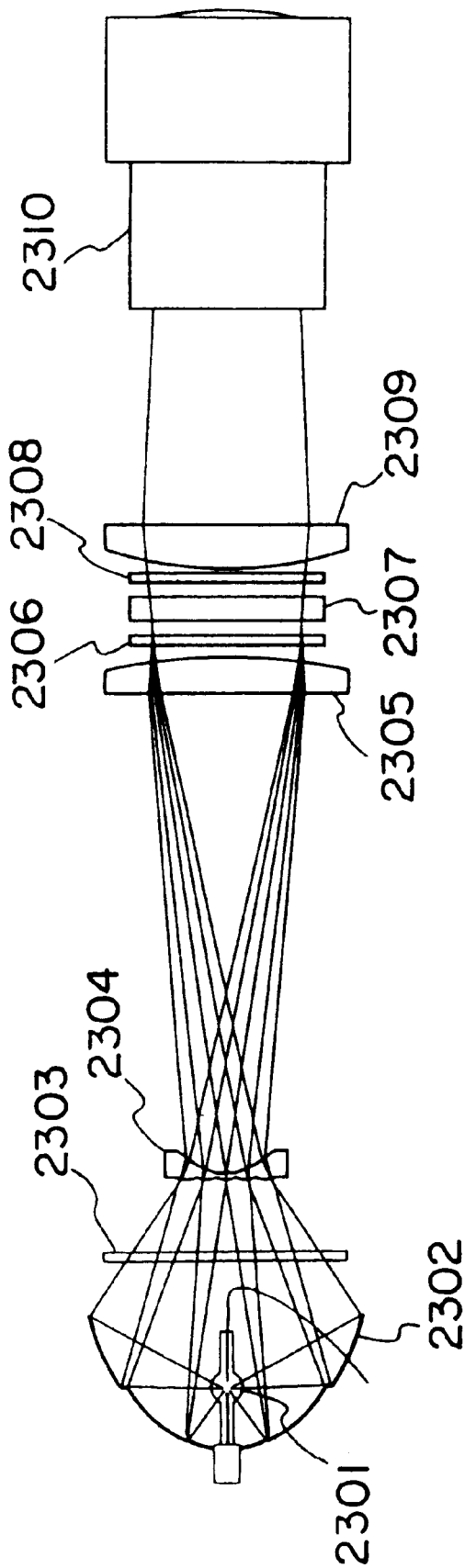
FIG. 23 is a view illustrating an optical construction of the projection type color liquid crystal display device in a seventh embodiment of the present invention.
Figure 24:
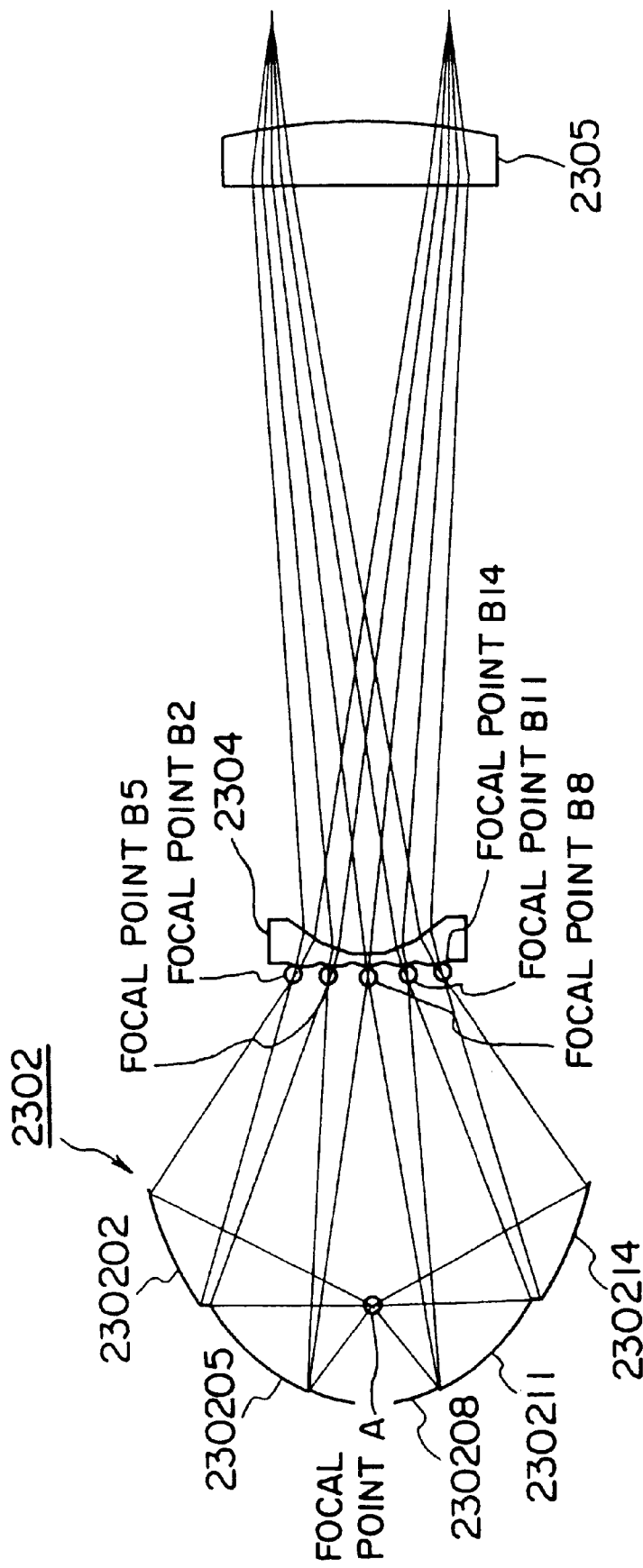
FIG. 24 shows a vertical section of a peripheral portion of the reflecting mirror, and also a relationship between the reflecting mirror and focal points thereof in the projection type color liquid crystal display device in the seventh embodiment of the present invention.
Figure 25:
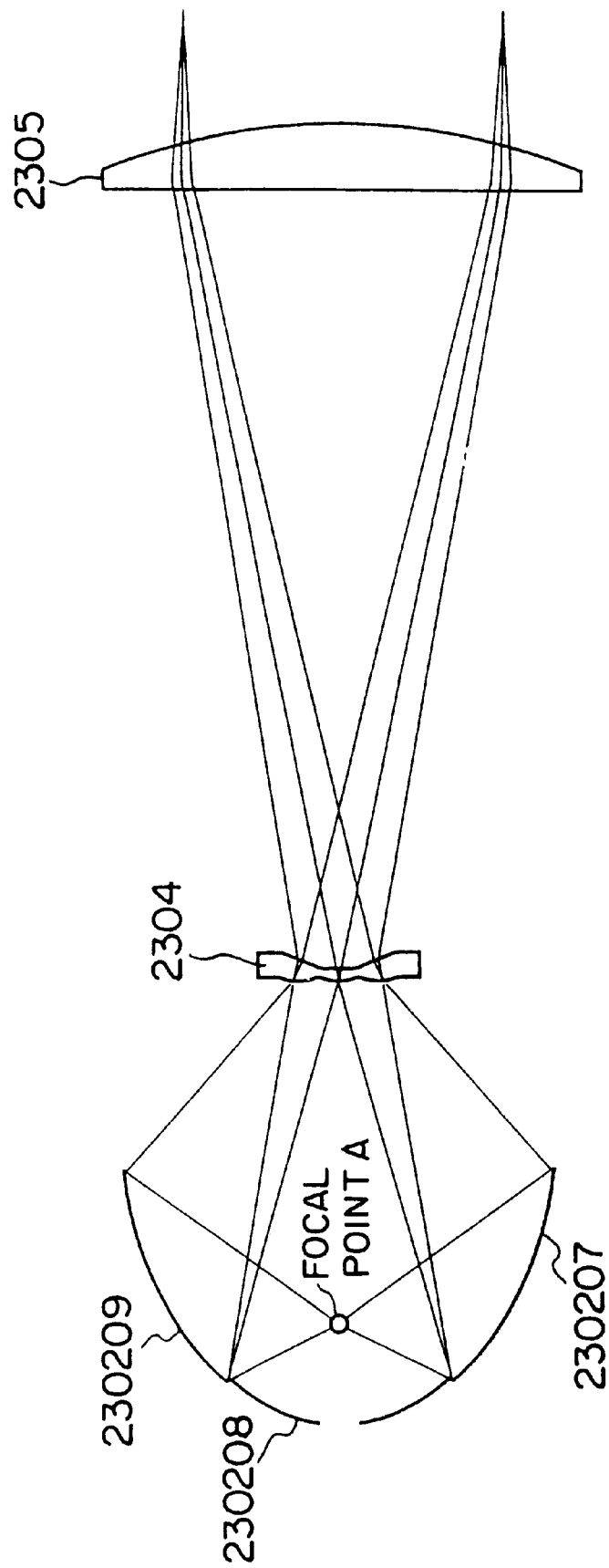
FIG. 25 shows a cross section of the peripheral portion of the reflecting mirror, and also the relationship between the reflecting mirror and the focal points thereof in the projection type color liquid crystal display device in the seventh embodiment of the present invention.

FIG. 23 is a view illustrating an optical construction of the single plate type projection display device in a seventh embodiment of the present invention. FIG. 24 is a vertical cross sectional view illustrating a light source element in the seventh embodiment. FIG. 25 is a horizontal cross sectional view thereof.

To begin with, the entire construction and operation will be explained.

The light beams from a metal halide lamp 2301 are converged at a lens array 2304 by a concave reflecting mirror unit 2302. An infrared/ultraviolet rays cut filter 2303 is provided between the concave reflecting mirror unit 2302 and the lens array 2304, whereby only the visible light beams are incident upon the lens array 2304.

The light beams incident upon the lens array 2304 are deflected toward a condenser lens 2305 by the lens array, collimated by the condenser lens 2305, polarized by a polarizing plate 2306 and fall on a liquid crystal panel 2307.

The liquid crystal panel 2307 is a classified as a 90-degree-twisted nematic liquid crystal panel, and modulates the polarized state of the exit light beams in accordance with the image signals. The light beams emerging from the liquid crystal panel 2307 are light-intensity-modulated by a polarizing plate 2308 and thus converted. The modulated light beams are projected by a projection lens 2310 as well as by a condenser lens 2309.

Figure 26:
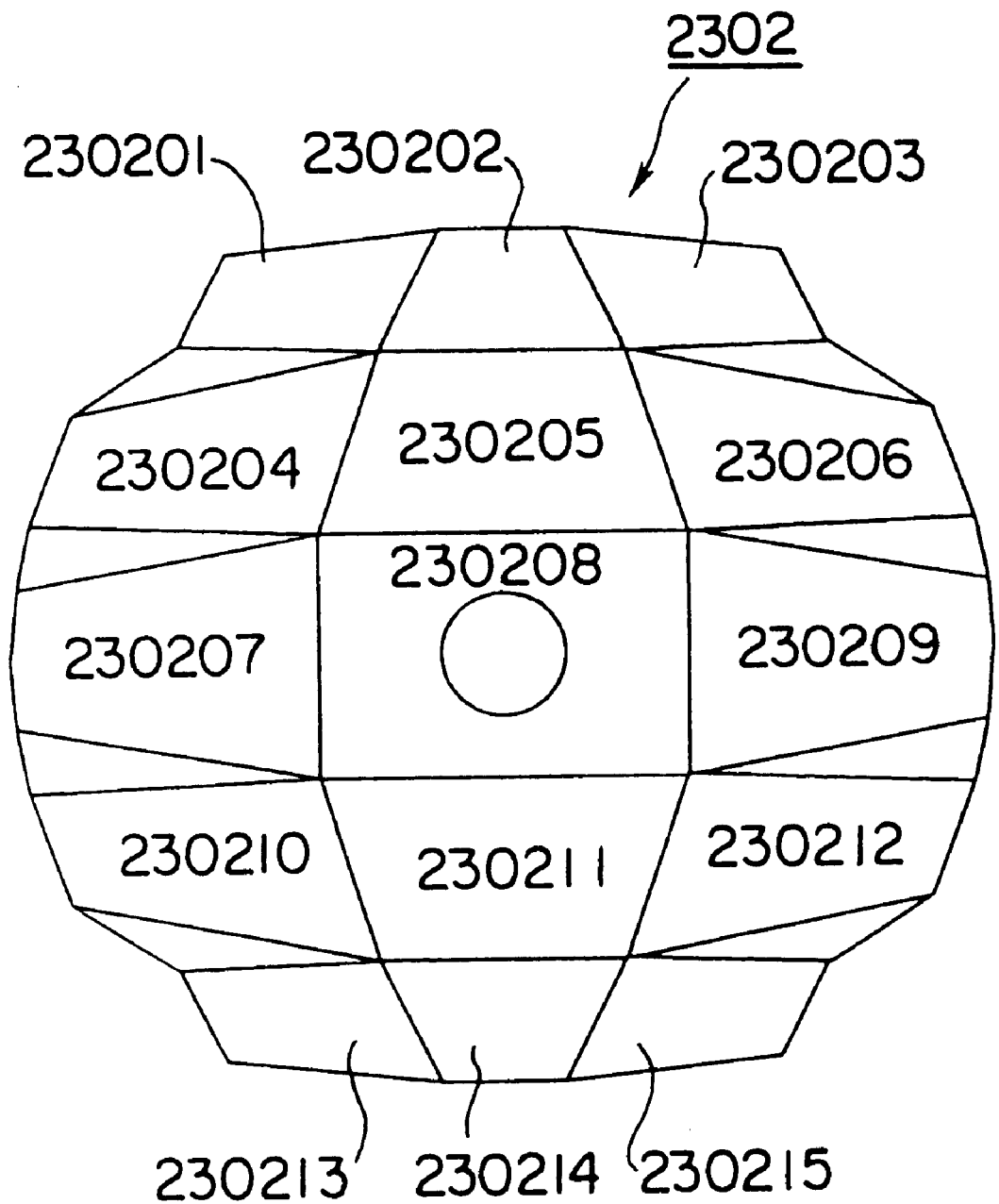
FIG. 26 is a front view of the reflecting mirror in the projection type color liquid crystal display device in the seventh embodiment of the present invention.

Next, a structure of the reflecting mirror, which is the essential point in the seventh embodiment will be described. The reflecting mirror unit 2302 in the seventh embodiment is constructed of fifteen rotary elliptical reflecting mirrors. FIG. 26 illustrates this mirror unit 2302 as viewed from front. The respective reflecting mirrors 230201–230215 have a focal point at a light emitting element of a lamp 23101 on one side, and other focal points in the vicinities of positions of the corresponding lenses of the lens array 2304 on the other side.

A display unit of the liquid crystal panel 2307 has a 16:9 aspect ratio, and each reflecting mirror is constructed so that a solid angle embracing the reflecting mirrors from the lens array 2304 forms substantially a 16:9 rectangular shape.

FIG. 24 is a view showing how the light beams are reflected by the reflecting mirrors and refracted by the lens array, including a vertical section taken along the line passing through the center of the reflecting mirrors. Reflecting mirrors 230202, 230205, 230206, 230208, 230211, 230214 in FIG. 24 correspond to the reflecting mirrors 230202, 230205, 230206, 230208, 230211, 230214 shown in FIG. 26. These reflecting mirrors have a focal point A defined as a position in which to dispose the lamp on one side and focal points B2, B5, B8, B11, B14 on the other side, which corresponds to the respective lenses of the lens array 2304. Further, the angles embracing the reflecting mirrors from the lenses corresponding to the reflecting mirrors of the lens array are all substantially equal.

FIG. 25 is a view showing how the light beams are reflected by the reflecting mirrors and refracted by the lens array, including a cross section taken along the line passing through the center of the reflecting mirrors. Reflecting mirrors 230207, 230208, 230209 shown in FIG. 25 correspond to the reflecting mirrors 230207, 230208, 230209 shown in FIG. 26.

As illustrated in FIGS. 24 and 25, an exit surface of the lens array 2304 assumes a shape of the concave lens and is designed to deflect the light beams converging at the lens array toward the condenser lens 2305.

As explained above, the liquid crystal panel is illuminated with the light beams from a plurality of secondary light sources in the seventh embodiment, and hence the display with a high uniformity can be attained.

Figure 48:
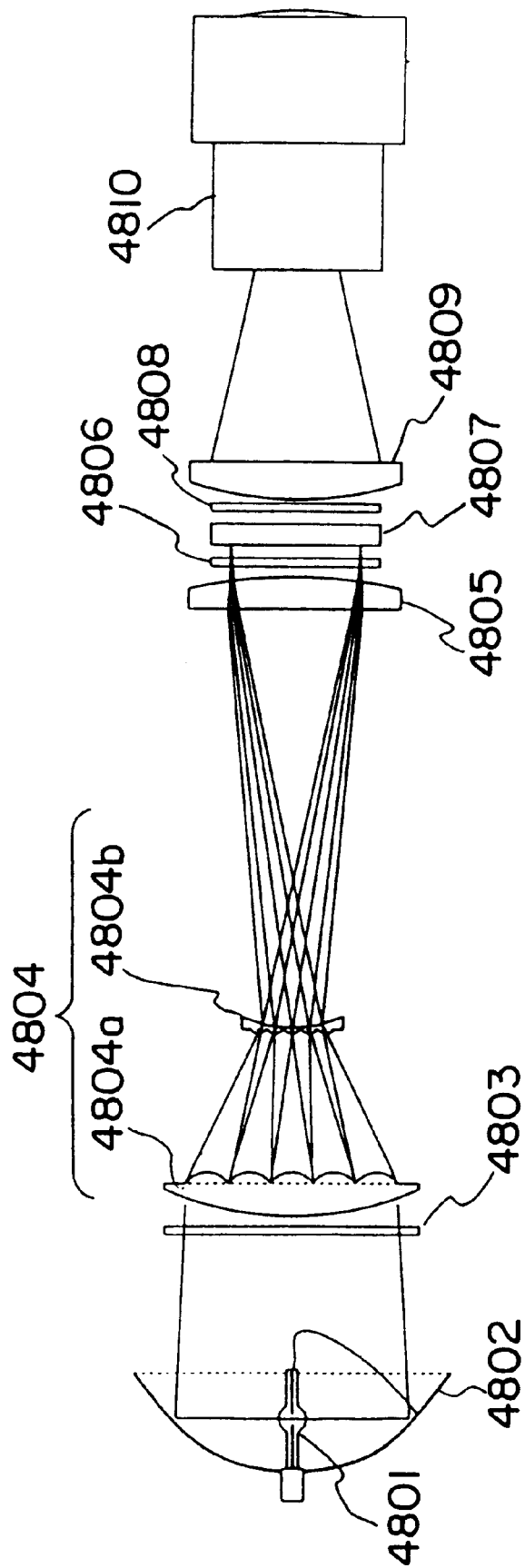
FIG. 48 is a view showing the single plate type projection display device based on color filters using conventional two lens arrays.
Figure 49:
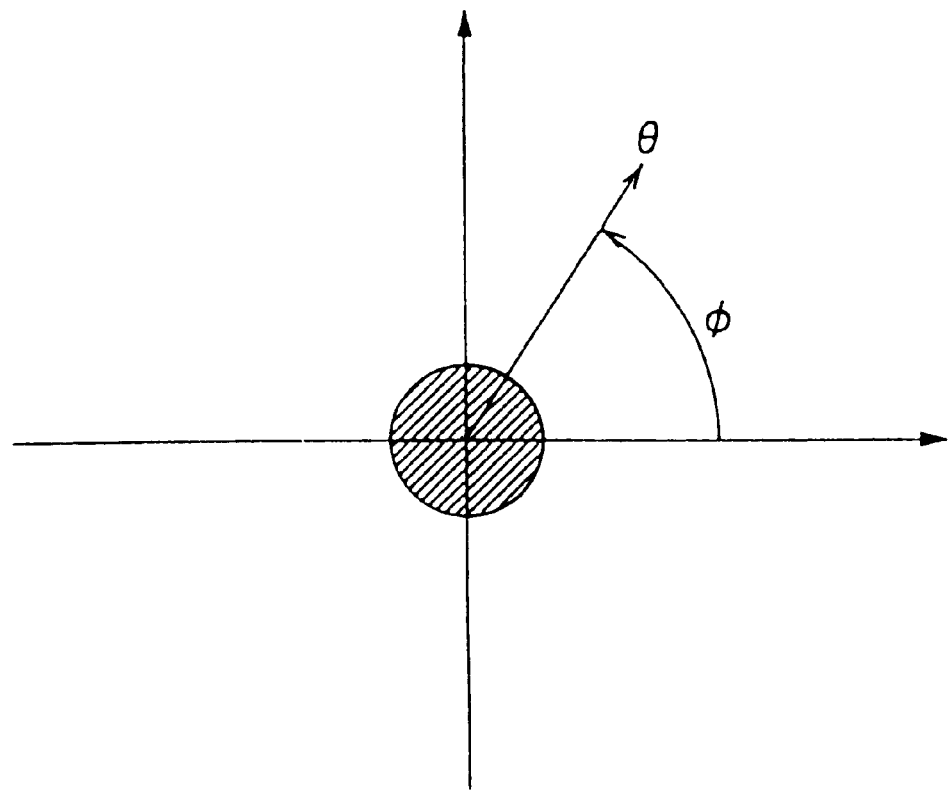
FIG. 49 is an explanatory diagram in which an angle distribution of the exit light beams in the normal illumination optical system is displayed on the flat surface having an azimuth angle φ and an inclined angle θ of the incidence angle to the display panel.
Figure 50:
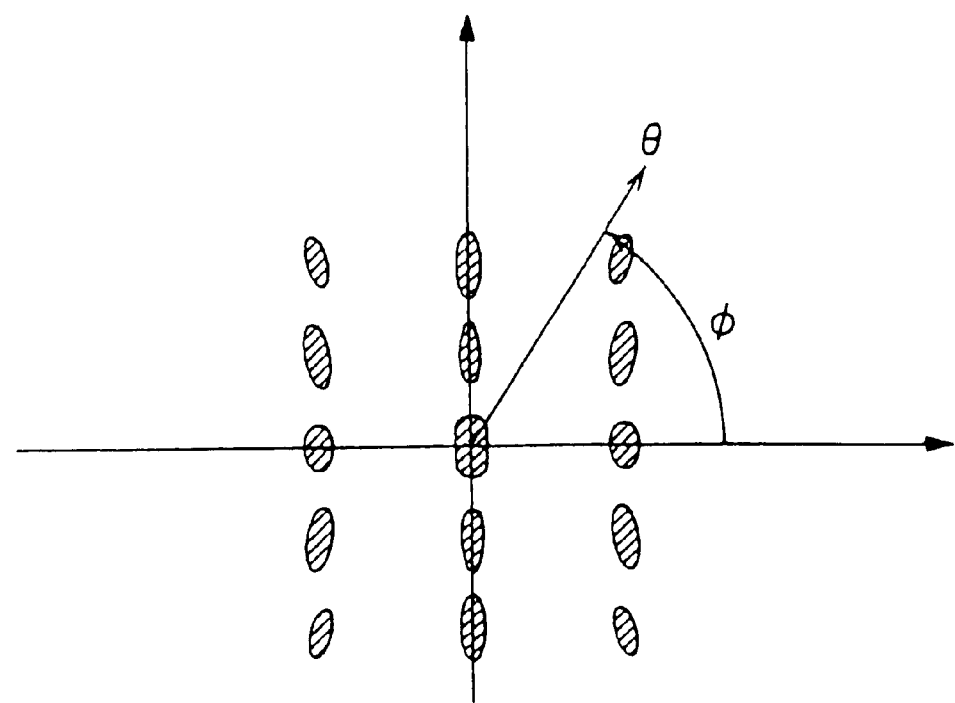
FIG. 50 is an explanatory diagram in which the angle distribution of the exit light beams in the illumination device using a (3×5) lens array is displayed on the flat surface having the azimuth angle φ and the inclined angle θ of the incidence angle to the display panel.
Figure 51B:
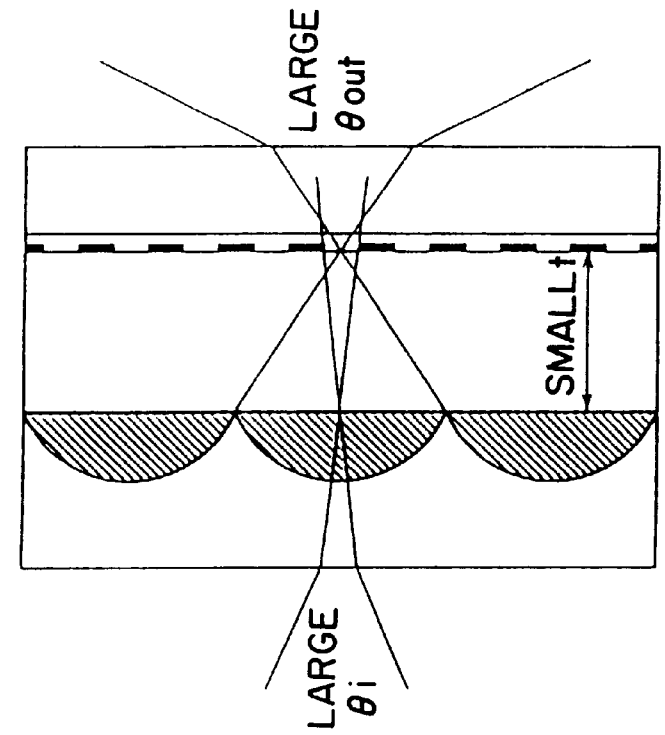
FIGS. 51A and 51B are explanatory views each schematically showing a maximum distance between the image forming element and the pixel aperture aggregation when the range of the angle distribution of the incidence angle of the incident light beams is small and when large.
Figure 51A:
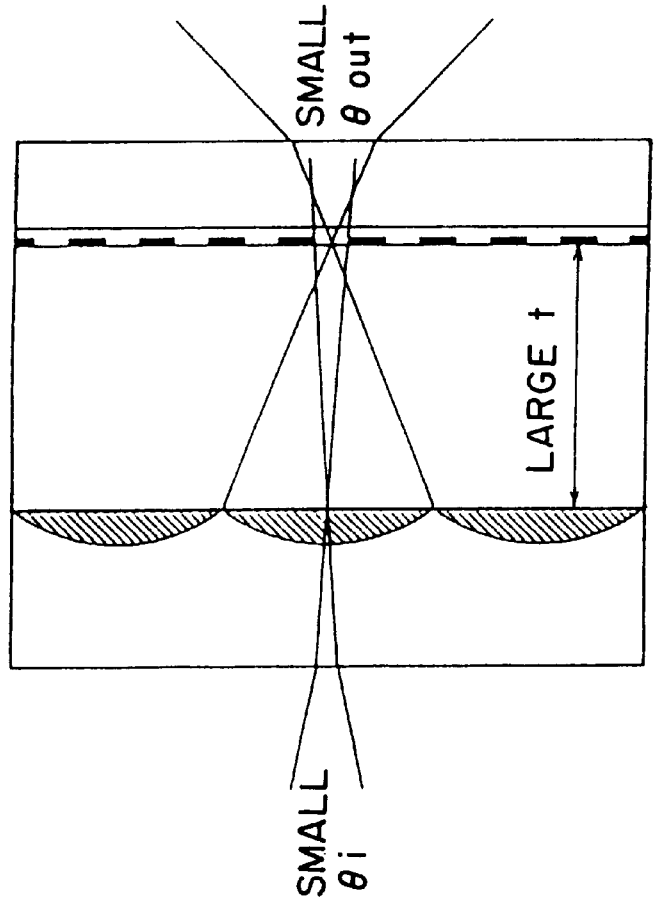
Figure 52:
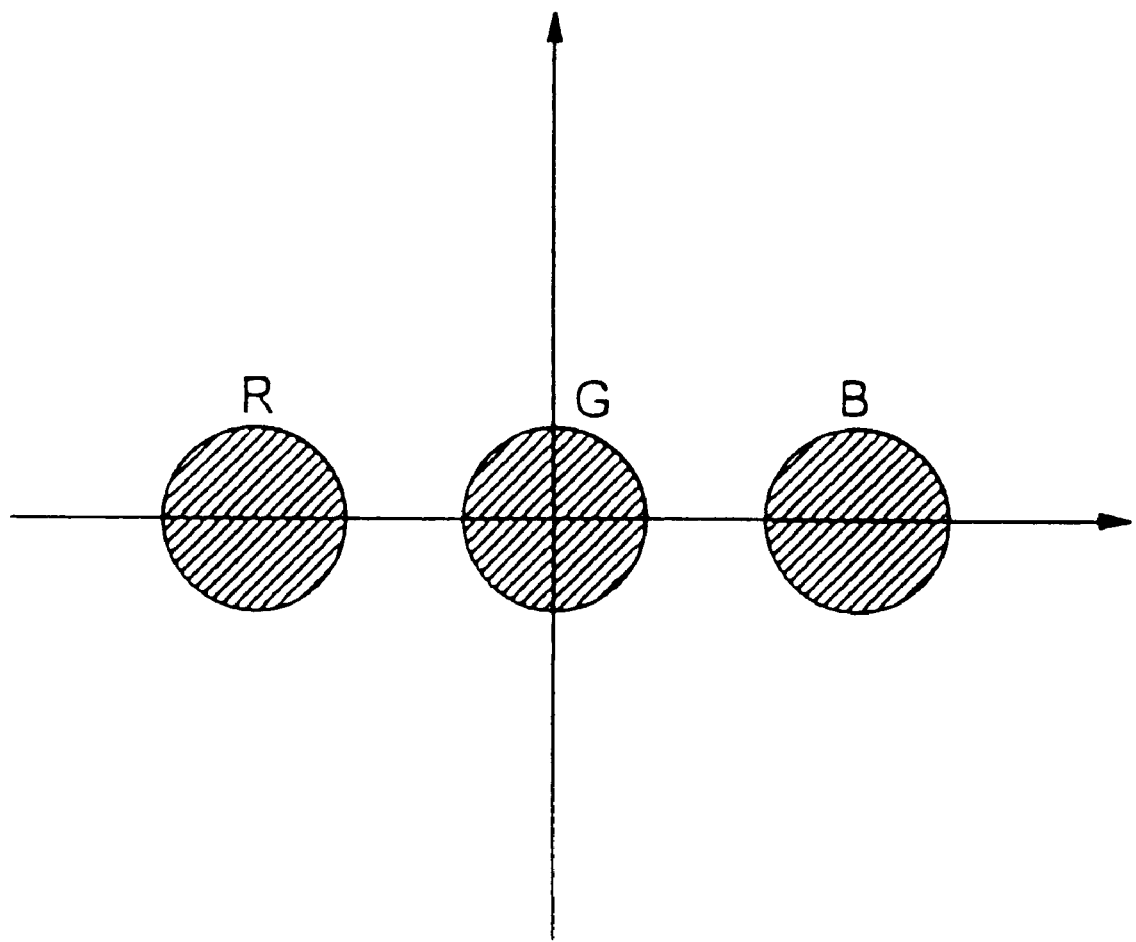
FIG. 52 is an explanatory diagram in which the angle distribution after being angularly separated into three colors is displayed on the flat surface in the case of the normal illumination optical system.
Figure 53:
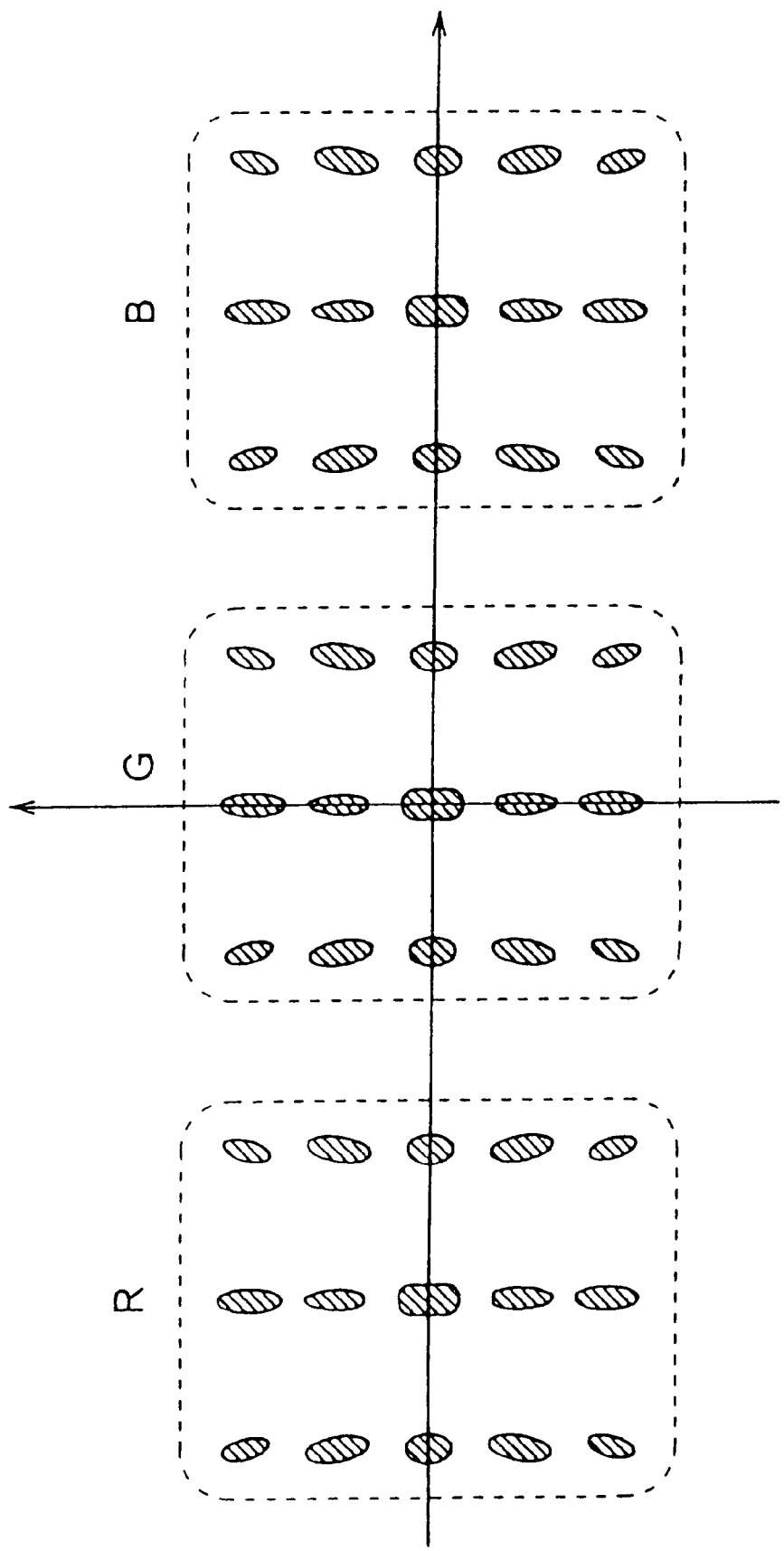
FIG. 53 is an explanatory diagram in which the angle distribution after being angularly separated into three colors is displayed on the flat surface in the case of the illumination device using the lens array.

When comparing the display device in the seventh embodiment with the prior art display device illustrated in FIG. 48, the display device in the ninth embodiment can be downsized with fewer parts, and can be therefore reduced in weight on the whole. Further, a decrease in the costs can be expected.

(Eighth Embodiment)

Figure 27:
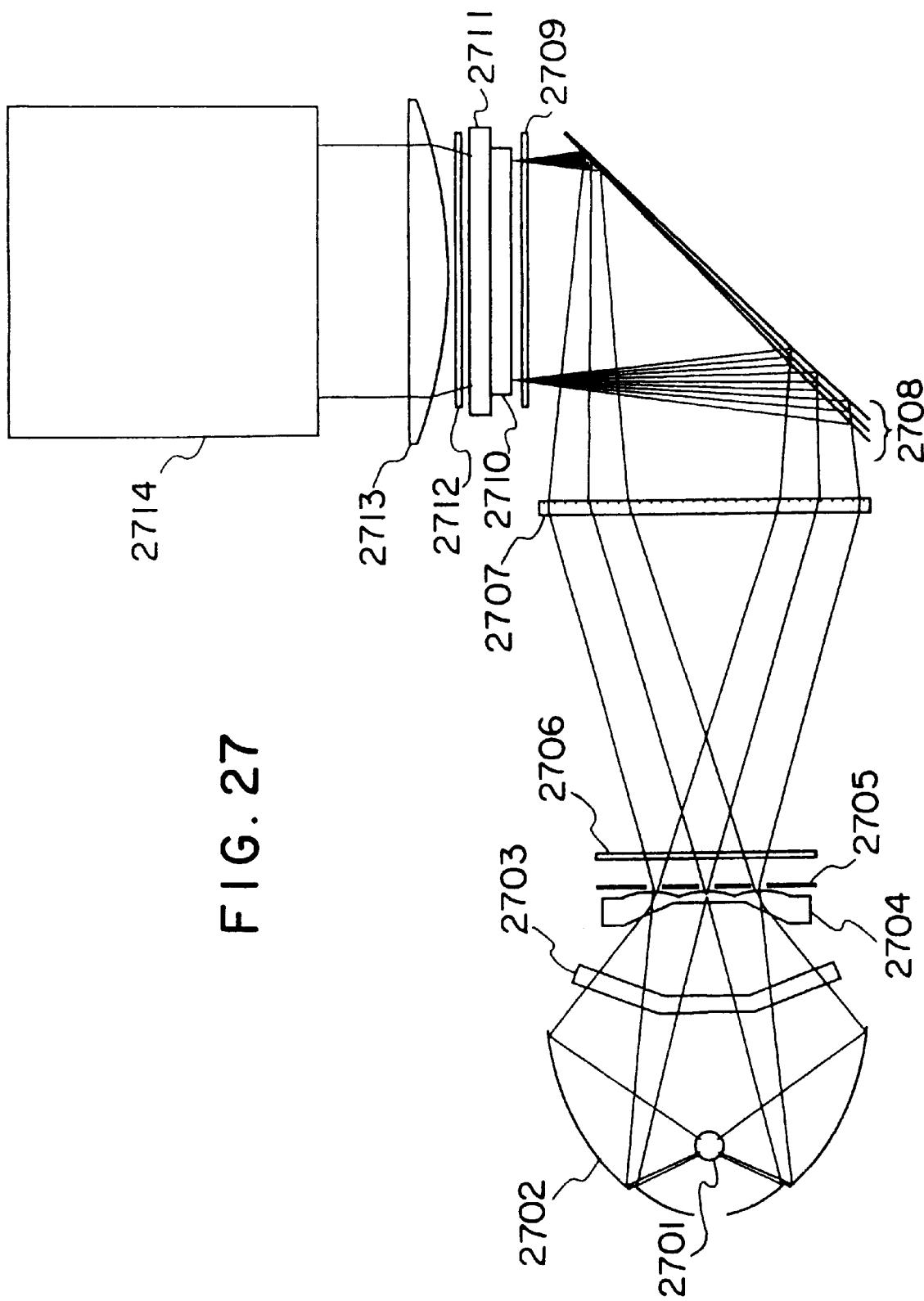
FIG. 27 is a view illustrating an optical construction of the projection type color liquid crystal display device in an eighth embodiment of the present invention.

FIG. 27 is a view showing an optical construction of the projection display device in an eight embodiment of the present invention.

The light beams from a lamp 27 are converged in one direction by a concave reflecting mirror 2702. The concave reflecting mirror 2702 is, as shown in a front view of FIG. 28, constructed of six elements, and the light beams from the respective constructive elements are converged at lens arrays 2703, 2704.

Then, the light beams pass through a stop 2705 provided at an exit surface of the lens array 2704 and further an infrared/ultraviolet rays cut filter 2706, and are thereafter substantially collimated by a condenser lens 2707.

These collimated light beams are angularly separated into three colors by a dichroic mirror 2708 and travel through a polarizing plate 2709, thereby turning out polarized light beams. The polarized light beams are then incident upon a micro lens array 2710. Subsequently, the light beams pass through a liquid crystal panel 2711 and a polarizing plate 2712 and are thus modulated. The light beams are then projected by a filet lens 2713 and a projection lens 2714.

Figure 28:
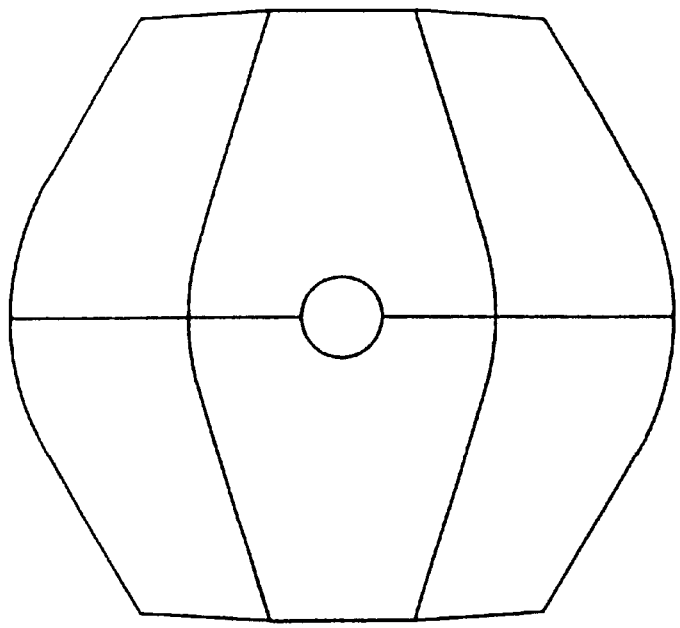
FIG. 28 is a front view of the reflecting mirror in the projection type color liquid crystal display device in the eighth embodiment of the present invention.

FIG. 28 is a front view of the reflecting mirror 2702, wherein each of the reflecting mirror elements is constructed of six pieces of lengthwise elongated segments. The element of each reflecting mirror has a rotary elliptical surface with focal points in the vicinity of the lamp 2701 and in the vicinity of the lens array 2704.

The light beams emitted from the lamp 2701 and reflected by those reflecting mirror elements form a focus, and a lengthwise focal position thereof is extended by the lens 2703 toward the condenser lens 2707 farther than the lens array 3504.

Figure 29:
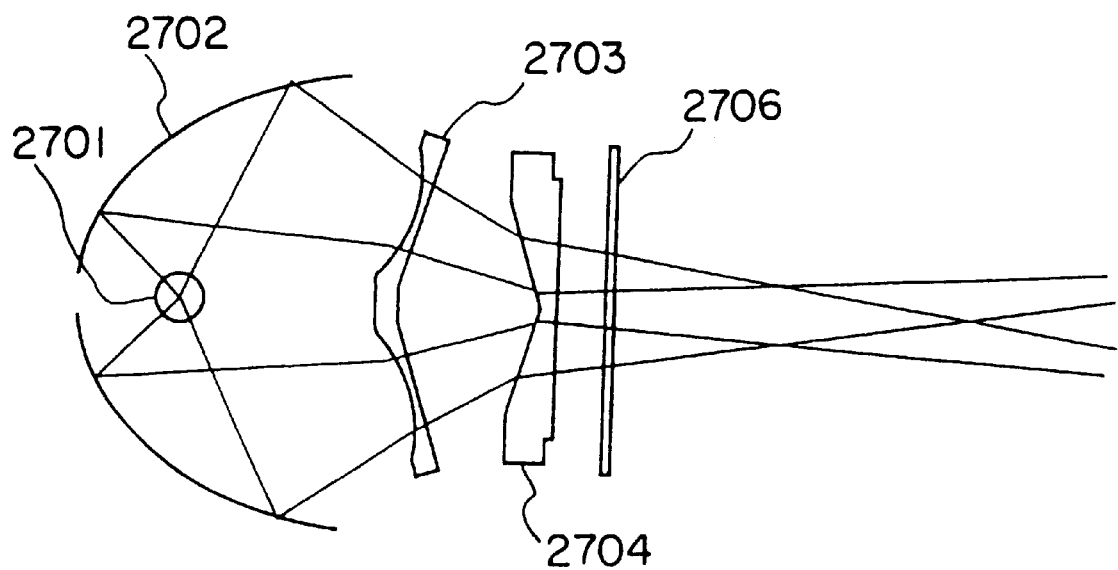
FIG. 29 shows a vertical section of the peripheral portion of the reflecting mirror, and also a construction of the lens array in the projection type color liquid crystal display device in the eighth embodiment of the present invention.
Figure 30:
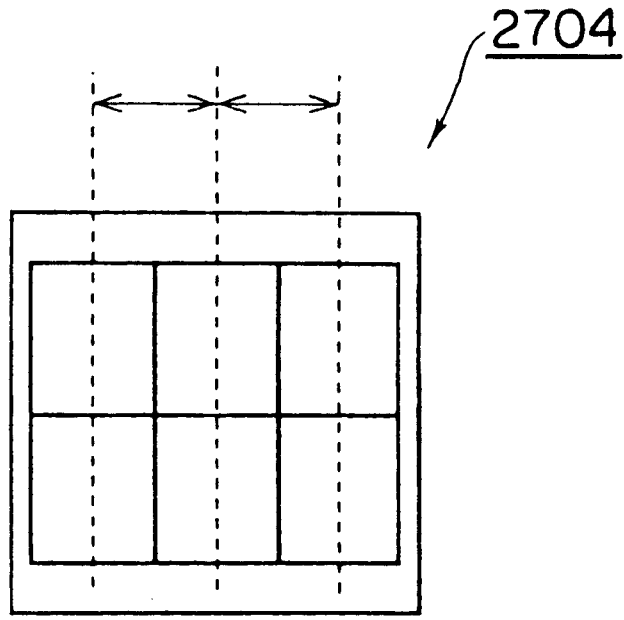
FIG. 30 is a front view illustrating the lens array in the projection type color liquid crystal display device in the eighth embodiment.

FIG. 29 shows states of the reflecting mirror 2702, the lens 2703 and the lens array 2704 as viewed in the sectional direction perpendicular to that in FIG. 27. It can be understood from FIGS. 27 and 29 that the lens array 2703 exerts no influence on the direction of the light beams in the direction shown in FIG. 27, and the light beams converge at the position of the lens array 2704, which position is defined as the focal position of the concave reflecting mirror 2702. Contrastingly in the direction in FIG. 29, that functions to shift the converging position by the lens array 2703 further toward the condenser lens 2707.

The focal point of the condenser lens 2707 exists in a position of the stop 2705 within the plane in FIG. 27 and exists in a middle position between the condenser lens 2707 and the lens array 2704 for converging the light beams within the plane in FIG. 29, which is perpendicular to the above plane. With this arrangement, the light beams emerging from the condenser lens 2707 have a large width within the plane in FIG. 27 and a small width within the plane in FIG. 27.

With this operation, in spite of the fact that each of the constructive elements of the concave mirror 2702 is elongate, there must be substantially an analogy to the shape of the display unit having the 9:16 aspect ratio just when the liquid crystal panel 2711 is irradiated with the light beams.

Figure 31:
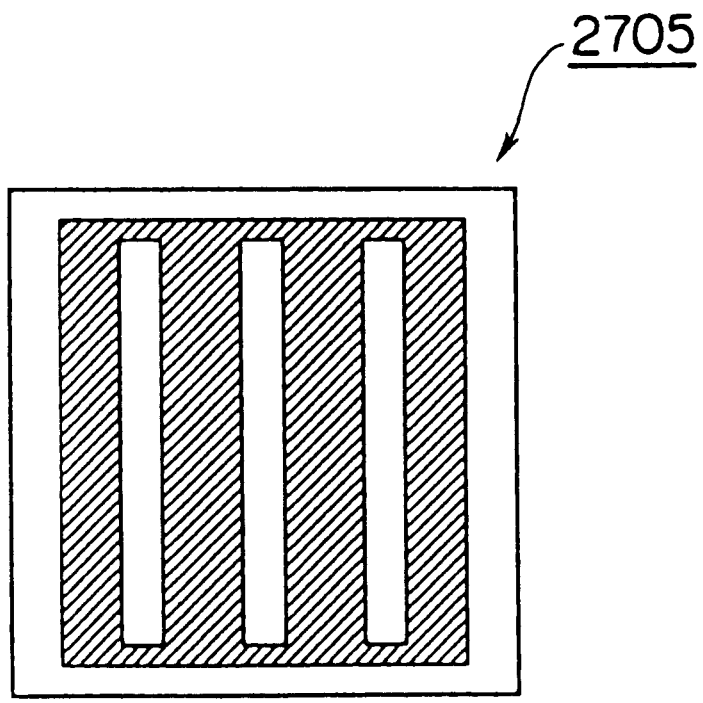
FIG. 31 is a front view illustrating a stop in the projection type color liquid crystal display device in the eighth embodiment of the present invention.

The stop 2705 provided at the exit surface of the lens array 2704 assumes a vertically-extended slit-like configuration as shown in FIG. 31, and a necessary light parallelism is to be obtained after penetrating the condenser lens 2707. FIG. 31 shows a configuration of the lens array 2704 as viewed from front.

Figure 43:
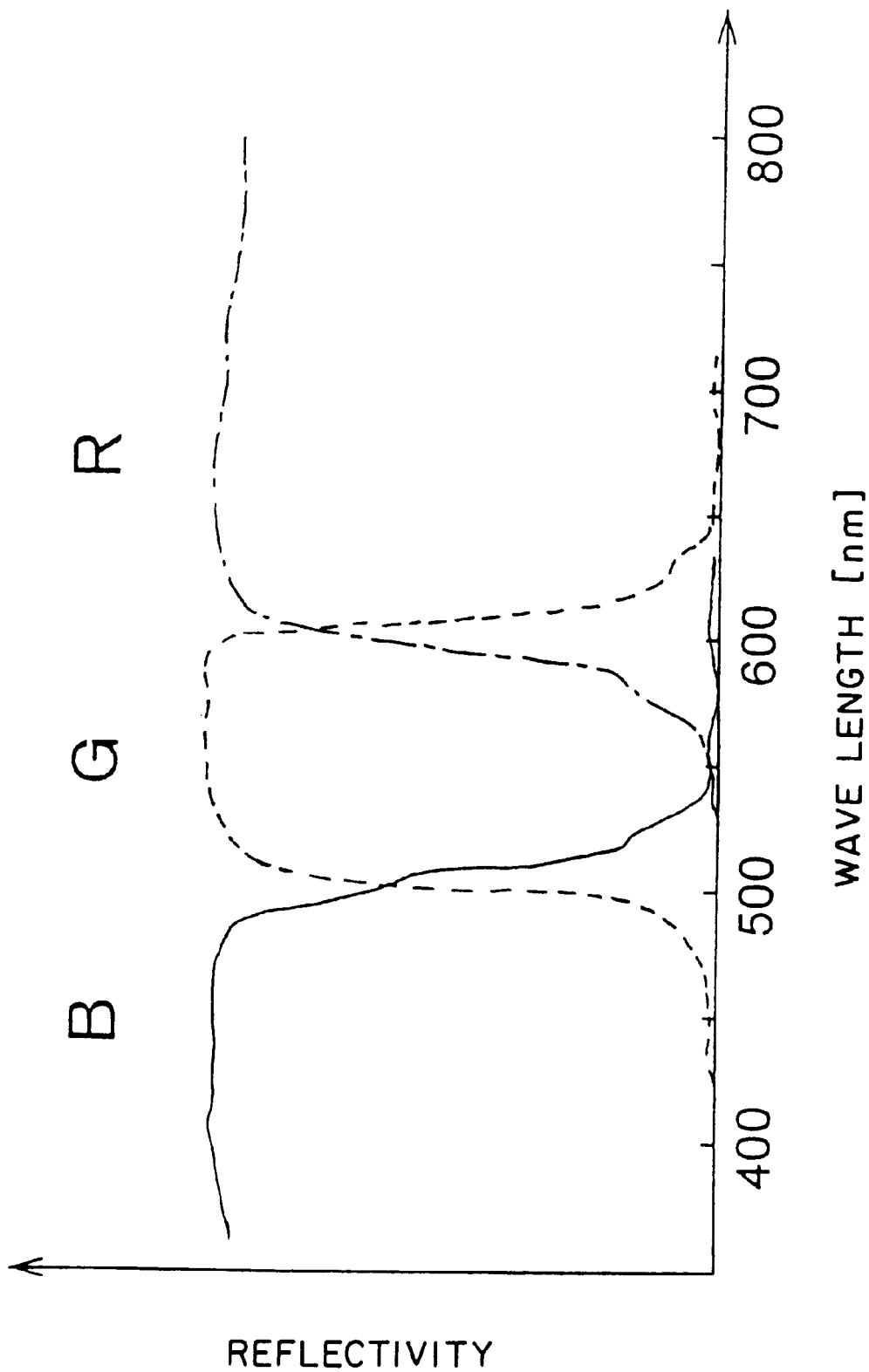
FIG. 43 is a graph showing one example of the characteristics of three dichroic mirrors constituting a color separation mirror unit in the conventional single plate type color display device.
Figure 44:
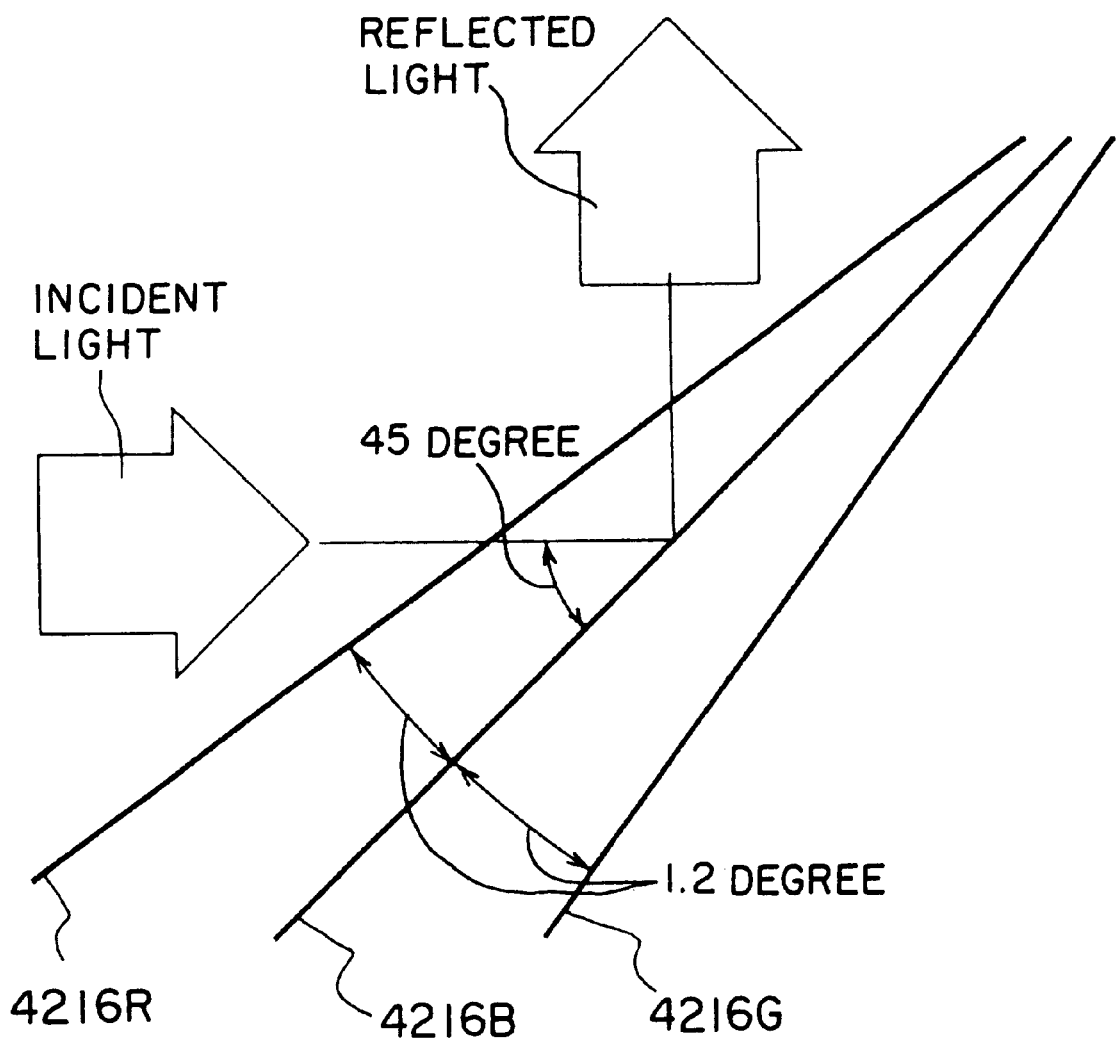
FIG. 44 is an explanatory view schematically showing angles at which disposed the three dichroic mirrors constituting the color separation mirror unit in the conventional single plate type color display device.
Figure 45:
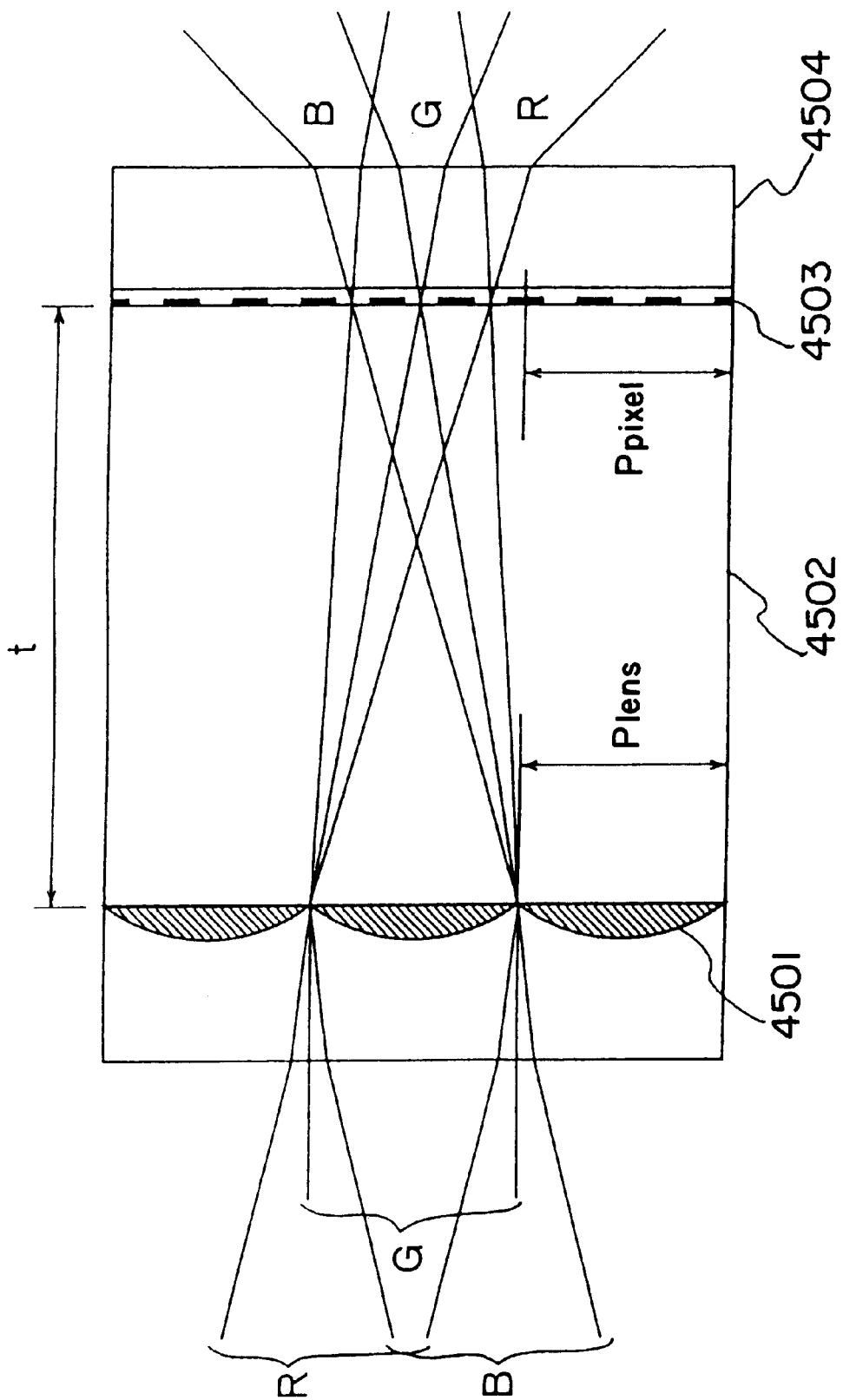
FIG. 45 is an explanatory view schematically showing a relationship of the micro lens array and the liquid crystal panel in the conventional single plate type color display device.
Figure 46A:
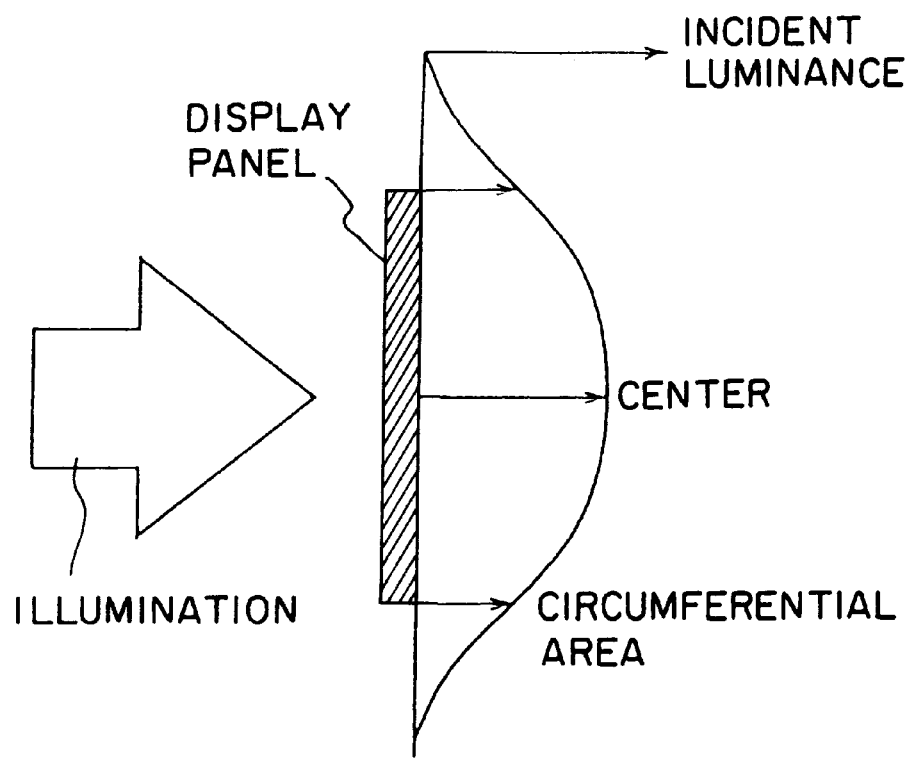
FIGS. 46A and 46B are explanatory views schematically showing an incidence luminance on the liquid crystal display panel in the projection type display device and in the prior art projection type display device, and also showing a relationship between a luminance non-uniformity and a circumferential illuminance.
Figure 46B:
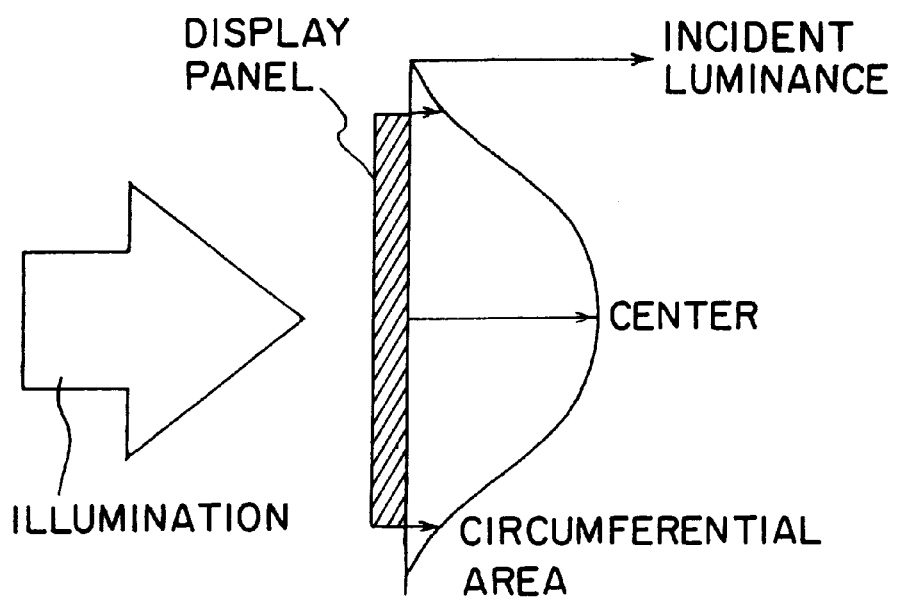

The dichroic mirror unit 2708 comprises three pieces of dichroic mirrors exhibiting the characteristics as shown in FIG. 43, and respectively disposed as shown in FIG. 4. The white light beams incident on the dichroic mirrors at three different angles are angularly separated into three colors to become nine beams of light.

Relationship between these light beams, the micro lens 2710 and the liquid crystal panel 2711 is the same as that shown in FIG. 6A.

The light beams penetrating the lenses of a micro lens array 2710 pass through the pixel apertures driven by the image signals of the respective colors, and hence the color display can be actualized.

The present invention is evaluated by comparing the display device in the tenth embodiment with the single plate type display device based on the conventional construction shown in FIG. 42.

First of all, the display uniformity is evaluated based on a maximum-to-average ratio of a maximum value of measured values at nine points to an average value of the 9-point measured values, which involves previously dividing the projection screen into nine segments and measuring illuminances of centers of these segments. The above value is 1.6 in the prior art single plate type display device, and there is obtained a preferable 1.4-fold value in the display device in the eighth embodiment.

Furthermore, as for the brightness of the display, a light flux emerging from the projection lens is obtained as an evaluation value on the basis of the above-mentioned 9-point average illuminance and the display area as well. The brightness is 180 lumen in the prior art single plate type display device, and contrastingly there is obtained 220 lumen which is 1.2-fold brightness.

(Ninth Embodiment)

Figure 32:
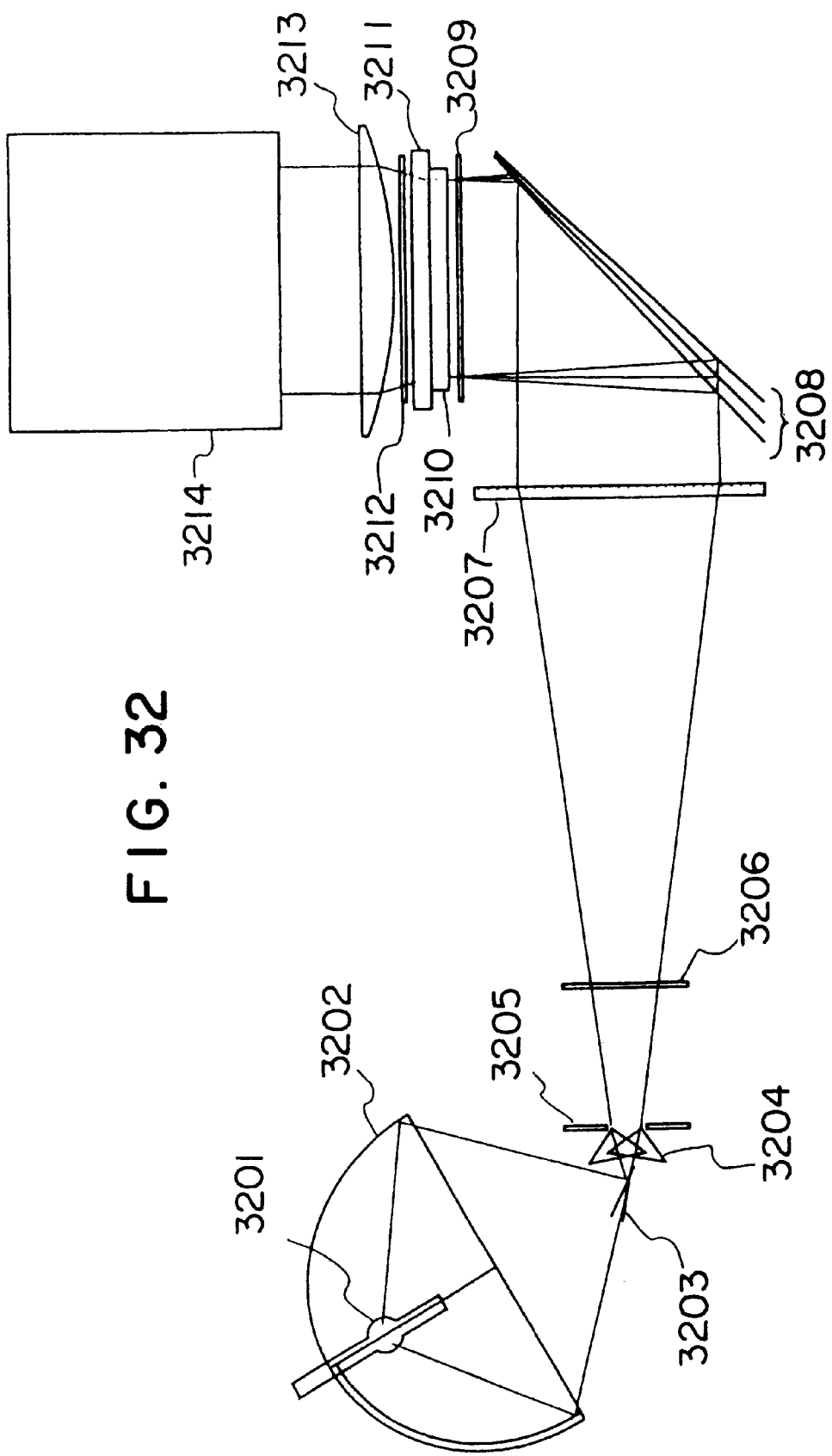
FIG. 32 is an explanatory view showing an optical construction of a single plate type projection display device in a ninth embodiment of the present invention.

FIG. 32 is a view showing an optical construction of the single plate type projection display in a sixth embodiment of the present invention.

The light beams from a lamp 3201 are, as in the first embodiment, converged in one direction by a concave reflecting mirror 3202. The concave reflecting mirror 3201 is, as shown in a front view of FIG. 33A, constructed of four segments. The light beams from the respective elements are reflected by four pieces of plane mirrors 3203 for correcting the directions of the light beams and thereafter converged at four conical lenses 3204.

Then, the converged light beams pass through a stop 3205 provided on an exit plane of the conical lens 3212 and further through an infrared/ultraviolet rays cut filter 3206, and thereafter substantially collimated by a condenser lens 3207.

These light beams are angularly separated into three colors by a dichroic mirror unit 3208, then polarized by a polarizing plate 3209 and fall on a micro lens array 3210. Subsequently, the light beams are modulated passing through a liquid crystal panel 3211 and a polarizing plate 3212 as well, and projected by a field lens 3213 and a projection lens 3214.

FIG. 33B is a side view of a concave reflecting mirror 3202 used in the sixth embodiment, showing a configuration and a focal position thereof. As can be understood from FIG. 33B, the concave reflecting mirror 3202 comprises four reflecting segments having four rotary elliptical surfaces. Reflecting mirrors 32021, 32022, 32023, 32024 defined as the reflecting mirror segments have a focal point A on one side, and focal points B1, B2, B3, B4 on the other side.

The lamp is placed substantially in a position of the focal point A, and the light beams from the lamp are converged at four portions arranged lengthwise on one line by the four reflecting mirror segments.

The focal points aligned there exist on the plane perpendicular to the sheet surface.

Four pieces of plane reflecting mirrors 3204 disposed slightly ahead of these focal points function to polarize the directions of the light beams so that the light beams, penetrating the conical lens 3204 disposed slantwise with respect to the optical axis extending through the center of the condenser lens 3207 as well as the center of the stop 3205, are overlapped in the position of the liquid crystal panel 3211. The uniformity of the light intensity is enhanced because of being illuminated with the light beams in superposition which come from the four reflecting mirror segments.

The stop 3205 provided at the exit surface of the four conical lenses 3204 is formed with rectangular apertures corresponding to a state where these conical lenses are arranged lengthwise. The light beams passing through the stop 3205 penetrate the condenser lens 3207 and thereafter exhibits an angle distribution as shown in FIG. 34.

Figure 34:
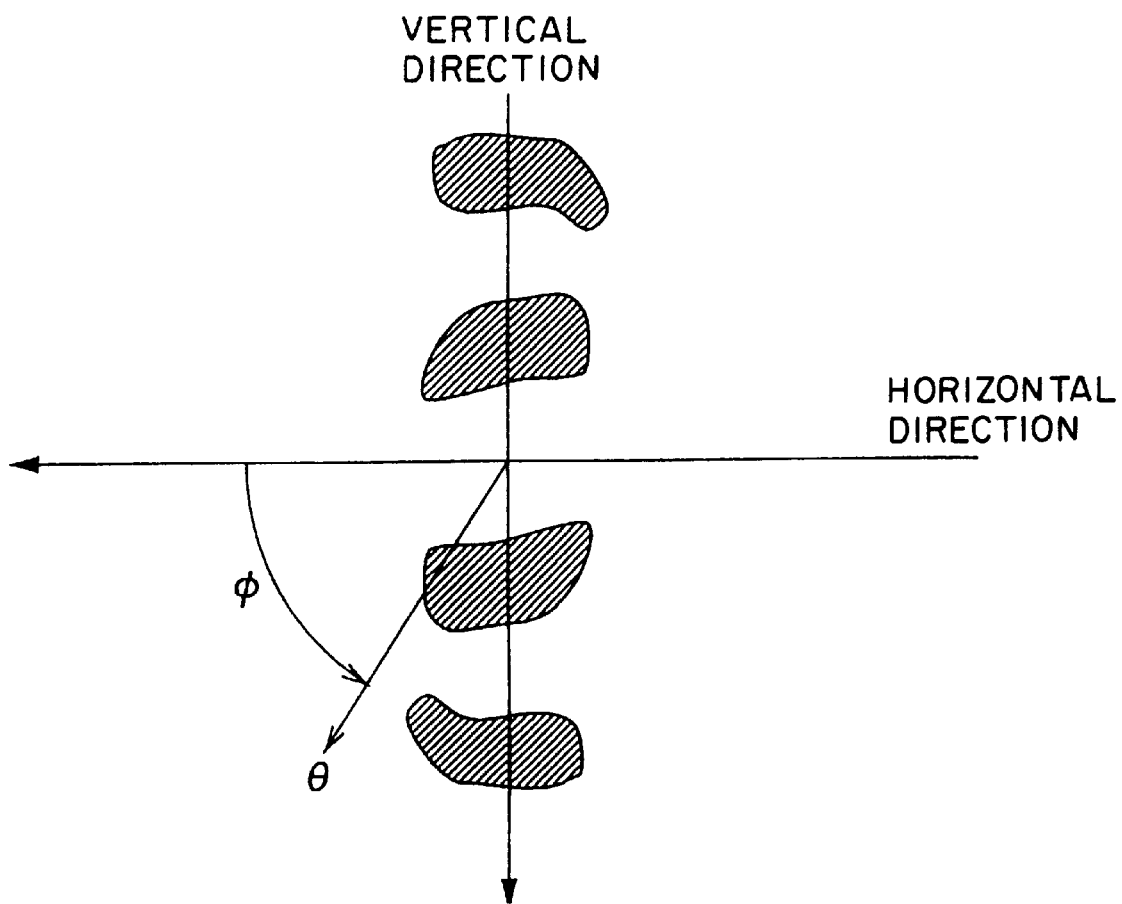
FIG. 34 is an explanatory view showing an angle distribution of the light beams passing through a stop in the display device in the ninth embodiment of the present invention.

FIG. 34 is a diagram showing the angle distribution for the liquid crystal panel 3211 by way of an azimuth angle $\phi$ and an inclined angle $\theta$. It can be recognized from the four light fluxes passing through the four conical lenses that the illumination is characterized by a large lengthwise angle distribution and a small crosswise angle distribution.

The dichroic mirror unit 3208 comprises three pieces of dichroic mirrors having the same characteristics as those shown in FIG. 43, and are arranged in the same way as that shown in FIG. 4. The white light beams incident on these dichroic mirrors are angularly separated into three colors.

Figure 35:
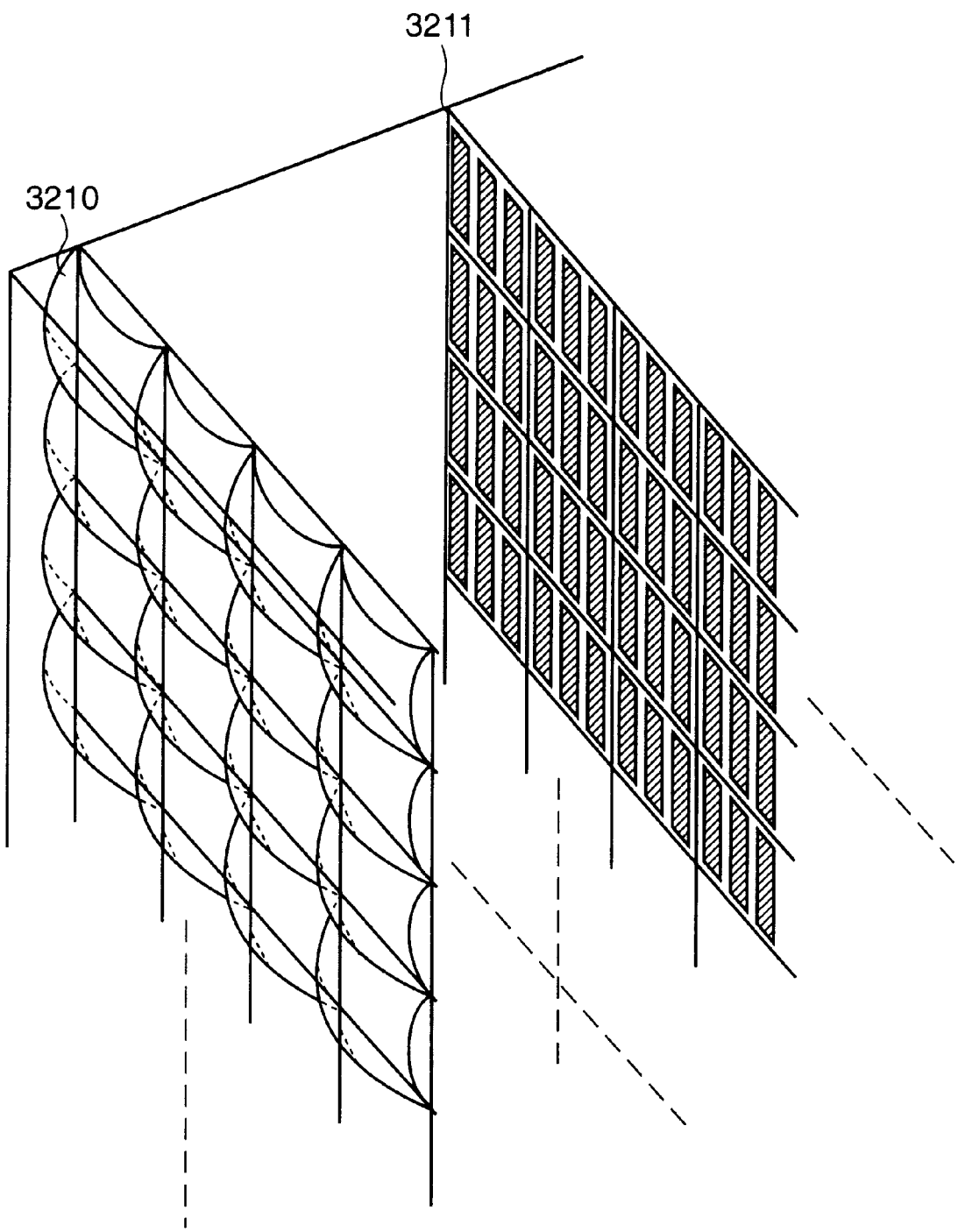
FIG. 35 is an explanatory view schematically showing a relationship between the micro lens array and the pixel apertures in the ninth embodiment of the present invention.

FIG. 35 shows a relationship between these light beams, the micro lens 3210 and the liquid crystal panel 3211.

The micro lens 3210 is a spherical convex lens, and an image of the incident light beam shown in FIG. 34 is formed within the configuration of the aperture of the liquid crystal panel 3211. At this time, the angle distribution shown in FIG. 34 is angularly separated into three by the dichroic mirror 3208, and the light beams penetrating the lenses of the micro lens array 3209 pass through the pixel apertures driven by the image signals of the respective colors. The color display can be thereby actualized.

Figure 36A:
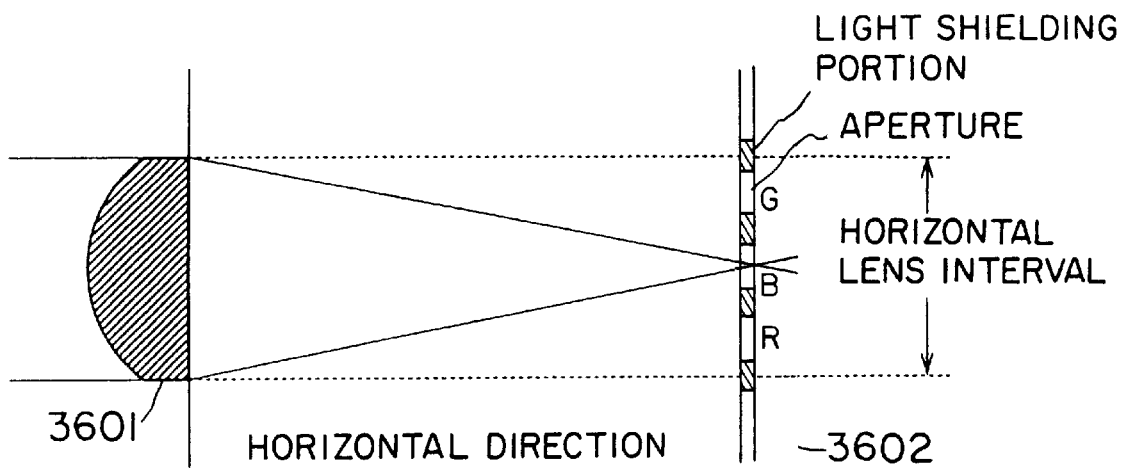
FIGS. 36A and 36B are explanatory views schematically showing a relationship between one micro lens and one pixel aperture in the sixth embodiment of the present invention.
Figure 36B:
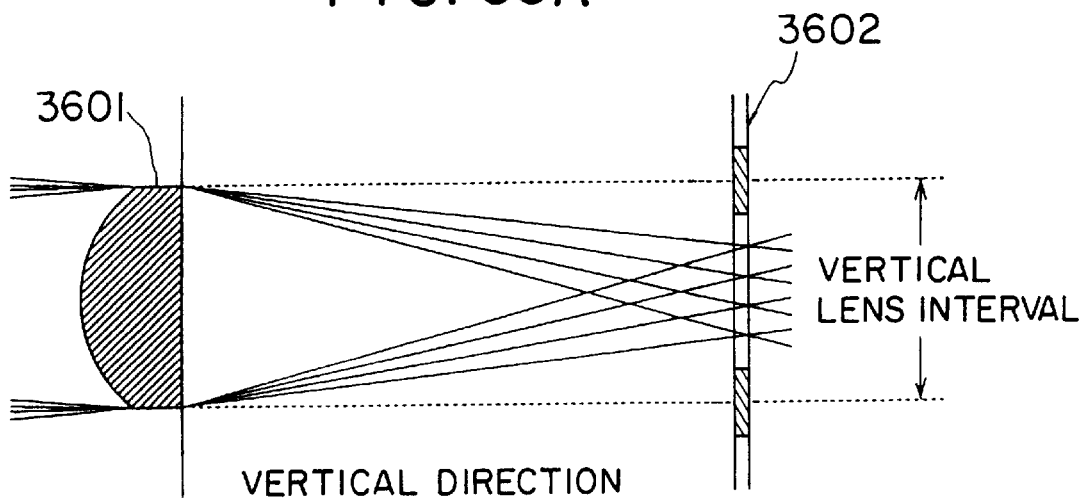

FIGS. 36A and 36B show a relationship between the pixel aperture and one micro lens with respect to the light beams reflected by the central dichroic mirror of the dichroic mirror unit 3208 and incident upon the micro lens array 3209.

A micro lens 3601 converges the incident lights at a pixel aperture 3602, wherein the blue light beams are converged narrowly in the horizontal direction at the pixel aperture B by the central dichroic mirror (FIG. 21A) but widely converged in the vertical direction (FIG. 21B).

The light utilizing efficiency is thus remarkably enhanced by matching the illumination through the micro lens array to the configuration of the pixel aperture 3602 shown in FIG. 36.

The effects of the present invention are evaluated by comparing the display device in the sixth embodiment with the single plate type display device based on the prior art construction illustrated in FIG. 42.

At first, the uniformity of the display is evaluated by a maximum-to-average ratio of a maximum value of values measured at 9 points to an average value of the measured values at the 9 points, which previously involves dividing the projection screen into nine segments and measuring an illuminance at the center of each of these divided segments.

According to the single plate type display device based on the conventional construction, this value is 1.6, however, a preferable 1.3-fold value is obtained in the ninth embodiment.

Further, as for the display brightness, a light flux emerging from the projection lens is obtained as an evaluation value on the basis of the 9-point average illuminance and the display area. The brightness is 180 lument in the single plate type display device based on the conventional construction and contrastingly enhanced as high as 280 lumens in the ninth embodiment.

(Tenth Embodiment)

Figure 37:
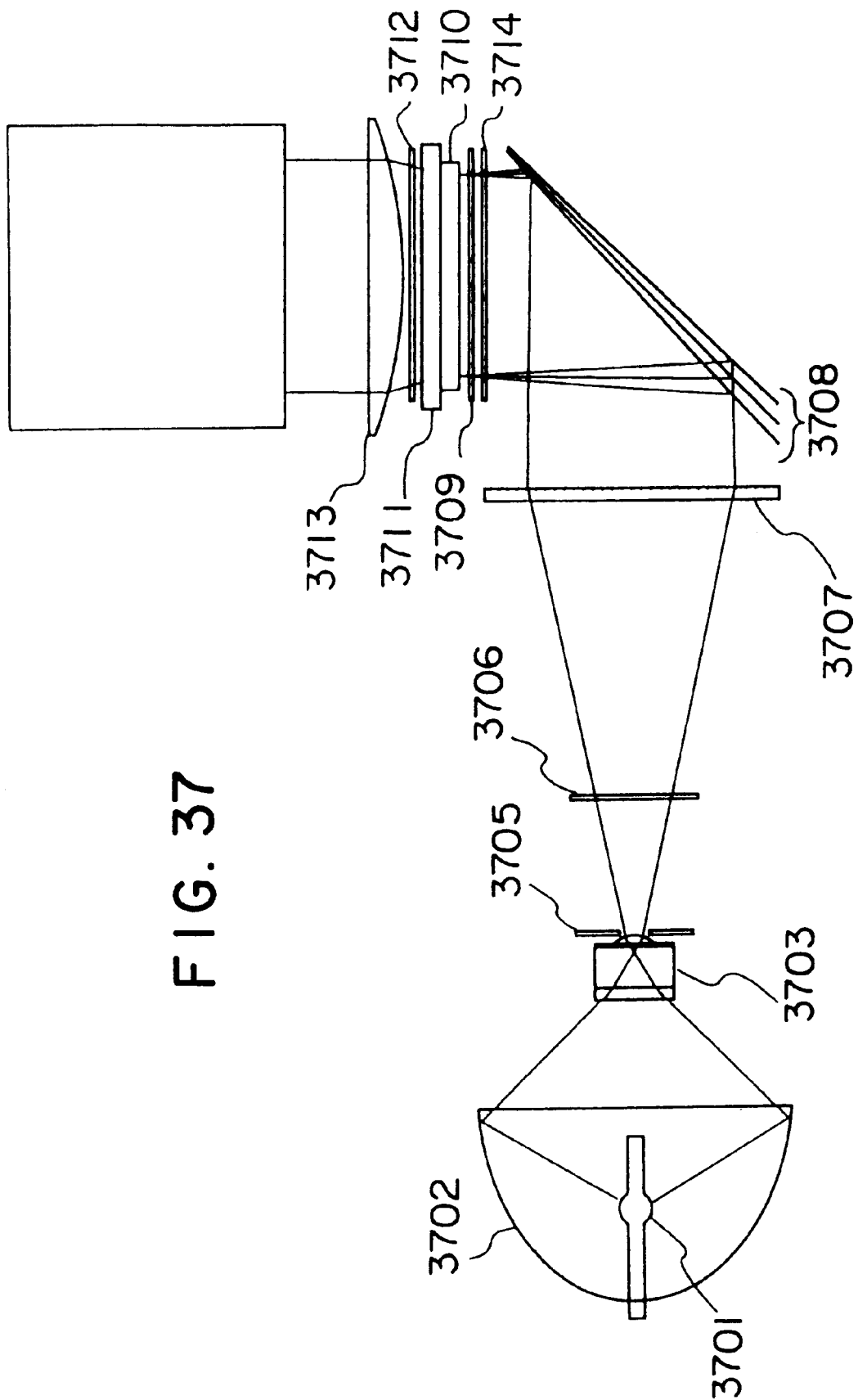
FIG. 37 is an explanatory view showing an optical construction of the single plate type projection display device in a tenth embodiment of the present invention.

FIG. 37 is a view illustrating an optical construction of the single plate type projection display device in a tenth embodiment of the present invention.

The tenth embodiment is characterized by disposing a polarization beam splitter 3703 defined as a polarization splitting element in a position at which the light beams are converged by a concave reflecting mirror 3702.

The concave reflecting mirror 3702 is, as illustrated in FIGS. 38A and 38B, constructed of two mirror segments, i.e., a reflecting mirror 1 and a reflecting mirror 2. These reflecting mirrors 1, 2 converge the light beams from the lamp at two focal positions B1 and B2.

Figure 39:
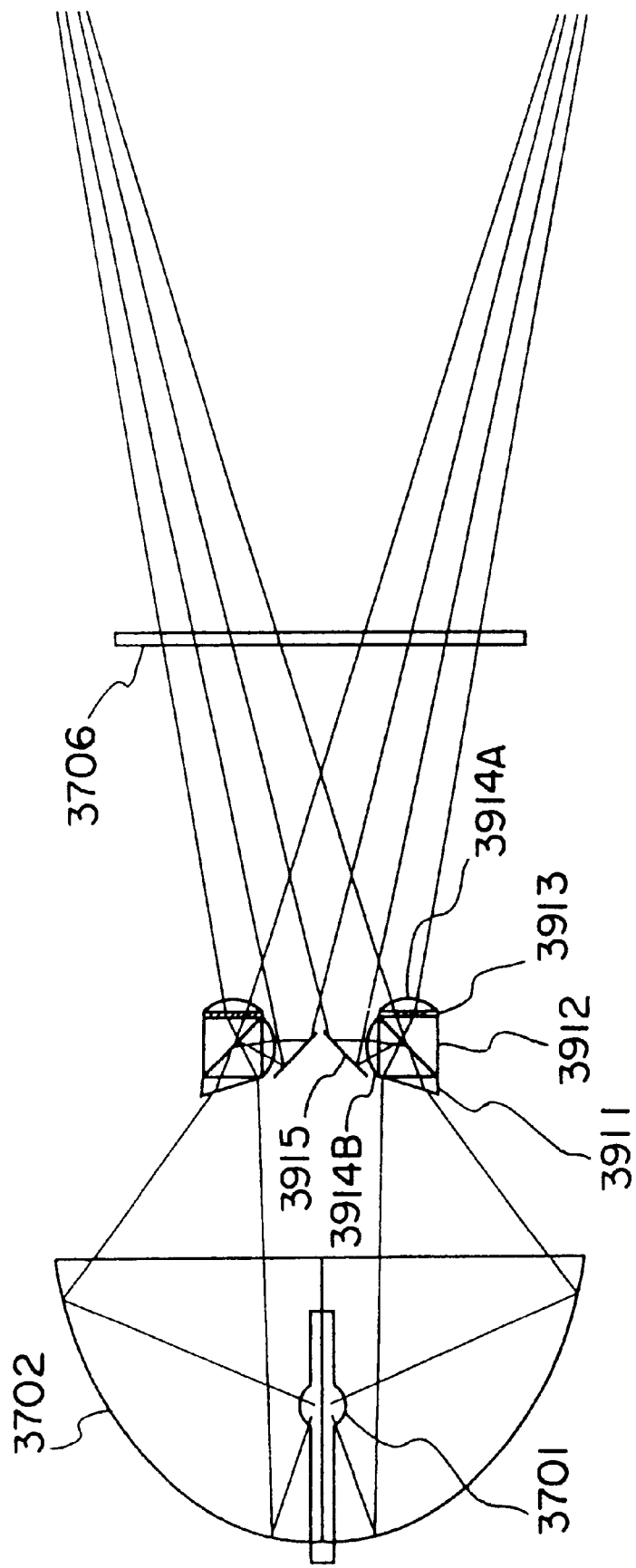
FIG. 39 is an explanatory view showing details of a construction of elements in the vicinity of the reflecting mirror in the tenth embodiment of the present invention.

In close proximity to these two focal points, as shown in FIG. 39, a triangular prism 3911, a polarization beam splitter 3912, a ½ wavelength phase difference plate 3913, convex lenses 3914A, 3914B, and a reflecting mirror 3915 are disposed.

The triangular prism 3911 functions to deflect the light beam from the concave reflecting mirror 3702 toward a condenser lens 3707. The light beam deflected by the triangular prism 3911 is split into a P-polarized light beam and an S-polarized light beam by the polarization beam splitter 3912. The P-polarized light beam penetrates the polarization beam splitter 3912, and a direction of the polarization thereof is deflected in a direction of the S-polarization. Then the light beam passes through the convex lens 3914A and travels forward in the direction of the condenser lens 3907.

The S-polarized light beam is reflected inside by the polarization beam splitter, and reflected by the reflecting mirror 3915 after passing through the convex lens 3914B. The reflected light beam then travels forward in the direction of the condenser lens 3707.

As described above, the light beam from the lamp 3701 turns out to be the S-polarized light beam and is incident upon the condenser lens 3707 via a stop (unillustrated in FIG. 39). The S-polarized light beam is then substantially collimated by the condenser lens 3707 after passing through the infrared/ultraviolet rays cut filter 3706.

Another difference from the ninth embodiment is that the polarizing rotator 3714 shown in FIG. 41 is disposed anterior to the polarizing plate 3709.

This polarizing rotator 3714 is required for matching the polarizing direction of the polarizing plate 3709 for selecting the polarization directed at 45 degrees to the liquid crystal panel, and the polarizing direction of the light beams from the dichroic mirror 3708.

With this operation, in the conventional projection display device shown in FIG. 41, the incident light beams, though approximately ½ of them have hitherto been lost, can be now utilized for the display without any loss by the polarizing plate disposed on the incidence side.

The present invention is evaluated by comparing the display device in the seventh embodiment with the single plate type display device based on the prior art construction shown in FIG. 41.

To start with, the uniformity of the display is evaluated by a maximum-to-average ratio of a maximum value of values measured at 9 points to an average value of the measured values at the 9 points, which previously involves dividing the projection screen into nine segments and measuring an illuminance at the center of each of these divided segments.

According to the single plate type display device based on the conventional construction, this value is 1.6, however, a preferable 1.5-fold value is obtained in this embodiment.

Further, as for the display brightness, a light flux emerging from the projection lens is obtained as an evaluation value on the basis of the 9-point average illuminance and the display area. The brightness is 180 lumens in the single plate type display device based on the conventional construction and contrastingly enhanced as high as 420 lumen in this embodiment.

According to the display device of the present invention, the irradiation light beams emitted from the light source are uniformly incident upon the pixels on the liquid crystal panel by use of the light distributing mechanism, and therefore the luminance distributions of the incident light beams are uniformized. A preferable display quality with a less unevenness on the display can be thereby acquired.

Further, the display device according to the present invention uses the reflecting mirror consisting of the plurality of reflecting mirror elements having the focal positions different from each other, so that the length of the light path can be shortened. It is therefore feasible to provide the down-sized display device exhibiting the high efficiency.

What is claimed is:

1. A display device for displaying an image, comprising:
    a light source;
    light distributing means for splitting light emitted from said light source into multiple beams and transmitting the multiple beams along respective multiple optical paths;
    a converging element array formed with a plurality of converging elements for converging irradiation light beams transmitted from the light distributing means;
    a condensing lens for condensing said multiple light beams into corresponding ones of said converging elements;

a display panel including two-dimensionally arrayed pixels defined as a unit for controlling an intensity of irradiated light from said converging element array in response to brightness of corresponding pixel of an image; and projection means for projecting an image of said display panel on a screen.

2. The display device according to claim 1, wherein said light distributing means is constructed of a lens array including a plurality of lenses, and each of said lenses splits the irradiation light beams and converges the split light beams.

3. The display device according to claim 2, wherein:

said lens array includes a first lens array consisting of a plurality of first lenses, and a second lens array consisting of a plurality of second lenses, said first lens array splits the illumination light using said plurality of first lenses and converges the split light beams, and said second lens array is disposed in positions including substantially focal positions at which the irradiation light beams are split and converged by said first lens array.

4. The display device according to claim 3, wherein said plurality of first lenses of said first lens array are arranged in one or more lines.

5. The display device according to claim 3, wherein said plurality of second lenses of said second lens array are arranged in one or more lines.

6. The display device according to claim 3, wherein said converging elements constituting said converging element array are disposed corresponding to said pixels provided in said display panel.

7. The display device according to claim 3, wherein said element array is constructed of micro lenses.

8. the display device according to claim 3, wherein said converging element array includes diffraction gratings as image forming elements.

9. The display device according to claim 3, wherein each pixel provided within said display panel controls a transmissivity of each of pixel apertures on the basis of an image signal, and is disposed corresponding to a set of N-pieces (N is a number of the pixel apertures and is a natural number 2 or larger) of pixel apertures for controlling the transmissivity on the basis of image signals of different colors.

10. The display device according to claim 9, further comprising color angle separating means for changing an angle of emerging light beams depending on a light wavelength, disposed between said second lens array and said converging element array.

11. The display device according to claim 9, further comprising a stop, disposed in the vicinity of said second lens array, for controlling a width of the emerging light beams in a direction in which lines of said second lens array are arranged, down to 2/N (N is the number of said pixel apertures contained in one unit of said pixels) of an interval at which the liens are arranged.

12. The display device according to claim 2, wherein a condenser lens having a focal point in the vicinity of said second lens array is provided on a light exit side of said second lens array, and the following condition is satisfied:

$$\frac{Pi(M-1)}{L \cdot M} \leq \frac{Pp}{n \cdot t} \leq \frac{Pi(M+1)}{L \cdot M}$$

wherein L is the distance between said condenser lens and said second lens array, M is the number of arranged lines of said second lens array, Pi is the interval between the lines of said second lens array, Pp is the formation pitch of said converging elements in the direction where the lines of said second lens array for said converging element array are arranged, t is the distance between said converging element and a pixel aperture of said pixel, and n is the relative index of an optical medium between said converging element array and said pixel unit.

13. The display device according to claim 3, wherein said converging element of said converging element array has its refracting power acting in a direction orthogonal to the direction in which the lines of said second lens array are arranged, the refracting power being weaker than a refracting power acting in the direction in which the lines of said second lens array are arranged.

14. The display device according to claim 13, wherein said converging element is constructed of a cylindrical surface lens.

15. The display device according to claim 3, wherein an array of the lenses constituting said second lens array is substantially analogous to an array of said converging elements for said converging element array.

16. The display device according to claim 15, wherein let VF be the lengthwise side of a substantially square display unit of said display panel, HF be the crosswise side thereof, VP be the lengthwise disposition interval of said converging elements, and HP be the crosswise disposition interval, and the following relationship is given:

VF/HF<VP/HP when this relationship is established, the refracting power of said first lens array as a whole is set smaller in the vertical direction than that in the horizontal direction, and the refracting power of said second lens array as a whole is set larger in the vertical direction than that in the horizontal direction, and:

VF/HF>VP/HP when this relationship is established, the refracting power of said first lens array as a whole is set larger in the vertical direction than that in the horizontal direction, and the refracting power of said second lens array as a whole is set smaller than that in horizontal direction.

17. The display device according to claim 3, further comprising a reflecting plate for reflecting the light beams emitted from said illuminating element in one direction, and said reflecting plate has a configuration of a rotary elliptical surface.

18. The display device according to claim 3, further comprising a reflecting plate for reflecting the light beams emitted from said illuminating element in one direction, said reflecting plate has a configuration of an elliptical surface.

19. The display device according to claim 1, wherein said light distributing means is an ellipse mirror constructed of two or more different rotary elliptical surfaces, one positions of two focal points of the rotary elliptical surfaces are coincident with the position of the light source.

20. The display device according to claim 19, wherein other positions of the two focal points of the rotary elliptical surfaces are in different positions.

21. The display device according to claim 20, wherein focal points of said plurality of rotary elliptical surface reflecting mirrors are arranged substantially in one straight line.

22. The display device according to claim 21, wherein said elliptical reflecting mirror is constructed of a plurality of rotary elliptical reflecting mirrors making a solid angle taking a configuration substantially analogous to a configuration of the display surface of said display panel as viewed from the focal position on one side.

23. The display device according to claim 20, wherein lenses are disposed in positions vicinal to the other focal points of said plurality of elliptical reflecting mirrors.

24. The display device according to claim 23, wherein said lenses are disposed to said different positions and form a lens array.

25. The display device according to claim 24, wherein said lens array takes an overall configuration of a concave lens.

* * * * *